United States Patent
Laroia

(10) Patent No.: US 9,736,365 B2
(45) Date of Patent: Aug. 15, 2017

(54) ZOOM RELATED METHODS AND APPARATUS

(71) Applicant: THE LIGHTCO INC., Palo Alto, CA (US)

(72) Inventor: Rajiv Laroia, Far Hills, NJ (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 14/523,908

(22) Filed: Oct. 26, 2014

(65) Prior Publication Data

US 2015/0172543 A1    Jun. 18, 2015

Related U.S. Application Data

(63) Continuation-in-part of application No. 14/327,508, filed on Jul. 9, 2014.
(Continued)

(51) Int. Cl.
*H04N 5/235* (2006.01)
*H04N 5/262* (2006.01)
(Continued)

(52) U.S. Cl.
CPC ....... *H04N 5/23232* (2013.01); *G02B 13/009* (2013.01); *G02B 15/04* (2013.01);
(Continued)

(58) Field of Classification Search
CPC .............. H04N 5/2254; H04N 5/2258; H04N 5/23296; H04N 5/23232; H04N 5/23245;
(Continued)

(56) References Cited

U.S. PATENT DOCUMENTS

| 4,890,133 A | 12/1989 | Ogawa et al. |
| 5,078,479 A | 1/1992 | Vuilleumier |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Dennis Hogue
*Assistant Examiner* — John H Morehead, III
(74) *Attorney, Agent, or Firm* — Michael P. Straub; Stephen T. Straub; Ronald P. Straub

(57) ABSTRACT

Methods and apparatus for supporting zoom operations using a plurality of optical chain modules, e.g., camera modules, are described. Switching between use of groups of optical chains with different focal lengths is used to support zoom operations. Digital zoom is used in some cases to support zoom levels corresponding to levels between the zoom levels of different optical chain groups or discrete focal lengths to which optical chains may be switched. In some embodiments optical chains have adjustable focal lengths and are switched between different focal lengths. In other embodiments optical chains have fixed focal lengths with different optical chain groups corresponding to different fixed focal lengths. Composite images are generate from images captured by multiple optical chains of the same group and/or different groups. Composite image is in accor- (Continued)

dance with a user zoom control setting. Individual composite images may be generated and/or a video sequence.

23 Claims, 35 Drawing Sheets

Related U.S. Application Data

(60) Provisional application No. 61/896,069, filed on Oct. 26, 2013, provisional application No. 62/068,682, filed on Oct. 25, 2014.

(51) Int. Cl.
*H04N 5/232* (2006.01)
*H04N 5/225* (2006.01)
*G02B 15/04* (2006.01)
*G02B 13/00* (2006.01)

(52) U.S. Cl.
CPC ......... *H04N 5/2254* (2013.01); *H04N 5/2258* (2013.01); *H04N 5/23245* (2013.01); *H04N 5/23296* (2013.01); *G02B 13/0065* (2013.01)

(58) Field of Classification Search
CPC ... G02B 13/0065; G02B 13/009; G02B 15/04
See application file for complete search history.

(56) References Cited

U.S. PATENT DOCUMENTS

| | | | |
|---|---|---|---|
| 5,153,569 A | 10/1992 | Kawamuraa et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2* | 10/2013 | Scarff ................. H04N 5/2258 348/240.2 |
| 8,619,082 B1 | 12/2013 | Ciurea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 9,240,049 B2* | 1/2016 | Ciurea ................ G06T 7/593 |
| 2002/0149691 A1 | 10/2002 | Pereira et al. |
| 2003/0018427 A1 | 1/2003 | Yokota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavley et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187311 A1 | 8/2006 | Labaziewicz et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1* | 9/2008 | Border ................ H04N 5/2258 396/89 |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1* | 10/2010 | Iizuka ................. G06T 5/50 348/218.1 |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0207462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1* | 2/2013 | Adams, Jr. ............ G06T 5/50 348/345 |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |

(56) References Cited

U.S. PATENT DOCUMENTS

| | | |
|---|---|---|
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0116547 A1 | 4/2015 | Laroia |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

Extended European Search Report of the European Patent Office from corresponding European Patent Application No. 14 85 6356.2 includes, the supplementary European search report (3 pp), the European search opinion (4 pp) and cover sheet (1 p), dated Jun. 9, 2017.

* cited by examiner

SE = SHORT EXPOSURE
ME = MEDIUM EXPOSURE
LE = LONG EXPOSURE

KEY

ZOOM RELATED METHODS AND APPARATUS

RELATED APPLICATIONS

The present application claims the benefit of U.S. Provisional Patent Application Ser. No. 61/896,069 filed Oct. 26, 2013, the benefit of U.S. Provisional Patent Application Ser. No. 62/068,682 filed Oct. 25, 2014 and is a continuation-in-part of U.S. patent application Ser. No. 14/327,508 filed Jul. 9, 2014 with each of the afore mentioned patent applications being hereby expressly incorporated by reference in their entirety.

FIELD

The present application relates to zoom methods and apparatus and, more particularly, to methods and apparatus for supporting zoom operations by using multiple optical chains in a camera device.

BACKGROUND

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

In the quest for high quality photos, the amount of light which can be captured is often important to the final image quality. Having a large aperture lens allows a large amount of light to be captured allowing for shorter exposure times than would be required to capture the same amount of light using a small lens. The use of short exposure times can reduce blurriness especially with regard to images with motion. The ability to capture large amounts of light can also facilitate the taking of quality images even in low light conditions. In addition, using a large aperture lens makes it possible to have artistic effects such as small depth of field for portrait photography.

While large lenses have many advantages with regard to the ability to capture relatively large amounts of light compared to smaller lenses, support large zoom ranges, and often allow for good control over focus, there are many disadvantages to using large lenses. Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time. In addition to weight and size drawbacks, large lenses also have the disadvantage of being costly.

For a lens of a digital camera to be useful, it needs to be paired with a device which detects the light passing through the lens and converts it to pixel (picture element) values. A megapixel (MP or Mpx) is one million pixels. The term is often used to indicate the number of pixels in an image or to express the number of image sensor elements of a digital camera where each sensor element normally corresponds to one pixel. Multi-color pixels normally include one pixel value for each of the red, green, and blue pixel components.

In digital cameras, the photosensitive electronics used as the light sensing device is often either a charge coupled device (CCD) or a complementary metal oxide semiconductor (CMOS) image sensor, comprising a large number of single sensor elements, each of which records a measured intensity level. In many digital cameras, the sensor array is covered with a patterned color filter mosaic having red, green, and blue regions in an arrangement. In such a filter based approach to capturing a color image, each sensor element can record the intensity of a single primary color of light. The camera then will normally interpolate the color information of neighboring sensor elements, through a process sometimes called demosaicing, to create the final image. The sensor elements in a sensor array using a color filter are often called "pixels", even though they only record 1 channel (only red, or green, or blue) of the final color image due to the filter used over the sensor element.

While small focal length lenses paired with relatively high resolution sensors have achieved widespread commercial success in cell phones and pocket cameras, they often leave their owners longing for better picture quality, e.g., picture quality that can only be achieved with a larger pixel area and a larger lens opening to collect more light.

Smaller sensors require smaller focal length lenses (hence smaller lenses) to frame the same scene from the same point. Availability of high pixel count small sensors means that a smaller lens can be used. However, there are a few disadvantages to using smaller sensors and lenses. First, the small pixel size limits the dynamic range of the sensor as only a small amount of light can saturate the sensor. Second, small lenses collect less total light which can result in grainy pictures. Third, small lenses have small maximum apertures which make artistic effects like small depth of field for portrait pictures not possible.

In view of the above discussion, it should be appreciated that there is a need for new photographic methods and apparatus which can provide some combination of the benefits commonly associated with large lenses, e.g., a relatively large lens area for capturing light, with at least some of the benefits of small focal length lenses, e.g., compact size. Additionally, it would be desirable if some of the disadvantages such as limited dynamic range and/or depth of field associated with small focal length lenses could be avoided and/or such advantages reduced without requiring the use of large lenses.

In particular, there is a need for improved methods and apparatus for supporting zoom operations. It would be desirable if at least some of the methods and/or apparatus provide one or more of the benefits associated with use of a large lens. It would be preferable but not absolutely necessary that the one or more benefits could be provided without the need for a large heavy lens extending out way beyond the body of the camera.

SUMMARY OF THE INVENTION

Methods and apparatus for supporting zoom operations using a plurality of optical chain modules, e.g., camera modules, are described. Switching between use of groups of optical chains with different focal lengths is used to support zoom operations. Digital zoom is used in some cases to support zoom levels corresponding to levels between the zoom levels of different optical chain groups or discrete focal lengths to which optical chains may be switched. In some embodiments optical chains have adjustable focal lengths and are switched between different focal lengths. In other embodiments optical chains have fixed focal lengths with different optical chain groups corresponding to different fixed focal lengths. Composite images are generate from images captured by multiple optical chains of the same group and/or different groups. Composite image is in accordance with a user zoom control setting. Individual composite images may be generated and/or a video sequence.

In some embodiments but not necessary all embodiments, two or more groups of optical chains each include at least two optical chains which capture images in parallel but in some embodiment 3, 4, 5 or more optical chains are included in an individual optical chain group. The image portions captured by different optical chains in a group may be partially overlapping, non-overlapping or fully overlapping with various combinations and amounts of overlap being a function of the particular implementation. Groups of optical chains corresponding to different focal lengths may include different numbers of optical chains. In one particular exemplary embodiment optical chains in a first group corresponding to a first focal length include at least 4, and in some embodiments 5, optical chain modules, e.g., with 4 of the modules capturing substantially non-overlapping portions, e.g., quarters, of a scene area and the fifth capturing the center of the scene area and overlapping the portions captured by the other optical chain modules of the first group. In the particular exemplary embodiment the second group of optical chains includes a similar configuration to the first, e.g., with four optical chains being used to capture different portions of scene area and a fifth to capture the center portion of the scene area in a manner that overlaps the portions captured by the other four optical chains of the second group of optical chains. The optical chains in the second group may, and in some embodiments do, have a focal length which is smaller than the focal length of the optical chains of the first group. A third group of optical chains which may also be used in combination with the first and second groups of optical chains. The third group of optical chains, in some embodiments, includes one or more camera modules having a focal length shorter than the focal length of the first and second optical chains. A composite image, in some embodiments is generated using images captured by two or more of the groups of optical chains with different focal lengths during an image capture time period in which the optical chains of the different camera modules capture an image in parallel. While five optical chains are used in the first and second groups in other embodiments four optical chains are used per group with the optical chain used to capture the center portion of the image being omitted in some embodiments. In other embodiments the groups of optical chains include 4, 3, 3 or fewer optical chain modules with some groups including a single optical chain module while another group may include two or more optical chain modules. Implementations where at least some groups of optical chains with different focal lengths include less than 4 optical chains may be particularly desirable in low cost embodiments which are well suited for cell phones, tablets or other devices where the cost and/or space required for large numbers of optical chains may be an issue. While fixed focus length optical chains are used in some embodiments, whether the optical chains are fixed focal length or capable of being controlled to change between discrete focal lengths autofocus support may and in some embodiments is provided. However, fixed focus optical chains may and are used in some embodiments.

Various methods and apparatus of the present invention are directed to methods and apparatus for obtaining some or all of the benefits of using relatively large and long lens assemblies without the need for large lens and/or long lens assemblies, through the use of multiple optical chain modules in combination.

Optical chain modules including, in some embodiments, relatively short focal length lenses which require relatively little depth within a camera are used in some embodiments. While use of short focal length lens can have advantages in terms of small lens width, the methods and apparatus of the present are not limited to the use of such lenses and can be used with a wide variety of lens types. In addition, while numerous embodiments are directed to autofocus embodiments, fixed focus embodiments are also possible and supported. An optical chain, in various embodiments, includes a first lens and an image sensor. Additional lenses and/or one or more optical filters may be included between the first lens of an optical chain module and the image sensor depending on the particular embodiment. In some cases there may be one or more optical filters before the first lens.

The use of multiple optical chain modules is well suited for use in devices such as cell phones and/or portable camera devices intended to have a thin form factor, e.g., thin enough to place in a pocket or purse. By using multiple optical chains and then combining the captured images or portions of the captured images to produce a combined image, improved images are produced as compared to the case where a single optical chain module of the same size is used.

While in various embodiments separate image sensors are used for each of the individual optical chain modules, in some embodiments the image sensor of an individual optical chain module is a portion of a CCD or other optical sensor dedicated to the individual optical chain module with different portions of the same sensor serving as the image sensors of different optical chain modules.

In various embodiments, images of a scene area are captured by different optical chain modules and then subsequently combined either by the processor included in the camera device which captured the images or by another device, e.g., a personal or other computer which processes the images captured by the multiple optical chains after offloading from the camera device which captured the images. The combined image has, in some embodiments a dynamic range that is larger than the dynamic range of an individual image used to generate the combined image.

An exemplary method of operating a camera device including a plurality of optical chains, said plurality of optical chains including at least a first group of optical chains and a second group of optical chains, in accordance with some embodiments, includes: capturing images using the second group of optical chains during a first period of time; and capturing images using the first group of optical chains during a second period of time, optical chains in said first group of optical chains have a different focal length than optical chains in said second group of optical chains during at least a portion of said second period of time. An exemplary camera device, in accordance with some embodiments, includes: a plurality of optical chains, said plurality of optical chains including at least a first group of optical chains and a second group of optical chains; a first image capture module configured to capture images using the second group of optical chains during a first period of time; and a second image capture module configured to capture images using the first group of optical chains during a second period of time, optical chains in said first group of optical chains have a different focal length than optical chains in said second group of optical chains during at least a portion of said second period of time. Various described methods and apparatus use multiple groups of lenses to support continuous zooming with a combination of digital zoom and discrete lens focal length changes.

In some embodiments, but not necessarily all embodiments, the optical chains do not have lenses which extend out far beyond the body of the camera and in fact in some embodiments the opening of the optical chains is flat, flush or nearly flush with the surface of the camera through which light enters an individual optical chain. The covering of an aperture corresponding to an optical chain may be a flat piece of glass or plastic in some embodiments.

Numerous additional features and embodiments are described in the detailed description which follows.

DETAILED DESCRIPTION

Figure 1A:
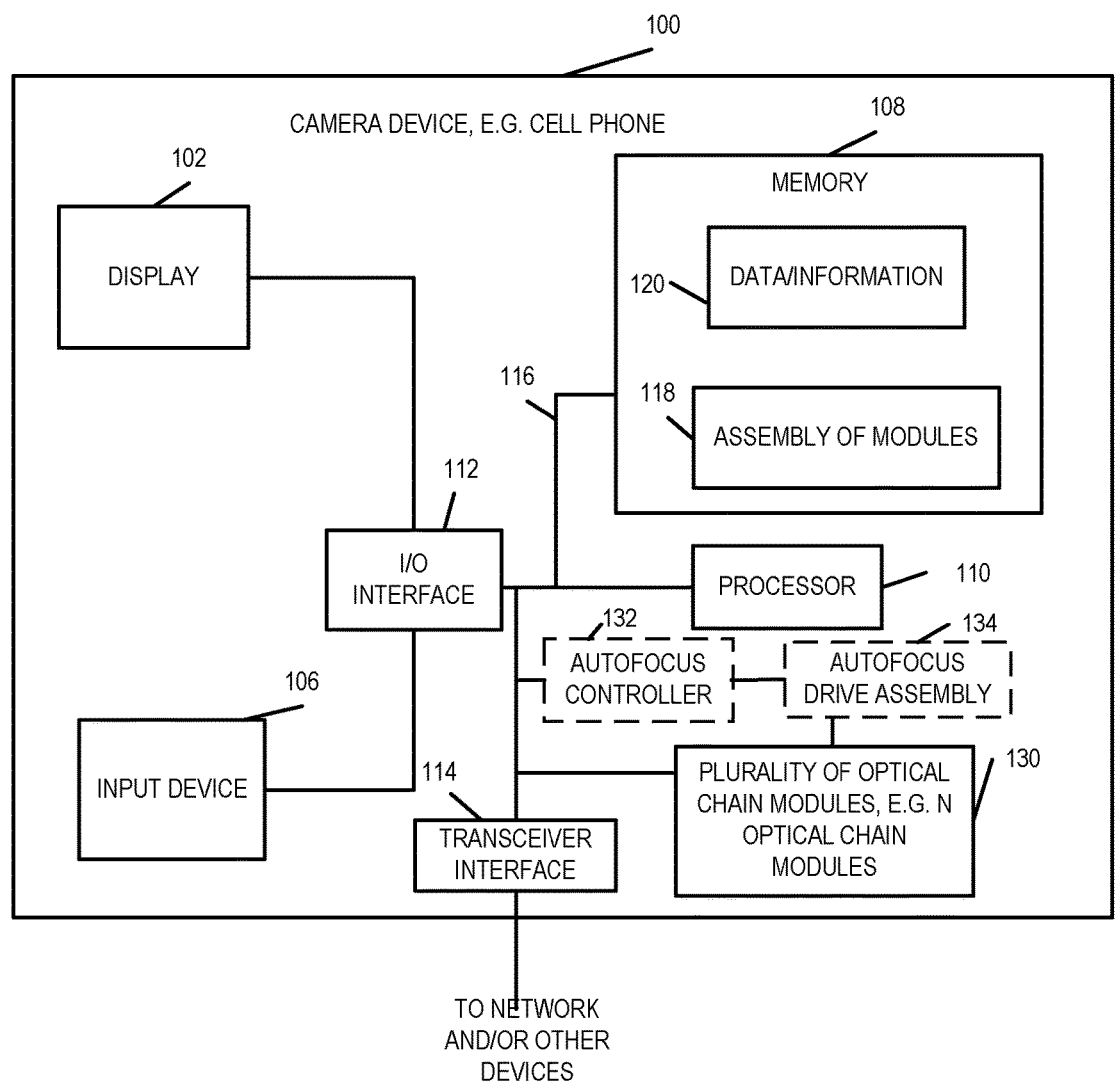
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and for instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
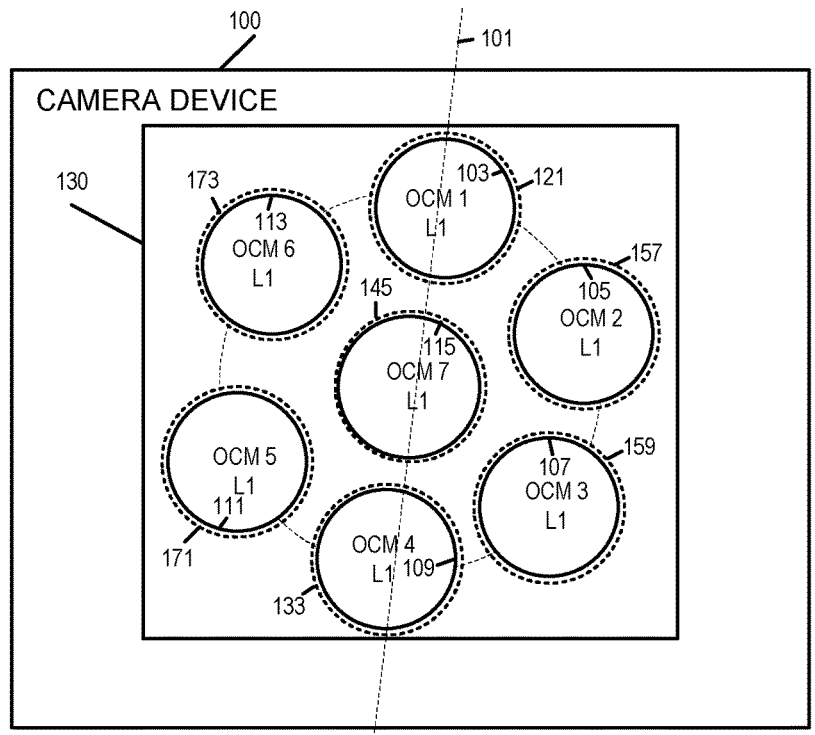
FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
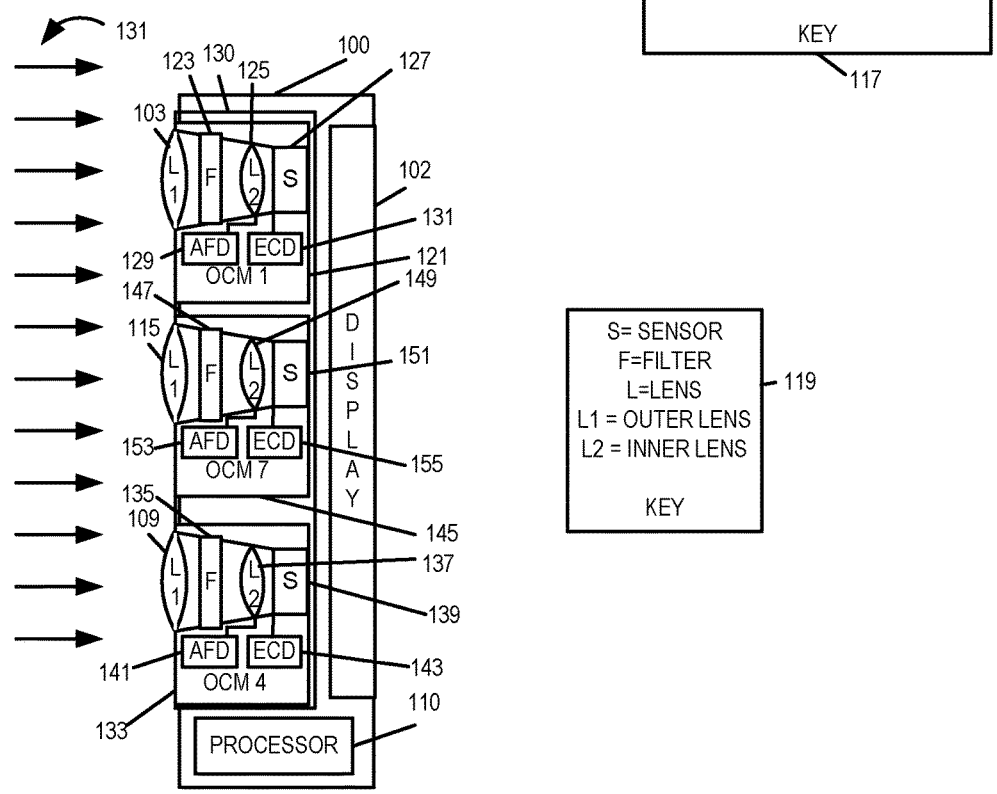
FIG. 1C which is a side view of the exemplary apparatus of FIG. 1B, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. OCM 1 121 further includes autofocus drive (AFD) 129 for controlling the position of lens L2 125, and exposure control device (ECD) 131 for controlling sensor 127. The AFD 129 includes a motor or other drive mechanism which can move the lens (or sensor) to which it is connected. While the AFD 129 is shown coupled, e.g., connected, to the lens L2 125 and thus can move the position of the lens L2 as part of a focus operation, in other embodiments the AFD 129 is coupled to the sensor 127 and moves the position of the sensor 127, e.g., to change the distance between the sensor 127 and the lens 125 as part of a focus operation. OCM 7 145 includes an outer lens L1 115, a filter 147, an inner lens L2 149, and a sensor 151. OCM 7 145 further includes AFD 153 for controlling the position of lens L2 149 and ECD 155 for controlling sensor 151.

OCM 4 133 includes an outer lens L1 109, a filter 135, an inner lens L2 137, and a sensor 139. The AFD 153 includes a motor or other drive mechanism which can move the lens (or sensor) to which it is connected. While the AFD 153 is shown coupled, e.g., connected, to the lens L2 149 and thus can move the position of the lens L2 as part of a focus operation, in other embodiments the AFD 149 is coupled to the sensor 151 and moves the position of the sensor 151, e.g., to change the distance between the sensor 151 and the lens 149 as part of a focus operation. OCM 4 133 further includes AFD 141 for controlling the position of lens L2 137 and ECD 143 for controlling sensor 139. The AFD 141 includes a motor or other drive mechanism which can move the lens (or sensor) to which it is connected. While the AFD 141 is shown coupled, e.g., connected, to the lens L2 137 and thus can move the position of the lens L2 as part of a focus operation, in other embodiments the AFD 141 is coupled to the sensor 139 and moves the position of the sensor 139, e.g., to change the distance between the sensor 139 and the lens 137 as part of a focus operation.

While only three of the OCMs are shown in FIG. 1C it should be appreciated that the other OCMS of the camera device 100 may, and in some embodiments do, have the same or similar structure. FIG. 1C and the optical chain modules (OCMs), also sometimes referred to as optical camera modules, illustrated therein are illustrative of the general structure of OCMs used in various embodiments. However, as will be discussed in detail below, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 10 will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the AFD, ECD and sensors 127, 151, 139 it is to be appreciated that such connections exist and are omitted from FIG. 1C to facilitate the illustration of the configuration of the exemplary OCMs. As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented using a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

Figure 6A:
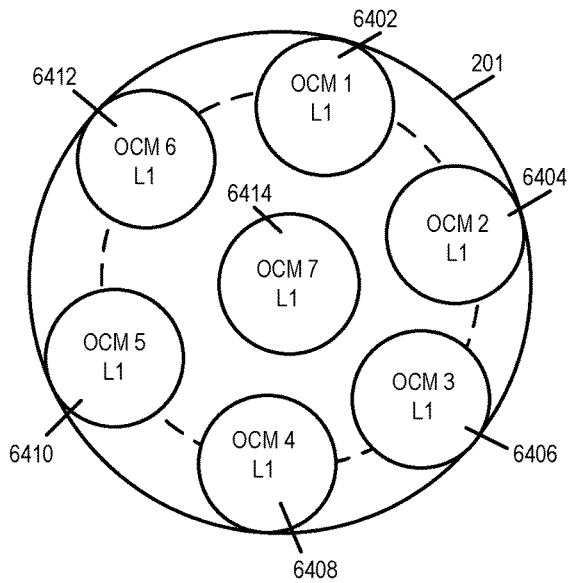
FIG. 6, which comprises the combination of FIGS. 6A, 6B, and 6C, shows an exemplary combination of lenses and filters used in one exemplary embodiment in which a single color filter is used in at least some of the different optical chain modules.
Figure 6B:
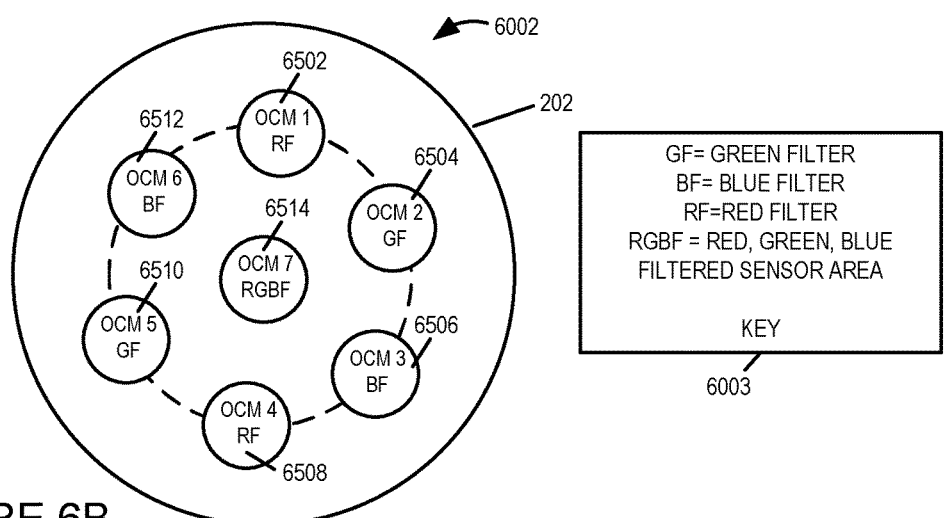
Figure 6C:
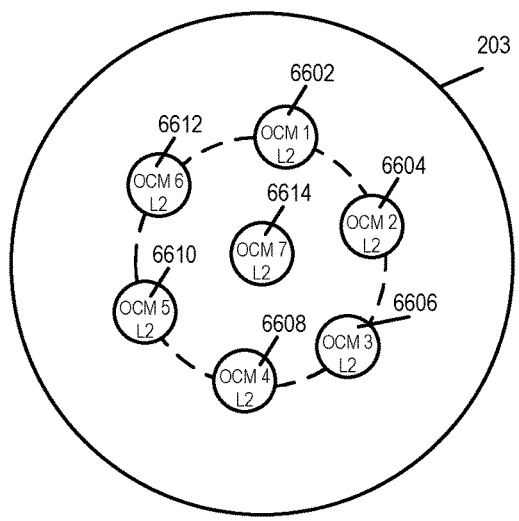
Figure 6:
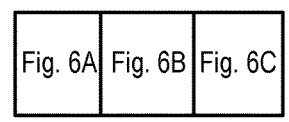

For example, in some embodiments, such as the FIG. 6 embodiment, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combining the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible. As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, 1/10th, 1/20th or even less than the overall side to side length or even top to bottom length of the camera device visible in FIG. 1B.

Figure 1D:
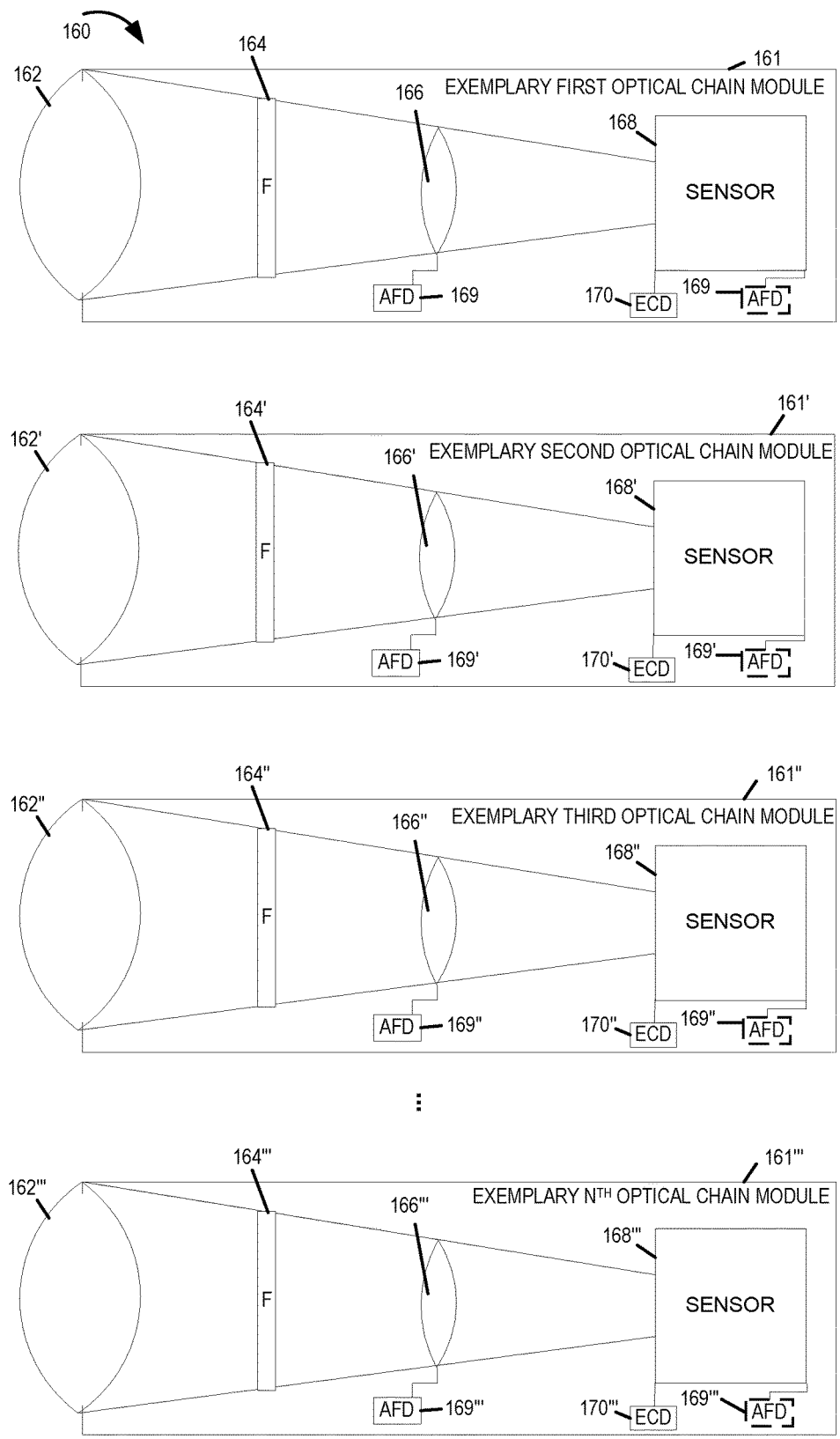
FIG. 1D illustrates a plurality of optical chain modules that can be used in an exemplary device implemented in accordance with the invention.

FIG. 1D illustrates a plurality of optical chain modules 160 that can be used in an exemplary device implemented in accordance with the invention. The optical chain modules (OCMs) shown in FIG. 1D are illustrative of the general structure of OCMs used in various embodiments. However, as will be discussed in detail below, numerous modifications and particular configurations are possible. Many of the particular configurations will be discussed below with use of reference to the optical camera modules shown in FIG. 1D to support the particular exemplary embodiments. While reference to elements of FIG. 1D may and will be made with regard to particular embodiments, it is to be understood that the OCMs in a particular embodiment will be configured as described with regard to the particular embodiment. Thus, for example, in a particular embodiment one or of the OCMS may use filters of a particular color or may even omit the filter 164, 164'. 164" or 164'''. Similarly, in embodiments where the filter is expressly omitted and described as being omitted or an element which allows all light to pass, while reference may be made to the OCMs of FIG. 1D, it should be appreciated that the filter will be omitted in such an embodiment where it is expressly indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1D mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 164, 164', 164". 164''', shown in FIG. 1C will have their own optical axis which corresponds to the path light entering the particular OCM will follow as it passes from the lens 162, 162'. 162", 162''' at the front of the optical chain and passes through the OCM to the corresponding sensor 168, 168', 168", 168'''.

The plurality of optical chain modules 160 includes N exemplary optical chain modules as illustrated in FIG. 1D where N may be any number but usually a number greater than one, and in many cases greater than 2, 6 or even a larger number. The plurality of optical chain modules 160 includes a first optical chain module (OCM) 161, a second optical chain module 161', a third optical chain module 161", . . . , and Nth optical chain module 161'''.

Each optical chain module illustrated in FIG. 1D includes many or all of the same elements shown in each optical chain illustrated in FIG. 1C such as, e.g., optical chain module 121. The first exemplary OCM 161 includes an outer lens 162, a filter 164, an inner lens 166, a sensor 168, an auto focus drive (AFD) 169 and an exposure control device (ECD) 170. Each of the other optical chain modules include similar elements as described above with regard to the first OCM 160, with the like elements in each of the other optical chain modules being identified using a prime ('), double prime ("), or triple prime ('''). For example, the exemplary second OCM 161' includes an outer lens 162', a filter 164', an inner lens 166', a sensor 168', an auto focus drive (AFD) 169' and an exposure control device (ECD) 170', the exemplary third OCM 161" includes an outer lens 162", a filter 164", an inner lens 166", a sensor 168", an auto focus drive (AFD) 169" and an exposure control device (ECD) 170" and so on. Similarly, the Nth OCM 161' includes an outer lens 162''', a filter 164''', an inner lens 166''', a sensor 168''', an auto focus drive (AFD) 169' and an exposure control device (ECD) 170'''. The operation and functionality of each of the OCMs and their elements is the same as or similar the functionality of optical chain modules discussed earlier with respect to FIG. 1C and thus will not be repeated. Note that two versions of the AFD 169, 169', 169" or 169''' are shown in each optical chain module with the AFD connected to a lens being shown using solid lines and an alternative AFD shown using dashed lines being connected to the sensor 168, 168', 168" or 168'''. The AFD shown with dashed lines adjusts the position of the sensor 168. 168', 168" or 168' to which it is connected as part of an autofocus operation, e.g., moving the sensor forward or backward to alter distance between the sensor and a lens. The AFD shown in solid lines is used in systems where a lens rather than a sensor is moved as part of an AFD operation. In some embodiments the AFD controls the position of a lens and/or sensor in which case the AFD module is connected to both a lens support mechanism or lens and the sensor.

The plurality of optical chain modules 160 of FIG. 1D can be used as, e.g., the plurality of optical modules 130 of the exemplary device 100 or any other device implemented in accordance with the invention. The number and particular configuration of optical chains in the step of optical chains 160 maybe as per various embodiments which will be described in the following detailed description. Accordingly, while a particular embodiment may be described in one more subsequent portions of this application, it is to be understood that the optical chains 160 may be used in such embodiments with the particular configuration of filters, lens, and element supports being as described with respect to the particular exemplary embodiment being discussed.

Figure 2:
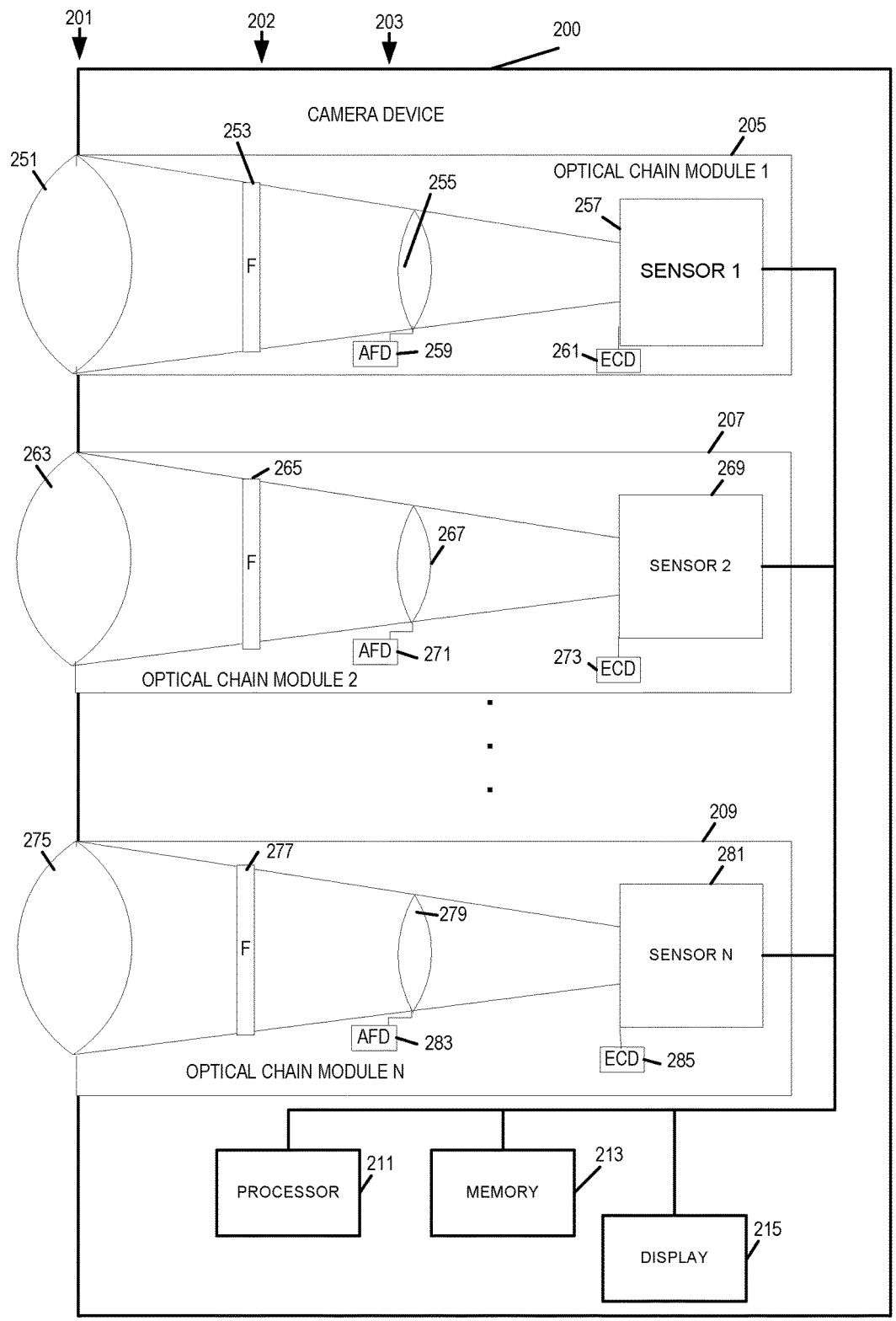
FIG. 2 illustrates a camera device implemented in accordance with one embodiment of the present invention.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, . . . , OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and AFD=auto focus drive.

In the FIG. 2 embodiment the optical chain modules (optical chain module 1 205, optical chain module 2 207, . . . , optical chain module N 209) are shown as independent assemblies with the autofocus drive of each module being a separate AFD element (AFD 259, AFD 271, AFD 283), respectively.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
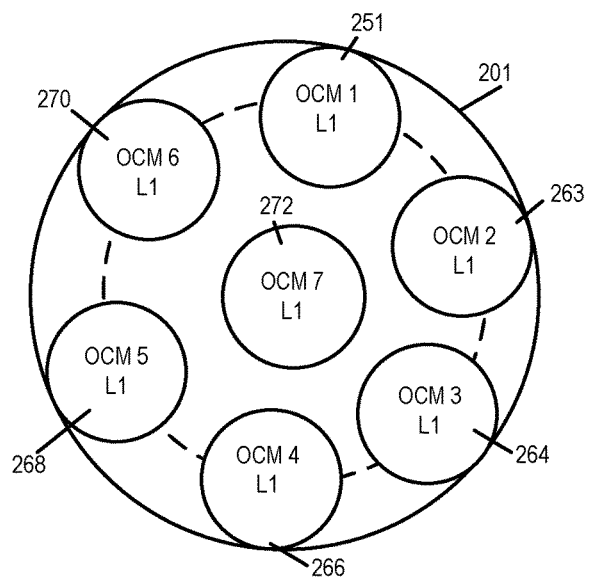
FIG. 3A shows an exemplary lens configuration which may be used for the set of outer lenses of the camera device shown in FIGS. 1A-1C.
Figure 3B:
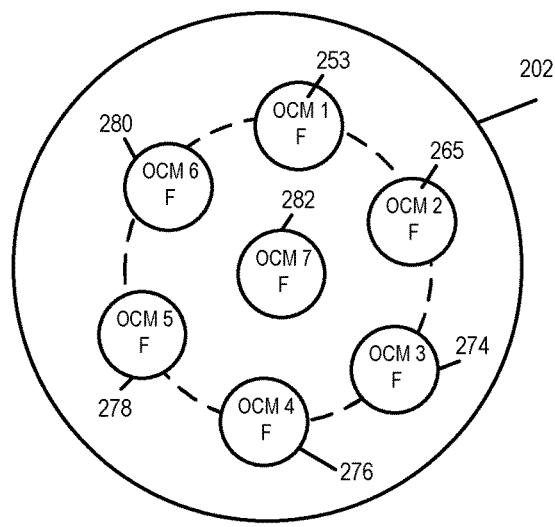
FIG. 3B illustrates an exemplary filter arrangement which is used in the camera of FIGS. 1A-1C in some embodiments.
Figure 3C:
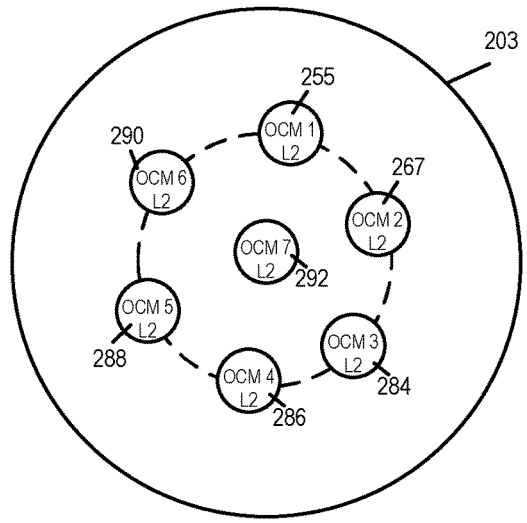
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG. 2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
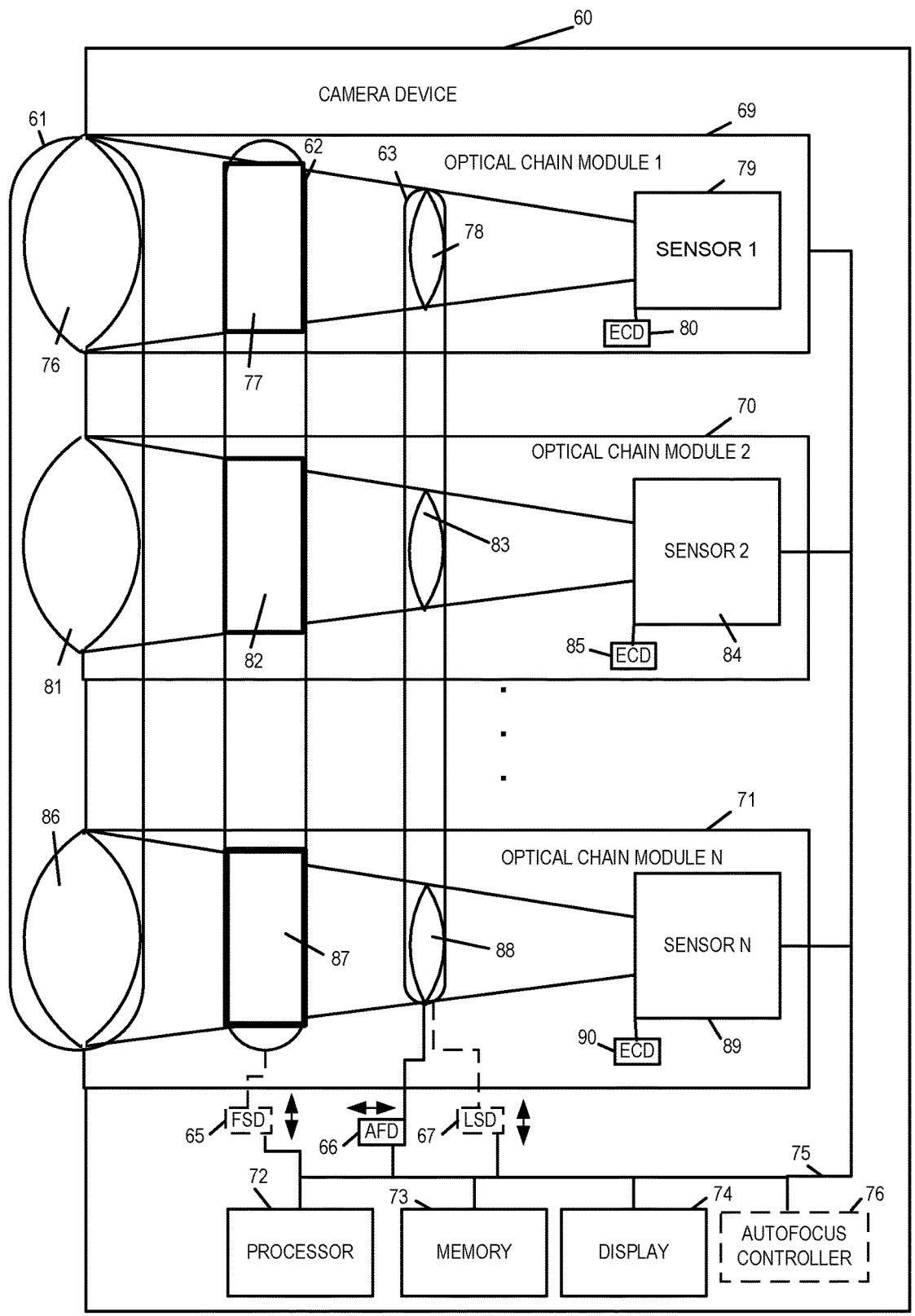
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. In some embodiments, processor 72, memory 73, display 74, and autofocus controller 76 of device 60 of FIG. 4 are the same as processor 110, memory 108, display 102, and autofocus controller 132 of device 100 of FIG. 1A.

Element 61 represents a platter of outer lenses L1 with 3 of the lenses (77, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 62 may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 72 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5A:
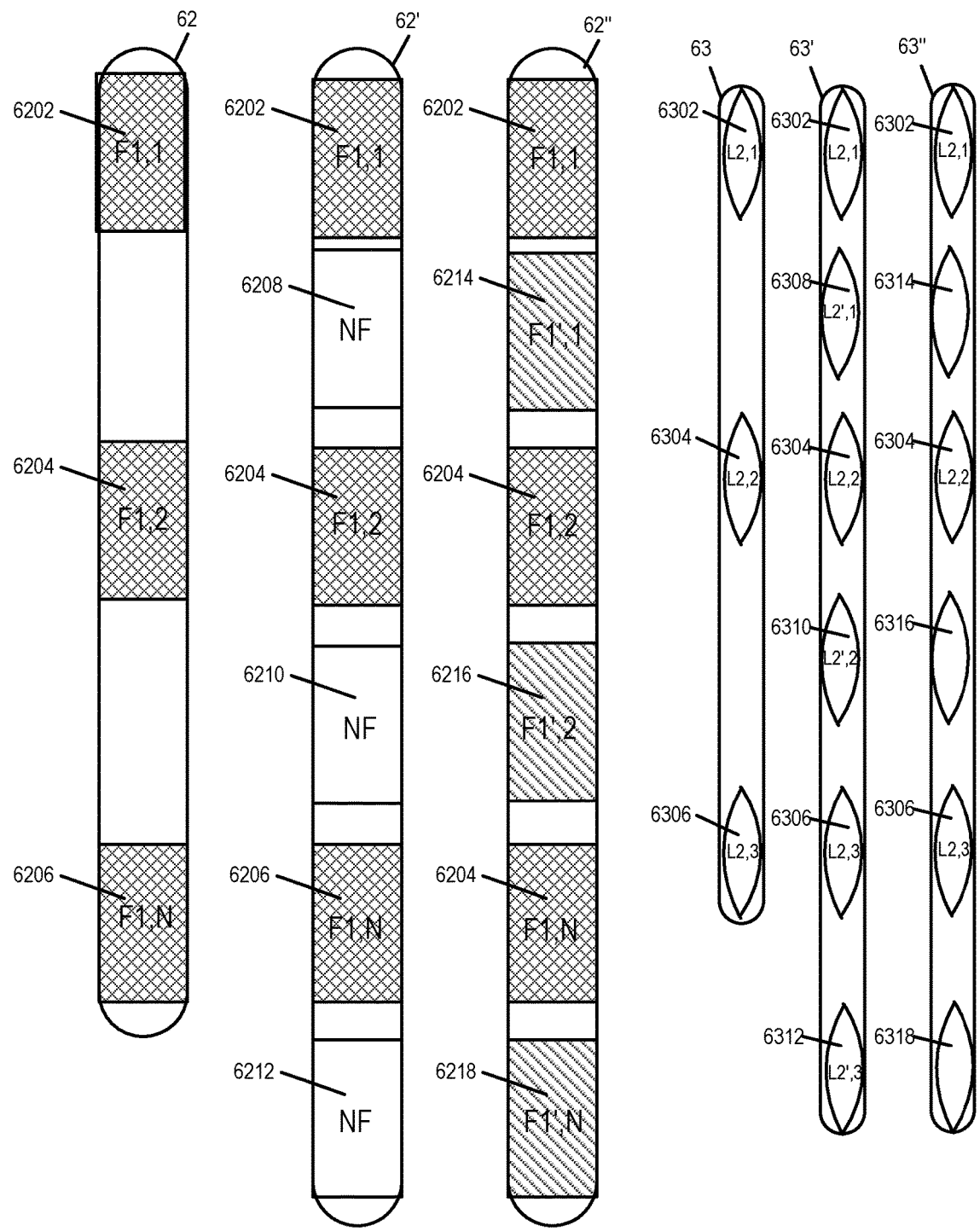
FIG. 5A illustrates various filter and lens platters that may be used in the camera device shown in FIG. 4 depending on the particular embodiment.
Figure 5B:
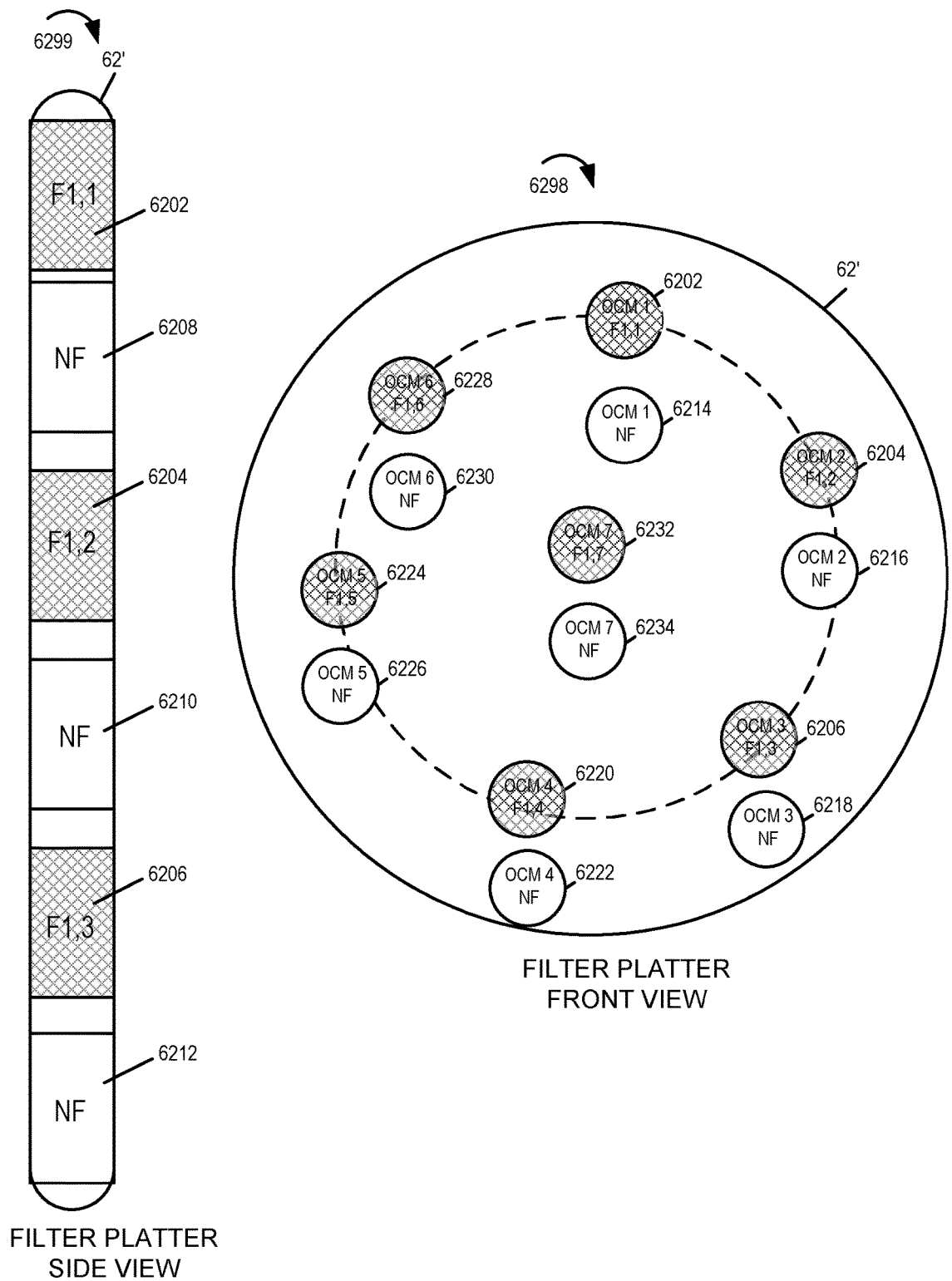
FIG. 5B illustrates the filter platter arrangement shown in FIG. 5A when viewed from the side and when viewed from the front.

FIG. 5A illustrates various exemplary platters that can, and in some embodiments are, used as the filter platter and/or inner lens platter in the camera device 60 of FIG. 4. In the FIG. 5A example N is three (3) but other values of N are possible depending on the embodiment. FIG. 5B shows the exemplary lens platter 62' of FIG. 5A when viewed from the side, drawing 6299, and from the front, drawing 6298.

Platter 62 represents a platter with a single set of filters F1,1 6202 corresponding to OCM1, F1,2 6204 corresponding to OCM 2 and F1,3 6206 corresponding to OCM 3.

Platter 62' represents an alternative platter that can, and in some embodiments is, used in place of platter 62. NF is use to represent a hole or No Filter (NF) area of the platter 62'. As should be appreciated by simply shifting platter 62' vertically the filters F1 (F1,1 6202, F1,2 6204, F1, 3 6206) can be replaced by holes (NF 6208, NF 6210, NF 6212), respectively, thereby removing the color or other types of filters previously included in the optical chain modules.

Platter 62" of FIG. 5A represents a platter which includes alternative filters F1' (F1', 1 6214, F1', 2 6216, F1' 3 6206)

which can be switched for the filters F1 (F1, 1 6202, F1,2 6204, F1,3 6206), respectively, by moving the platter 62" vertically. Thus platter 62" is used to show how filters can be switched for other filters by simple movement of a platter while platter 62' shows how filters can be removed from the optical paths included in a plurality of optical chain modules by shifting of the platter on which a set of filters are mounted.

With regard to drawing 6298 of FIG. 5B, as should be appreciated by simply shifting platter 62' vertically the filters F1 (F1,1 6202, F1,2 6204, F1, 3 6206, F1,4 6220, F1, 5 6224, F1, 6 6228, F1, 7 6232) can be replaced by holes (NF 6208, NF 6210, NF 6212, NF 6222, NF 6226, NF 6230, NF 6234), respectively, thereby removing the color or other types of filters previously included in the optical chain modules.

Lens platter 63 shows a platter of inner lenses L2 (L2,1 6302, L2,2 6304, L2,3 6306) corresponding to first, second and third optical camera modules. Lens platter 63' is an alternative platter which shows how alternative lenses L2' (L2',1 6308, L2',2 6310, L2',3 6312) can be included on a lens platter and easily swapped for the lenses L2 (L2,1 6302, L2,2 6304, L2,3 6306), respectively, by simple movement of the platter 63' vertically or horizontally. Lens platter 63" is used to show that a lens platter may include holes (6314, 6316, 6318) as an alternative to alternative lenses. Any of lens platters 63, 63' or 63" could be used in the camera device 60 shown in FIG. 4. While two lens sets are included in platter 63', multiple lens and/or hole combinations, e.g., 2, 3 or more, may be included in a single platter. Similarly a large number of alternative filter, hole alternatives may be supported in a single filter platter. A platter can also have combinations of lenses, filters and holes and filters could be swapped for lenses or holes.

As should be appreciated given the larger number of lens/filter combinations that can be supported through the use of platters, a single camera device including a number of optical chain modules may support a large number of alternative modes of operation.

It should be appreciated that the exposure control of various optical chain modules may be varied along with the filters and/or lenses used at any given point in time allowing for a wide degree of flexibility and control over the images captured at any given point in time.

FIGS. 6A, 6B and 6C correspond to one particular filter lens combination used in some embodiments.

FIG. 6A shows the use of 7 optical chain modules at plane 201 (the outer lens plane corresponding to lenses L1) as viewed from the front of the camera device. FIG. 6A shows optical chain module L1 lenses (OCM 1 L1 6402, OCM 2 L1 6404, OCM 3 L1 6406, OCM 4 L1 6408, OCM 5 L1 6410, OCM 6 L1 6412, OCM 7 L1 6414). FIG. 6C shows the inner lens plane 203. FIG. 6C shows optical chain module L2 lenses (OCM 1 L2 6602, OCM 2 L2 6604, OCM 3 L2 6606, OCM 4 L2 6608, OCM 5 L2 6610, OCM 6 L2 6612, OCM 7 L2 6614). The configuration shown in FIGS. 6A and 6C is the same or similar to that previously discussed with reference to the FIG. 3 embodiment. FIG. 6B shows a particular color filter arrangement used in some embodiments. The filter arrangement shown in FIG. 6B may be used at filter plane 202. The filter arrangement shown in FIG. 6B may be used in the set of optical chain modules 130 before the sensors, e.g., between the set of L1 and L2 lenses. However, this position is not required for some embodiments and the user of inner lenses L2 is also not required for some embodiments.

The filter configuration 6002 of FIG. 6B includes single color filters in each of a plurality of optical chain modules, e.g., the six outer optical chain modules (OCM1 to OCM6). Multiple optical chain modules are dedicated to each of the three colors, red (R), green (G) and blue (B). The optical chain modules (OCM1, OCM4) with the red filter (RF), (OCM 1 RF 6502, OCM 4 RF 6508) pass and sense red light. The optical chain modules (OCM 2, OCM 5) with the green filter (GF), OCM 2 GF 6504, OCM 5 GF 6510, pass and sense green light. The optical chain modules (OCM 3, OCM 6) with the blue filter (BF), OCM 3 BF 6506, OCM 6 BF 6512, pass and sense blue light. In various embodiments, there is a single color filter per lens for the outer lenses, e.g., a single color filter corresponding to each of OCM 1-OCM 6. In some such embodiments, there are multiple OCMs per single color, e.g., 2 OCMs for each of Red, Green, and Blue.

By using optical chain modules dedicated to a single color, the optical chains can be optimized for the spectral range corresponding to the particular color to which the chain corresponds. In addition post capture color compensation can be simplified since each of the six outer optical modules capture a single known color. In addition, noise can be averaged between the sensor corresponding to the same color and/or different exposure times can be used for the different OCMs corresponding to an individual color extending the dynamic range of the sensors to cover a range wider than could be captured by a single sensor. In addition different exposure times may be used for different colors to take into consideration particular color biased lighting conditions and/or facilitate the implementation of particular color effects that may be desired. Notably the individual colors are captured at a pixel result in a resolution equal to that of the sensor as opposed to the case where different portions of a single sensor are used to capture different colors, e.g., with each color R, G, B being captured at a resolution ⅓ that of the pixel resolution of the image sensor being used in an optical chain module.

In some embodiments, there is a RGB Multicolor Filter, OCM 7 RGBF 6514, corresponding to OCM 7. In some embodiments, OCM 7 filter 6514 is a RGB filter, e.g., a Bayer filter. In some embodiments, an opening which allows all colors to pass is used in place of OCM 7 RGB filter 6514, but the sensor area corresponding to OCM 7 includes R, G, and B filters corresponding to different sensor area portions. In some embodiments, OCM 7 is used for preview. In various embodiments, the sensors for OCM 1 through OCM 6 have no filters.

While in some embodiments a composite image is generated and displayed as a preview image, in some embodiments to reduce processing time and/or the time required to display a composite image which may be delayed by the time required to combine multiple images, an image captured by a single sensor is displayed as the preview image on the display of the camera device. The multi-colored filter incorporated into the sensor, e.g., Bayer filter, of OCM 7 allows a color image to be captured by a single lens and used as the preview image. While the image may be of lower quality than that which can be generated by creating a composite of the multiple OCMs given the small display size the difference in image quality between the preview image generated from OCM 7 and that of a composite image may not be sufficient to justify the processing, power, and/or time required to generate a composite image for preview purpose. Accordingly, the FIG. 6B filter arrangement provides a great deal of flexibility while being able to support a wide variety of exposure and other image capture related features.

Figure 7A:
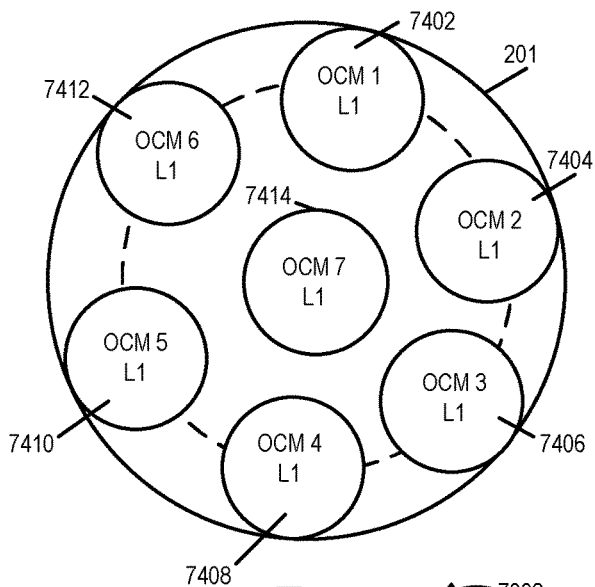
FIG. 7, which comprises the combination of FIGS. 7A, 7B, and 7C, shows an exemplary combination of lenses and filters used in one exemplary embodiment in which exposures of different duration are used for different optical chain modules and a single color filter is used in at least some of the different optical chain modules.
Figure 7B:
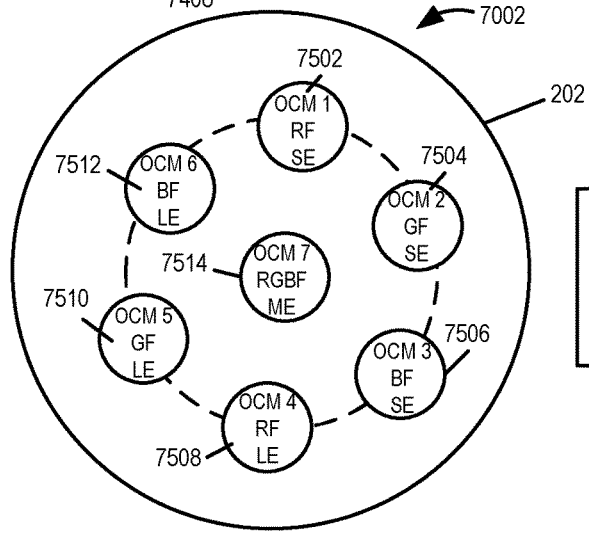
Figure 7C:
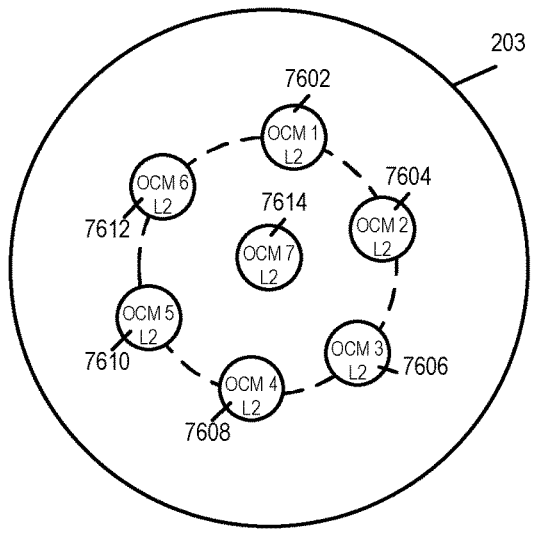
Figure 7:
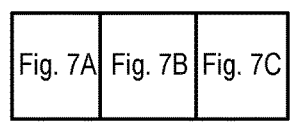

Box 6003 of FIG. 6B identifies that GF=green filter, BF=blue filter, RF=red filter, RGBF=Red, Green, Blue Filter. The ability to use different exposure times with different optical chain modules is illustrated further with regard to a camera embodiment which will now be discussed with regard to FIGS. 7A, 7B and 7C. The lens configurations of FIGS. 7A and 7C are similar to that shown in FIGS. 6A and 6C. FIG. 7A shows optical chain module L1 lenses (OCM 1 L1 7402, OCM 2 L1 7404, OCM 3 L1 7406, OCM 4 L1 7408, OCM 5 L1 7410, OCM 6 L1 7412, OCM 7 L1 7414), which may be located a plane 201. FIG. 6C shows optical chain module L2 lenses (OCM 1 L2 7602, OCM 2 L2 7604, OCM 3 L2 7606, OCM 4 L2 7608, OCM 5 L2 7610, OCM 6 L2 7612, OCM 7 L2 7614), which may be located at plane 203. The filter arrangement shown in drawing 7002 of FIG. 7B is also the same or similar to that shown in FIG. 6B but in the FIG. 7B example exposure time is also included. While the exposure is controlled by use of the exposure control device in some embodiments the concept can be understood from FIG. 7B. In FIG. 7B SE is used to indicate short exposure, LE is used to indicate long exposure, and ME is used to indicate medium exposure, as indicated by box 7003. Element 7502 indicates that OCM 1 uses a red filter and is controlled for a medium exposure. Element 7504 indicates that OCM 2 uses a green filter and is controlled for a short exposure. Element 7506 indicates that OCM 3 uses a blue filter and is controlled for a short exposure. Element 7508 indicates that OCM 4 uses a red filter and is controlled for a long exposure. Element 7510 indicates that OCM 5 uses a green filter and is controlled for a long exposure. Element 7512 indicates that OCM 6 uses a blue filter and is controlled for a long exposure. Element 7514 indicates that OCM 7 uses a RGB filter, e.g., a Bayer filter, and is controlled for medium exposure. For the outer OCMs, OCM 1 through OCM 6, there is a single color filter per OCM, and multiple OCMs per color. In various embodiments, the center OCM, OCM 7, is used for preview.

In some embodiments, filters, corresponding to OCM 1 through OCM 7, are included at plane 202. In some embodiments, the filters corresponding to OCM 1 through OCM 6 are included at plane 202; there is an opening at plane 2 corresponding to OCM 7, which allows all the colors to pass; and the sensor area corresponding to OCM 7 includes R, G, and B filters corresponding to different sensor area portions, e.g., the sensor for OCM 7 includes an RGB Bayer filter. In some embodiments, the sensors for OCM 1 through OCM 6 have no filters.

The preview image is generated using the medium exposure optical chain module while the two different optical chain modules corresponding to a given color use different exposures. In this way the short exposure time can be used to reliably capture information corresponding to light (e.g., bright) portions of an image while the long exposure optical chain module can be used to capture information corresponding to the darker portions of an image. As discussed above, the sensed pixel values from the two optical chains can be processed to exclude values generated by saturated sensors and to combine pixel values corresponding to the same image area in a manner weighted according to the exposure duration for pixel value within the acceptable operating range of the optical chain module's sensors.

While different durations can and often are achieved by controlling sensor exposure times, different filters in different optical chain modules may, and are, used to achieve different light exposures in some embodiments.

Figure 8:
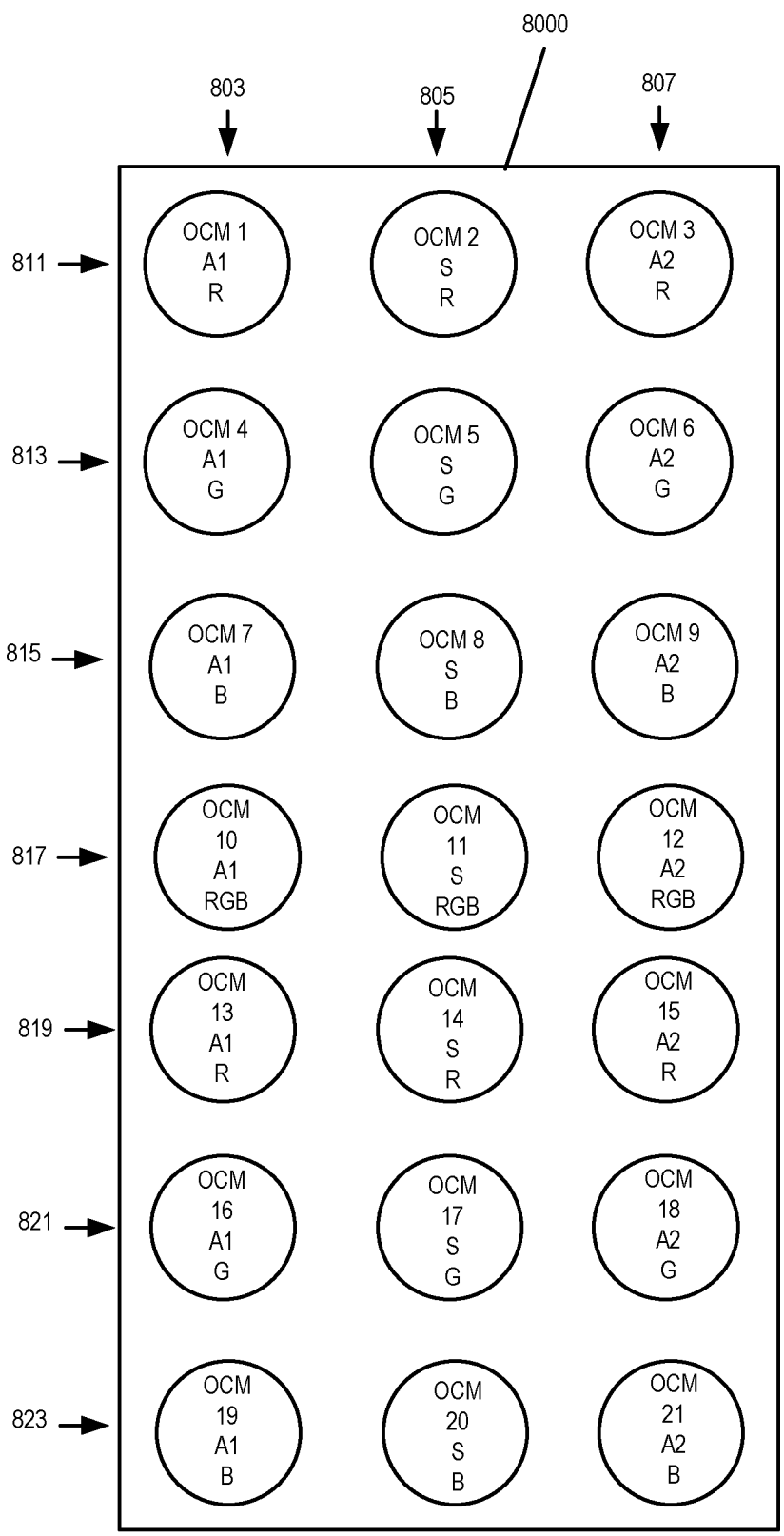
FIG. 8 illustrates an optical chain arrangement used in one panoramic camera embodiment in which multiple optical chains and different lens angles are used to capture images that are well suited for combining into a panoramic image.

FIG. 8, illustrates an optical chain arrangement used in one panoramic camera device 8000 in which multiple optical chains and different lens angles are used to capture images that are well suited for combining into a panoramic image. A1 represents a first non-zero angle, S represents a straight or 0 degree angle, and A2 represents a second non-zero angle. In one embodiment A1 causes the corresponding camera chain module to capture images to the right of the camera, S causes the corresponding camera chain module to capture images straight ahead of the camera, and A2 causes the corresponding camera chain module to capture images to the left the camera, from the perspective of the user behind the camera. In addition to captured images left and right of the camera it should be appreciated that the optical chain modules capture some image portion which is also captured by the adjacent optical chain module. Thus, the OCMs in columns 803, 805 and 807 capture different scenes which, while overlapping, can be stitched together to provide an ultra wide angle panoramic image. The OCMs in each of rows 811, 813, 815, 817, 819, 821, 823 capture different versions of the same scene.

The panoramic camera device 8000 includes multiple optical chain modules corresponding to each of the left, right and center views. Twenty one optical chain modules (seven sets of three) are shown allowing for two optical chain modules per color (R, G, B) plus a seventh multi-color (R, G, B) optical chain module which can be used to support a preview mode of operation. The multi-color optical chain module may include a sensor with a multicolor filter, e.g., a Bayer pattern filter, allowing the single sensor to capture the multiple colors using different portions of the sensor. While the panoramic configuration shown in FIG. 8 is different from that of the non-panoramic camera embodiments previously discussed the exposure control and separate color capture benefits remain the same as those discussed with regard to the other embodiments.

While FIG. 8 illustrates a particular panoramic embodiment, it should be appreciated that embodiments such as those shown in FIGS. 3 and 4 can, and in sometimes are, used to support taking of panoramic pictures. In one such embodiment a prism or angled lens is inserted into one or more optical chain modules, e.g., by rotation, vertical movement, horizontal movement and/or a combination of vertical and horizontal movement of a platter upon which the prism or lens is mounted. The prisms or changes in lens angles change the scene area perceived by one or more optical chain modules allowing the different optical chain modules to capture different views of a scene which can, and in some embodiments are, used to generate a panoramic image, e.g., picture. Thus, camera modules used to capture images corresponding to the same scene which are then combined to generate a combined image can also be used at a different time to capture images corresponding to different views and/or scenes which can then be subsequently combined to form a panoramic image, e.g., photograph.

Accordingly, it should be appreciated that ultra wide angle panoramic images can be generated using multiple optical chain modules of the type previously discussed thereby providing panoramic cameras many of the benefits of large lens without the need for the camera depth, weight and other disadvantages associated with large lenses.

It should be appreciated that because camera chain modules are separated from one another the multi-optical chain module embodiments of the present invention are well suited for stereoscopic image generation and for generating image depth maps. Accordingly the camera devices of the present invention support a wide range of applications and modes of operation and provide significant amounts of image data which can be used to support a wide range of post capture image processing operations.

Having described apparatus and various embodiments, various methods which are supported and used in some embodiments will now be discussed with regard to various flow charts that are included in the present application.

Figure 9:
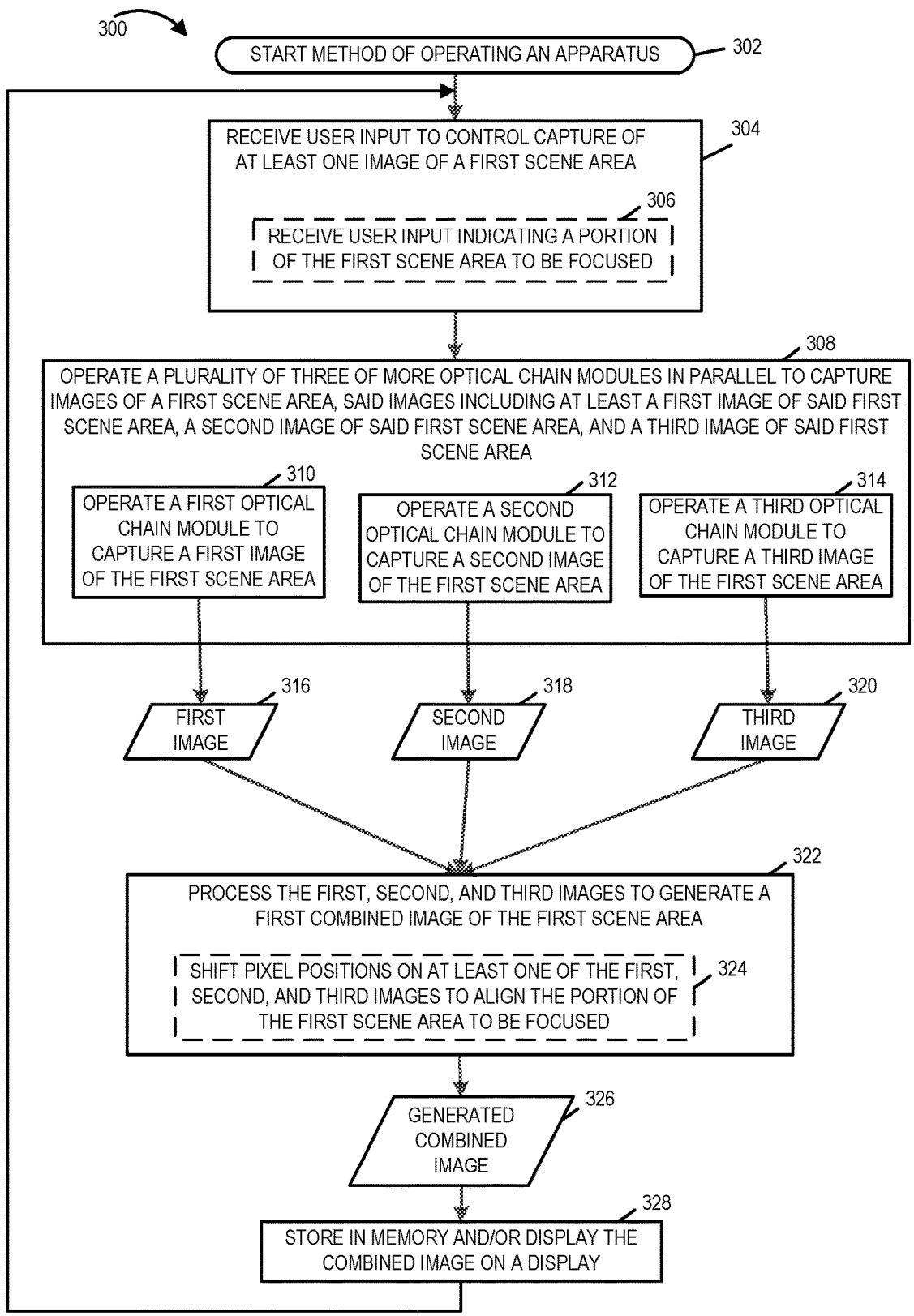
FIG. 9 illustrates an exemplary method of producing at least one image of a first scene area by operating a plurality of optical chain modules in accordance with one embodiment of the present invention.

Method 300 of FIG. 9 illustrates one exemplary method of producing at least one image of a first scene area in accordance with the present invention. The processing steps of the method 300 of FIG. 9 will now be explained in view of the camera device 100 of FIG. 1A.

The method 300 of FIG. 9 starts at start step 302 with the start of the steps of the method being implemented, e.g., on processor 110. Operation proceeds from start step 302 to step 304. In step 304, user input is received to control the capture of at least one image of the first scene area. The user input is received via input device 106 which may be, and in some embodiments is, a button or touch sensitive screen. In optional sub-step 306, the user input may, and in some embodiments does, indicate a portion of the first scene area that is to be focused, e.g., in an image to be captured or a combined image to be generated from two or more captured images. From step 304 processing proceeds to step 308.

In step 308, a plurality of three or more optical chain modules (OCMs), e.g., optical chain modules 130 of FIG. 1A, are operated in parallel to capture images of the first scene area, said images including at least a first image of said first scene area, a second image of said first scene area, and a third image of said first scene area. In some embodiments each one of the first, second and third optical chain modules captures a corresponding one of the first, second and third image respectively. In some embodiments, operating a plurality of three or more optical chain modules in parallel to capture images of the first scene area, said images including at least a first image of said first scene area, a second image of said first scene area, and a third image of said first scene area includes sub-processing steps 310, 312, and 314.

In sub-step 310 a first optical chain module is operated to capture a first image 316 of the first scene area. In most, but not all, embodiments, on capture of the first image 316, the image data and other data such as camera device configuration information associated with the first image is stored in the data/information 120 portion of memory 108 for later processing, output or display. In parallel with the processing of sub-step 310 processing of sub-steps 312 and 314 also occur. In sub-step 312 a second optical chain module is operated to capture a second image 318 of the first scene area. In most, but not all, embodiments on capture of the second image 318, the image data and other data such as camera device configuration information associated with the second image is stored in the data/information 120 portion of memory 108 for later processing, output or display. In sub-step 314 a third optical chain module is operated to capture a third image 320 of the first scene area. In most, but not all, embodiments on capture of the third image 320, the image data and other data such as camera device configuration information associated with the third image is stored in the data/information 120 portion of memory 108 for later processing, output or display. Processing then proceeds from step 308 to step 322.

In some embodiments, each optical chain module of the plurality of optical chain modules includes a lens and the lenses of the plurality of the optical chain modules are arranged along a circle. For example, when there are three optical chain modules, i.e., a first optical chain module, a second optical chain module, and a third optical chain module, the first optical chain module includes a first lens, the second optical chain module includes a second lens, and the third optical chain module includes a third lens. The first, second and third lenses are arranged uniformly along a circle, e.g. on the vertices of an equilateral triangle. In some embodiments the camera device 100 includes a fourth optical chain module including a fourth lens, said fourth lens being positioned in the center of the circle. Each of the first, second, third and fourth lens may be, and in some embodiments of the present invention are, the outer lens of each of their respective optical chain modules and are all positioned in the same plane. More generally, in some embodiments of the present invention, there are a plurality of N optical chain modules each including a lens. N−1 lenses of the plurality of optical chain modules are arranged along a circle with Nth lens being positioned in the center of the circle. FIG. 1B illustrates and example of a camera device 100 with seven optical chain modules which include 7 outer lenses shown as circles, i.e., OCM1, OCM2, OCM3, OCM4, OCM5, OCM6, and OCM7. The outer lens of optical chain modules OCM 1, OCM2, OCM3, OCM4, OCM5, and OCM6 are arranged along a circle and the outer lens of optical chain module OCM7 is positioned in the center of the circle.

In some embodiments of the present invention, the first optical chain module includes in addition to the first lens an image sensor referred to as a first image sensor. In some embodiments of the present invention, the second optical chain module includes an image sensor referred to as a second image sensor. In some embodiments of the present invention, the third optical chain includes an image sensor referred to as a third image sensor. In some embodiments of the present invention the plurality of lenses of the plurality of optical chain modules are mounted in a cell phone housing with the plurality of lenses oriented in the same direction and in the same plane of the housing. For example in the case of three optical chain modules, in some embodiments of the present invention, the first, second and third lenses of the first, second, and third optical chain modules respectively are mounted in a cell phone housing and are oriented in the same direction and in the same plane of the housing.

In step 322, said first, second, and third images are processed by processor 110 to generate a first combined image 326 of said first scene area. In some embodiments, including those embodiments of the present invention in which user input is received indicating a portion of the first scene area to be focused in the combined image, step 322 may, and in some embodiments does, include sub-step 324 wherein pixel positions on at least one of said first, second, and third images is shifted prior to generating said first combined image to align the portion of the first scene to be focused. Processing then proceeds to step 328 where the generated combined image is stored in data/information 120 of memory 108, e.g., for potential later display, output from the camera device, and/or additional processing and/or displayed on display 102 of camera device 100.

In some embodiments, processing step 322 and/or sub-step 324 are performed on an external device such as a computer. In such cases, the first, second and third images are outputted from the camera device 100 via transceiver 114 to the external computer for processing to generate the first combined image 326. The first combined image may then be stored in memory associated with the external device and/or displayed on a display associated with the external computer. In some embodiments of the present invention, the first combined image of the first scene area includes the same or fewer pixel values than either of said first, second or third images.

From step 328 processing proceeds to step 304 where processing continues and the method is repeated.

In some embodiments of the present invention, the size of the diameter of the first, second and third lens of the first, second, and third optical chain modules respectively are the same and the sensors of the first, second and third optical chain modules have the same number of pixels. In other embodiments of the present invention, one or more optical chain modules may, and in some embodiments do, have lenses with different diameter sizes and/or sensors with different numbers of pixels. In some embodiments of the present invention, the first, second and third lenses of the first, second and third optical chain modules respectively, are less than 2 cm in diameter and each of the first, second and third image sensors of the first, second and third optical chain modules support at least 8 Mpixels. In some embodiments of the present invention, the first and second lenses are each less than 2 cm in diameter and each of the first and second image sensors support at least 5 Mpixels. However in many embodiments the image sensors support 8 Mpixels or even more and in some embodiments the lenses are larger than 2 cm. Various combinations of lens and sensors may be used with a variety of lens sizes being used for different optical chains in some embodiments. In addition different optical chains may use lenses with different shapes, e.g., while the lens may be a spherical lens the perimeter of the lens may be cut into one of a variety of shapes. In one embodiment, lenses of different optical chain modules are shaped and arranged to minimize gaps between lenses. Such an approach can have the advantage of resulting in a smoother blur with regard to portions of captured images which are out of focus when combining images captured by different optical chain modules and result in an overall image which more closely approximates what might be expected had a single large lens been used to capture the scene shown in the combined image.

In accordance with some aspects of the present invention, the diameter size and arrangement of the lenses of the plurality of optical modules may and do vary. Similarly the number of pixels supported by the sensors of each of the plurality of optical modules may also vary for example depending on the desired resolution of the optical chain module.

In some embodiments, different shifts are used for different portions of the scene to create a single composite image. In some embodiments, the generated combined image is a panoramic image.

In various embodiments, the optical chain modules are independently focused to the same focal distance. In some embodiments, the optical chain modules are focused together. In some such embodiments, the optical chain modules are focused together by moving a platter on which lenses corresponding to different optical chains are mounted.

Figure 10:
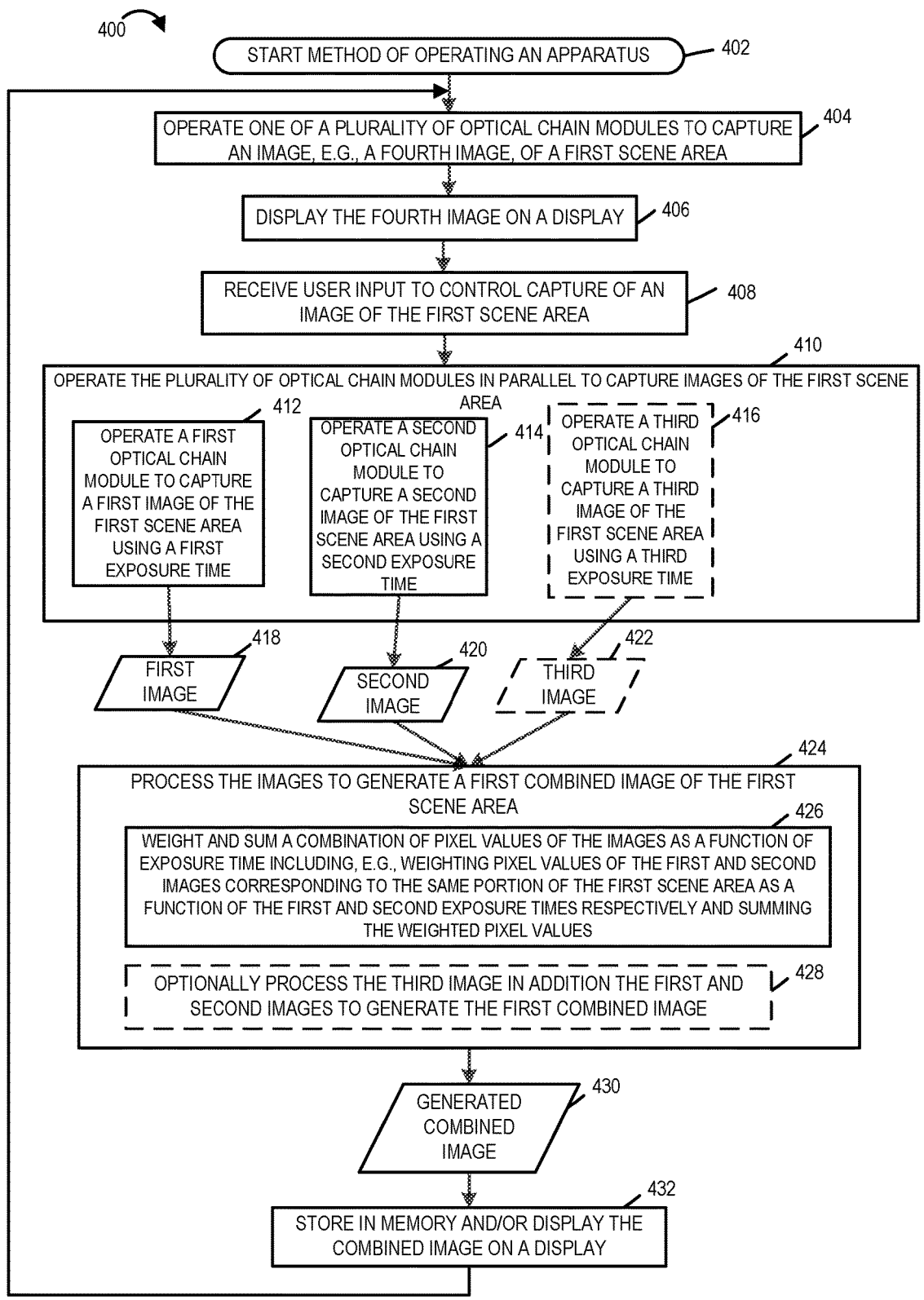
FIG. 10 illustrates an exemplary method of producing at least one image of a first scene area with an enhanced sensor dynamic range by operating two or more optical chain modules in accordance with one embodiment of the present invention.

Method 400 of FIG. 10 illustrates an embodiment of a method of producing at least one image of a first scene area in accordance with the present invention. The method 400 achieves enhanced sensor dynamic range by combining images captured through the operation of two or more optical chain modules using different exposure times. The processing steps of the method 400 of FIG. 10 will now be explained in view of the camera device 100 of FIG. 1A. For ease of explanation of the method 400, it will be assumed that the plurality of optical chain module 130 of camera device 100 of FIG. 1A includes two optical chain modules and in some embodiments an optional third optical chain module which will be referred to as a first, second and third optical chain module respectively.

The method 400 of FIG. 10 starts at start step 402 with the start of the steps of the method being implemented, e.g., on processor 110. Operation proceeds from start step 402 to step 404. In step 404, one of a plurality of optical chain modules of the camera device is operated to capture an image which will be referred to herein as a fourth image of the first scene. For example, one of said first, second or optional third optical chain modules may be, and in some embodiments is, operated to capture the fourth image. This fourth image is captured prior to capturing the first, second or third images which will be discussed in connection with step 410 below.

Processing then proceeds to step 406 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 406 to step 408.

In step 408, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 408 processing proceeds to step 410 where the plurality of optical chain modules 130 are operated in parallel to capture images of the first scene area.

Step 410 includes sub-steps 412, 414, and optional sub-step 416. In sub-step 412, a first optical chain module is operated to capture a first image 418 of the first scene area using a first exposure time. In sub-step 414, a second optical chain module is operated to capture a second image 420 of the first scene area using a second exposure time, at least said first and said second exposure times being of different duration but overlapping in time. In some embodiments, an optional sub-step 416 is performed wherein a third optical chain module is operated to capture a third image 422 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area. Sub-steps 412, 414, and optional sub-step 416 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of images.

In some embodiments, in step 404 the operation of one of the first, second and third optical chain modules to capture the fourth image of the first scene area uses a fourth exposure time different from said first, second and third exposure times. Once again step 404 occurs prior to the step 410 as the fourth image is displayed on the display 102 so the user can utilize the displayed image to target the scene area to be captured by the first, second and optional third images.

Operation of the method proceeds from step 410 to step 424. In step 424 the captured images, that is the first and second images, are processed to generate a first combined image of the first scene area 430. In those embodiments in which the optional third image was captured optional sub-step 428 is performed wherein the third image in addition to the first and second image is also processed to generate the first combined image of the scene area 430.

In some embodiments step 424 is accomplished using sub-step 426 wherein said processing of said first and second images and optionally said third image to generate a first combined image of the first scene area includes combining weighted pixel values of said first image, second image, and optional third image.

The weighting of the pixel values may, and in some embodiments is a function of exposure times. Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 424 to step 432. In step 432, the generated first combined image of the first scene area is stored in data/information 120 of memory 108 and/or displayed on the display 102, e.g., touch sensitive display of the camera device 100.

Operation proceeds from step 432 to step 404 where processing continues and the method is repeated.

In some embodiments of the present invention step 424 is performed on an external device such as a computer that is coupled to the camera device 100 via the transceiver interface 114. In such embodiments the first, second and optional third images are transmitted to the external device via the transceiver interface 114 where the step 424 is performed. Step 432 is then typically performed by the external device with the combined image 430 being stored in memory associated with the external device and/or displayed on a display associated with the external device.

Method 400 may be, and in some embodiments is, implemented on a variety of devices including for example, a camera or a mobile device such as a mobile cellular telephone or a tablet.

In some embodiments, at least some of the optical chain modules include single color filters. For example, in one embodiment, the first optical chain module includes a red filter, the second optical chain module includes a green filter, the third optical chain module includes a blue filter. In some such embodiments, at least two optical chain modules are provided for each color for which a single color filter is used. For example in one embodiment, the plurality of optical chains modules include two optical chain modules with a red filter, two optical chain modules with a green filter and two optical chain modules with a blue filter. In some embodiments, different optical chain modules having single color filters corresponding to the same color have different exposure times. In some embodiments, the combined image is generated using captured images of the first scene area from: (i) an optical chain module including a first color filter and a using first exposure time, (ii) an optical chain including a second color filter and using a first exposure time, (iii) an optical chain including a third color filter and using a first exposure time, (iv) an optical chain module including a first color filter and a using second exposure time, (ii) an optical chain including a second color filter and using a second exposure time, (iii) an optical chain including a third color filter and using a second exposure time. In some such embodiments, the first color is red; the second color is green; and the third color is blue; the first exposure time is a short exposure time and the second exposure time is a long exposure time.

In some embodiments, at least some optical chain modules do not include any color filters.

Figure 11:
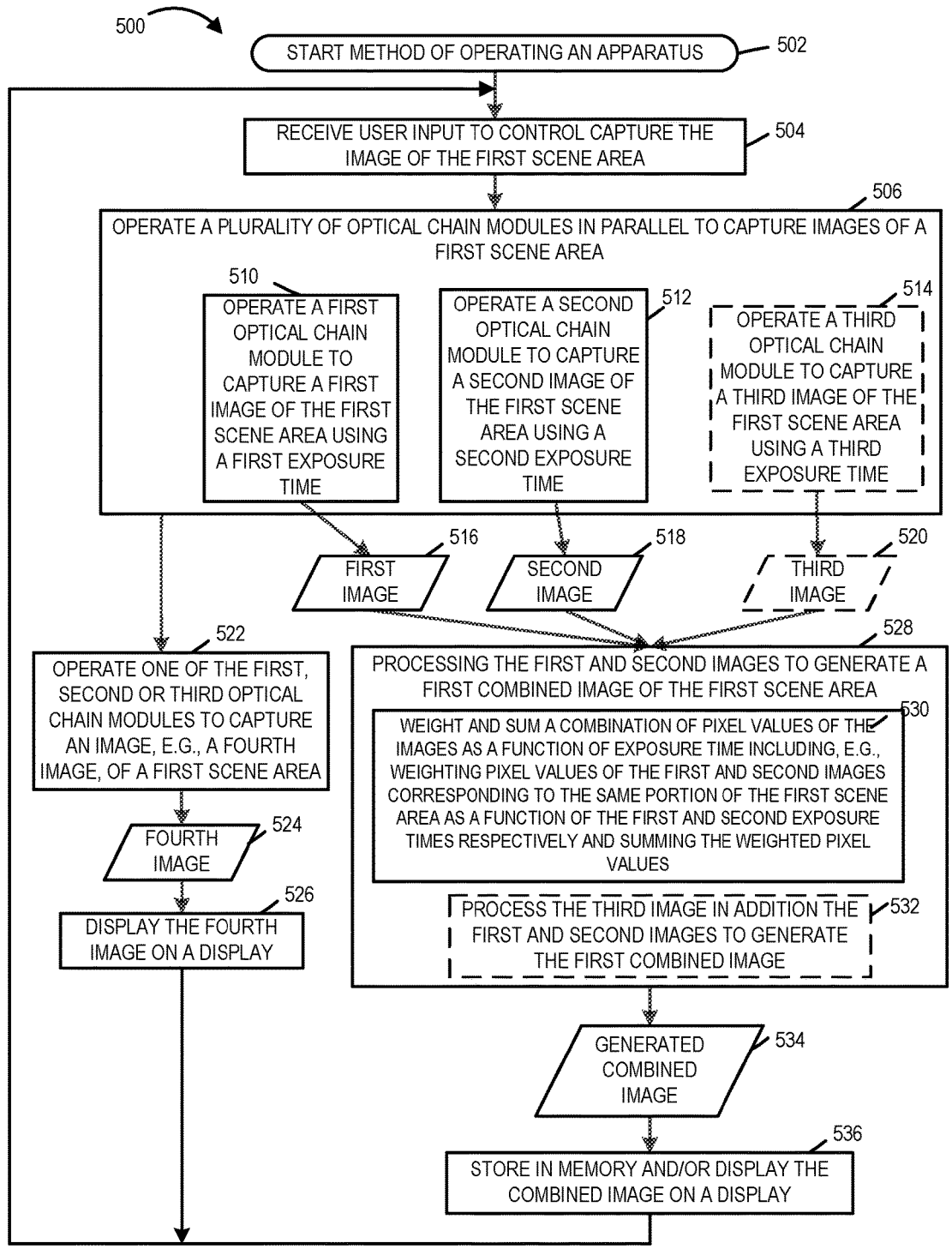
FIG. 11 illustrates an exemplary method of producing at least one image of a first scene area with enhanced sensor dynamic range by operating two or more optical chain modules in accordance with one embodiment of the present invention.

Method 500 of FIG. 11 illustrates an embodiment of a method of producing at least one image of a first scene area in accordance with the present invention. The method 500 achieves enhanced sensor dynamic range by combining images captured through the operation of two or more optical chain modules using different exposure times. The processing steps of the method 500 of FIG. 11 will now be explained in view of the camera device 100 of FIG. 1A. For ease of explanation of the method 500, it will be assumed that the plurality of optical chain module 130 of camera device 100 of FIG. 1A includes two optical chain modules and in some embodiments an optional third optical chain module which will be referred to as a first, second and third optical chain module respectively. Method 500 is similar to method 400 but implements the capture of the fourth image and display of the fourth image after the first, second and third images have been captured. In this way the user of the device is able to see on the display the first scene area that was captured in the first, second and optional third image and which will be processed to generate a combined image.

The method 500 of FIG. 11 starts at start step 502 with the start of the steps of the method being implemented, e.g., on processor 110. Operation proceeds from start step 502 to step 504. In step 504, user input is received to control the capture of the image of the first scene area. The user input is received via input device 106 which may be, and in some embodiments is, a button or touch sensitive screen. From step 504 processing proceeds to step 506 where the plurality of optical chain modules 130 are operated in parallel to capture images of the first scene area.

Step 506 includes sub-steps 510, 512, and optional sub-step 514. In sub-step 510, a first optical chain module is operated to capture a first image 516 of the first scene area using a first exposure time. In sub-step 512, a second optical chain module is operated to capture a second image 518 of the first scene area using a second exposure time, at least said first and said second exposure times being of different duration but overlapping in time. In some embodiments, an optional sub-step 514 is performed wherein a third optical chain module is operated to capture a third image 520 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area and thereby enhancing the effective sensor dynamic range of the camera device. Sub-steps 510, 512, and optional sub-step 514 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of the images. Operation proceeds from step 506 to steps 522 and 528.

In step 522, one of said first, second and optional third optical chain modules is operated to capture a fourth image 524 of the first scene area after capturing one of said first, second and third images. While in this particular embodiment the fourth image is captured after the first, second and third images, in some embodiments one of the first, second and third images is used as the fourth image. In some embodiments a fourth exposure time different from said first, second and third exposure times is used to capture the fourth image 524. The fourth image may be, and in some embodiments is stored in data/information 120 of memory 108 for potential later use, output or display. Processing proceeds from step 522 to step 526. In step 526, the fourth image of the first scene area is displayed on display 102 of the camera device, e.g., a touch sensitive screen so that a user of the camera device can see an image of the first scene area that was captured by the first, second and optional third images. Processing proceeds from step 526 to step 504 where processing associated with the method continues as the method is repeated.

Returning to step 528, in step 528 the first and second images are processed to generate a first combined image of the first scene area 534. In those embodiments in which the optional third image was captured optional sub-step 532 is performed wherein the third image in addition to the first and second images is also processed to generate the first combined image of the scene area 534.

In some embodiments step 528 is accomplished using sub-step 530 wherein said processing of said first and second images and optionally said third image to generate a first combined image of the first scene area includes combining weighted pixel values of said first image, second image, and optional third image. The weighting of the pixel values may, and in some embodiments is a function of exposure times. Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 528 to step 536. In step 536, the generated first combined image of the first scene area is stored in data/information 120 of memory 108 and/or displayed on the display 102, e.g., the touch sensitive display of the camera device 100.

Operation proceeds from step 536 to step 504 where processing continues and the method is repeated.

In some embodiments of the present invention step 528 is performed on an external device such as a computer that is coupled to the camera device 100 via the transceiver interface 114. In such embodiments the first, second and optional third images are transmitted to the external device via the transceiver interface 114 where the step 528 is performed. Step 536 is then typically performed by the external device with the combined image 534 being stored in memory associated with the external device and/or displayed on a display associated with the external device.

Method 500 may be, and in some embodiments, is implemented on a variety of devices including for example, a camera or a mobile device such as a mobile cellular telephone or a tablet.

The use of an external computer to perform some or a part of the processing of the first, second and optional third images allows for the use of computational more complex algorithms as the external computer may be, and in some embodiments does have, a computationally more powerful processing capability than the camera device 100.

In some embodiments, at least some of the optical chain modules include single color filters. For example, in one embodiment, the first optical chain module includes a red filter, the second optical chain module includes a green filter, the third optical chain module includes a blue filter. In some such embodiments, at least two optical chain modules are provided for each color for which a single color filter is used. For example in one embodiment, the plurality of optical chains modules include two optical chain modules with a red filter, two optical chain modules with a green filter and two optical chain modules with a blue filter. In some embodiments, different optical chain modules having single color filters corresponding to the same color have different exposure times. In some embodiments, the combined image is generated using captured images of the first scene area from: (i) an optical chain module including a first color filter and a using first exposure time, (ii) an optical chain including a second color filter and using a first exposure time, (iii) an optical chain including a third color filter and using a first exposure time, (iv) an optical chain module including a first color filter and a using second exposure time, (ii) an optical chain including a second color filter and using a second exposure time, (iii) an optical chain including a third color filter and using a second exposure time. In some such embodiments, the first color is red; the second color is green; and the third color is blue; the first exposure time is a short exposure time and the second exposure time is a long exposure time.

In some embodiments, at least some optical chain modules do not include any color filters. For example, in one particular embodiment, optical chain modules OCM 171 and OCM 173 do not include color filters. However in other embodiments, OCM 171 and OCM 173 each include a color filter.

Figure 12:
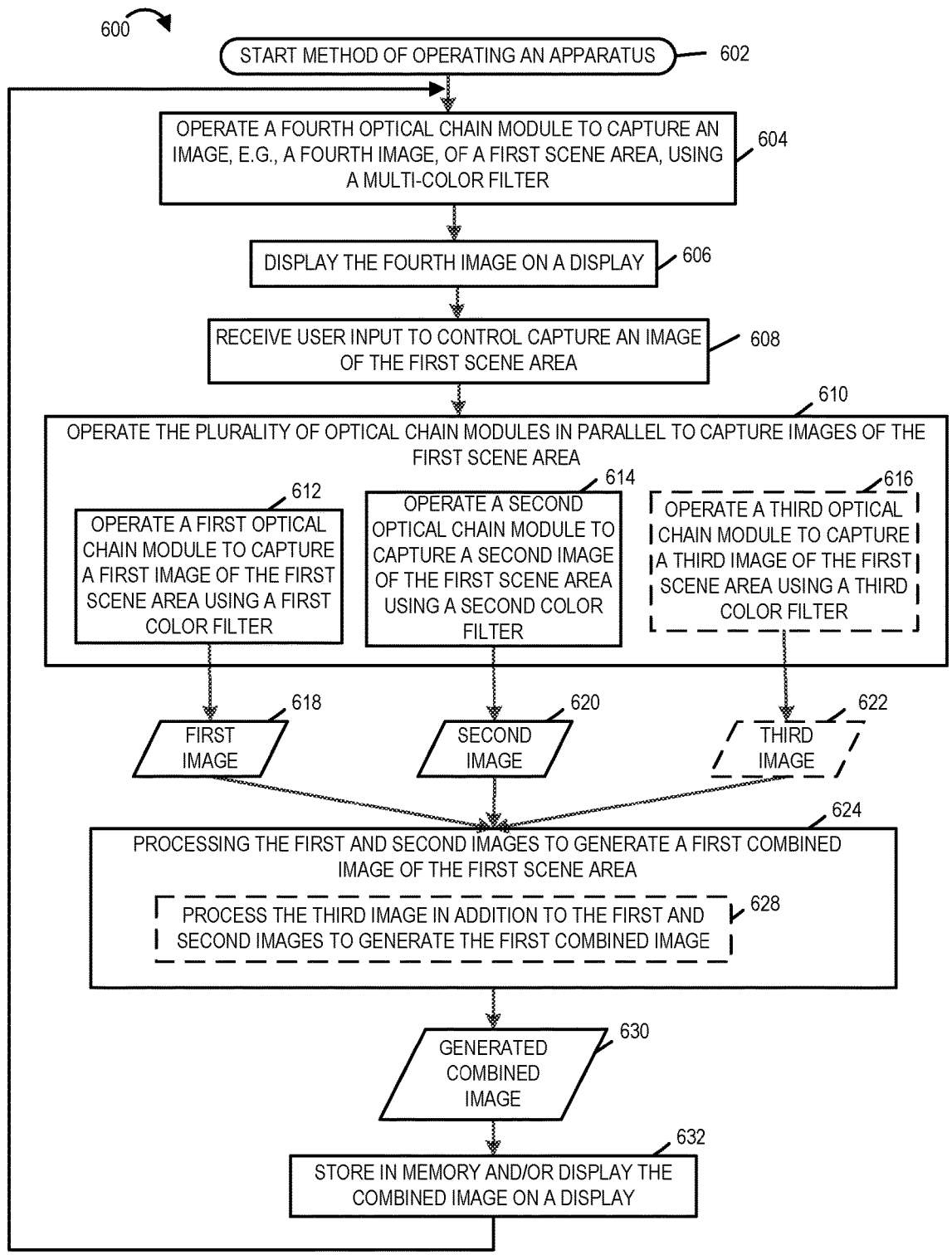
FIG. 12 illustrates an exemplary method of producing at least one image of a first scene area by operating two or more optical chain modules using color filters in accordance with one embodiment of the present invention.

Method 600 of FIG. 12 illustrates an embodiment of a method of producing at least one color image of a first scene area in accordance with the present invention. The method 600 uses color filters in connection with combining two or more images of a first scene area to obtain a color image of the first scene area. The processing steps of the method 600 of FIG. 12 will now be explained in view of the camera device 100 of FIG. 1A. For ease of explanation of the method 600, it will be assumed that the plurality of optical chain module 130 of camera device 100 of FIG. 1A includes two optical chain modules and in some embodiments an optional third and/or fourth optical chain module which will be referred to as a first, second, third and fourth optical chain module respectively.

The method 600 of FIG. 12 starts at start step 602 with the start of the steps of the method being implemented, e.g., on processor 110. Operation proceeds from start step 602 to step 604. In optional step 604, a fourth optical chain module of the camera device is operated to capture an image, e.g., a image referred to herein as a fourth image of a first scene area using a multi-color filter. This fourth image is captured prior to capturing the first, second or third images which will be discussed in connection with step 610 below.

Processing then proceeds to optional step 606 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 606 to step 608.

In step 608, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 608 processing proceeds to step 610 where the plurality of optical chain modules 130 are operated in parallel to capture images of the first scene area.

Step 610 includes sub-steps 612, 614, and optional sub-step 616. In sub-step 612, a first optical chain module is operated to capture a first image 618 of the first scene area using a first color filter. In sub-step 614, a second optical chain module is operated to capture a second image 620 of the first scene area using a second color filter, said first and said second color filters corresponding to a first color and a second color respectively. Said first and said second colors being different colors. In some embodiments, said first and second color filters are single color filters which correspond to said first and second colors, respectively. In some embodiments, an optional sub-step 616 is performed wherein a third optical chain module is operated to capture a third image 622 of the first scene area using a third color filter. In some embodiments, the third color filter corresponds to a color that is different from said first and second colors. In some embodiments the third color filter is a single color filter which corresponds to said third color. Additional optical chain modules may be, and in some embodiments are, used to capture additional images of the first scene area with the additional optical chain modules using the same or different color filters as the first, second or third color filters so as to obtain additional image data for the first scene area. Sub-steps 612, 614, and optional sub-step 616 are performed in parallel so that multiple images of the first scene area are captured in parallel with different color filters. The first, second and optional third captured images may be, and in some embodiments are, stored in data/information 120 of memory section 108 to be available for later use such as for example in later steps of the method for generating a combined image of the first scene area, or for display or outputting of images. In some embodiments of the present invention, the first optical chain module includes a first lens and a first image sensor and the second optical module includes a second lens and a second image sensor and the optional third optical chain module includes a third lens and a third image sensor. In some embodiments, said first and said second image sensors are of the same resolution. In some embodiments of the present invention, said optional third image sensor of said third optical chain module has the same resolution as the first and second image sensors. In some embodiments of the present invention, the fourth optical chain module includes a fourth lens and a fourth image sensor. In some embodiments of the present invention the fourth image sensor is of the same resolution as the first and second image sensor. In some embodiments of the present invention, the first, second and third lenses of the first, second and third optical chain modules are arranged in a circle, and the fourth lens of the fourth optical chain is arranged in the center of the circle.

Operation of the method proceeds from step 610 to step 624. In step 624 the captured images, that is the first and second images, are processed to generate a first combined image of the first scene area 630. In those embodiments in which the optional third image was captured optional sub-step 628 is performed wherein the third image in addition to the first and second images is also processed to generate the first combined image of the scene area 630. In some embodiments the fourth image of the first scene area is also processed with the first, second and third images to generate the first combined image of the first scene area.

Operation proceeds from step 624 to step 632. In step 632, the generated first combined image of the first scene area is stored in data/information 120 of memory 108 and/or displayed on the display 102, e.g., a touch sensitive display of the camera device 100.

Operation proceeds from step 632 to step 604 where processing continues and the method is repeated.

In some embodiments of the present invention step 624 is performed on an external device such as a computer that is coupled to the camera device 100 via the transceiver interface 114. In such embodiments the first, second and optional third images are transmitted to the external device via the transceiver interface 114 where the step 624 is performed. Step 632 is then typically performed by the external device with the combined image 630 being stored in memory associated with the external device and/or displayed on a display associated with the external device.

Method 600 may be, and in some embodiments, is implemented on a variety of devices including for example, a camera or a mobile device such as a mobile cellular telephone or a tablet.

In some embodiments of the present invention, each image is presented as it is captured on the display or in the case of a combined image when said image has been generated.

In some embodiments of the present invention, each of the captured images, e.g., the first, second, third, and fourth images may be, and is, displayed on the display 102 of the camera device 100 as it is captured along with one or more combined images that are formed by processing and/or combining the first, second, third and/or fourth images. In some embodiments of the present invention, each of the images may be, is shown, in a separate portion of the display with the size of the image being adjusted so that each image displayed is shown in its entirety. In some embodiments of the present invention, a caption is automatically placed under each image as it displayed on the screen. In some embodiments of the present invention, the caption includes the number of the image or an indication that it is a combined image, e.g., image 1, image 2, image 3, image 4, combined image from image 1, 2, 3, and 4. In some embodiments of the present invention, each image is presented as it is captured on the display or in the case of a combined image when said image has been generated. The images may be arranged in a variety of ways on the display 102 after capture and the aforementioned embodiments are only meant to be exemplary in nature.

In some embodiments of the present invention, the image generated by combining the images captured from two or more of the optical chain modules is displayed for targeting purposes so that the user may provide input to control the capture of the image of the scene area and/or the object in the scene upon which the combined image should be focused.

Figure 13:
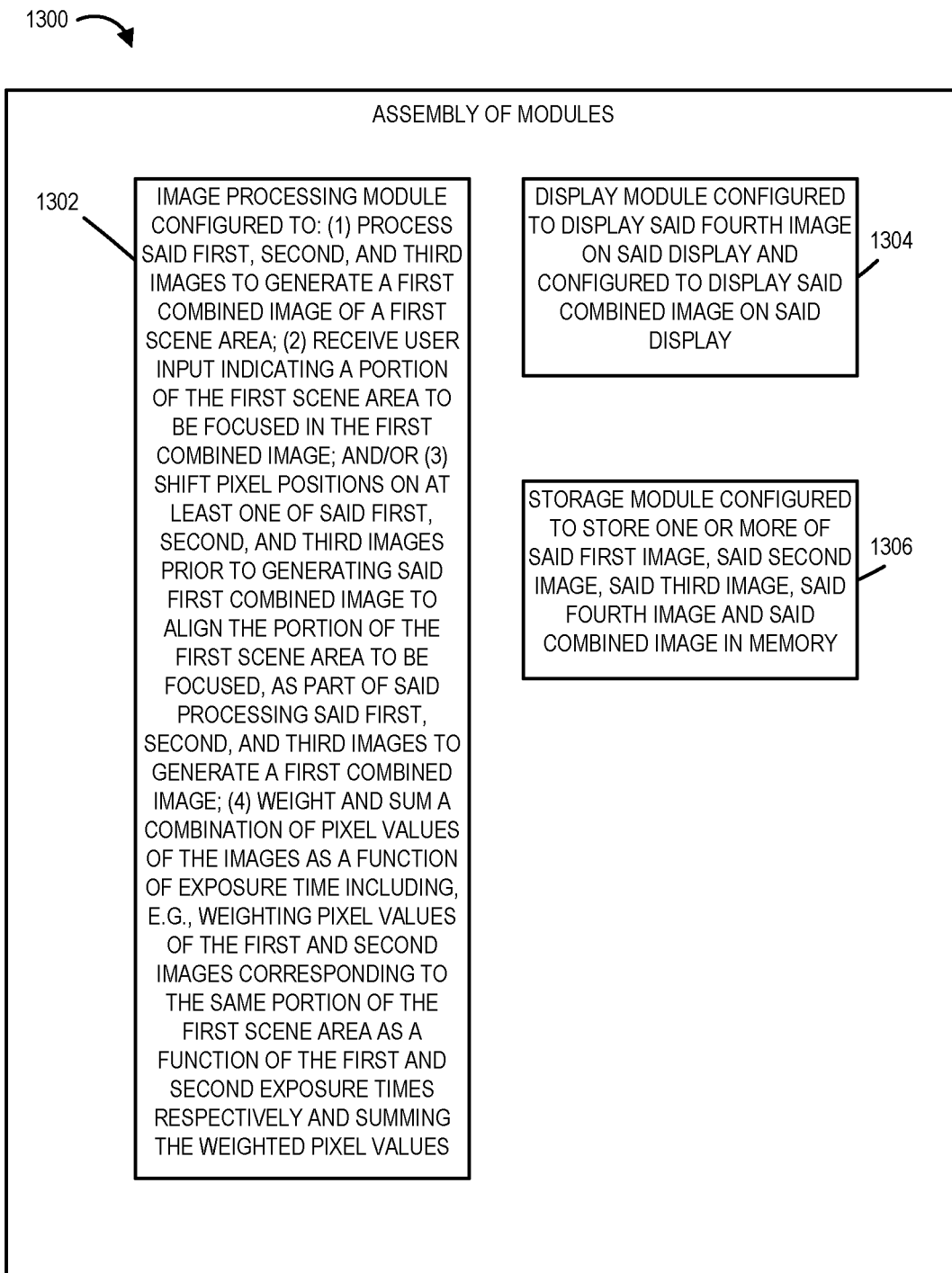
FIG. 13 illustrates an exemplary assembly of modules, which may, and in some embodiments is, part of an apparatus which implements one or more methods of the invention, for performing various image and data processing functions in accordance with one or more exemplary embodiments of the invention.

The FIG. 13 assembly of modules 1300 may, and in some embodiments is, used to process data for example first, second, third and fourth images and associated data, and storing and displaying images. Assembly of modules 1300 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18, and/or camera device 1905 of FIG. 19, in accordance with an exemplary embodiment.

Figure 15:
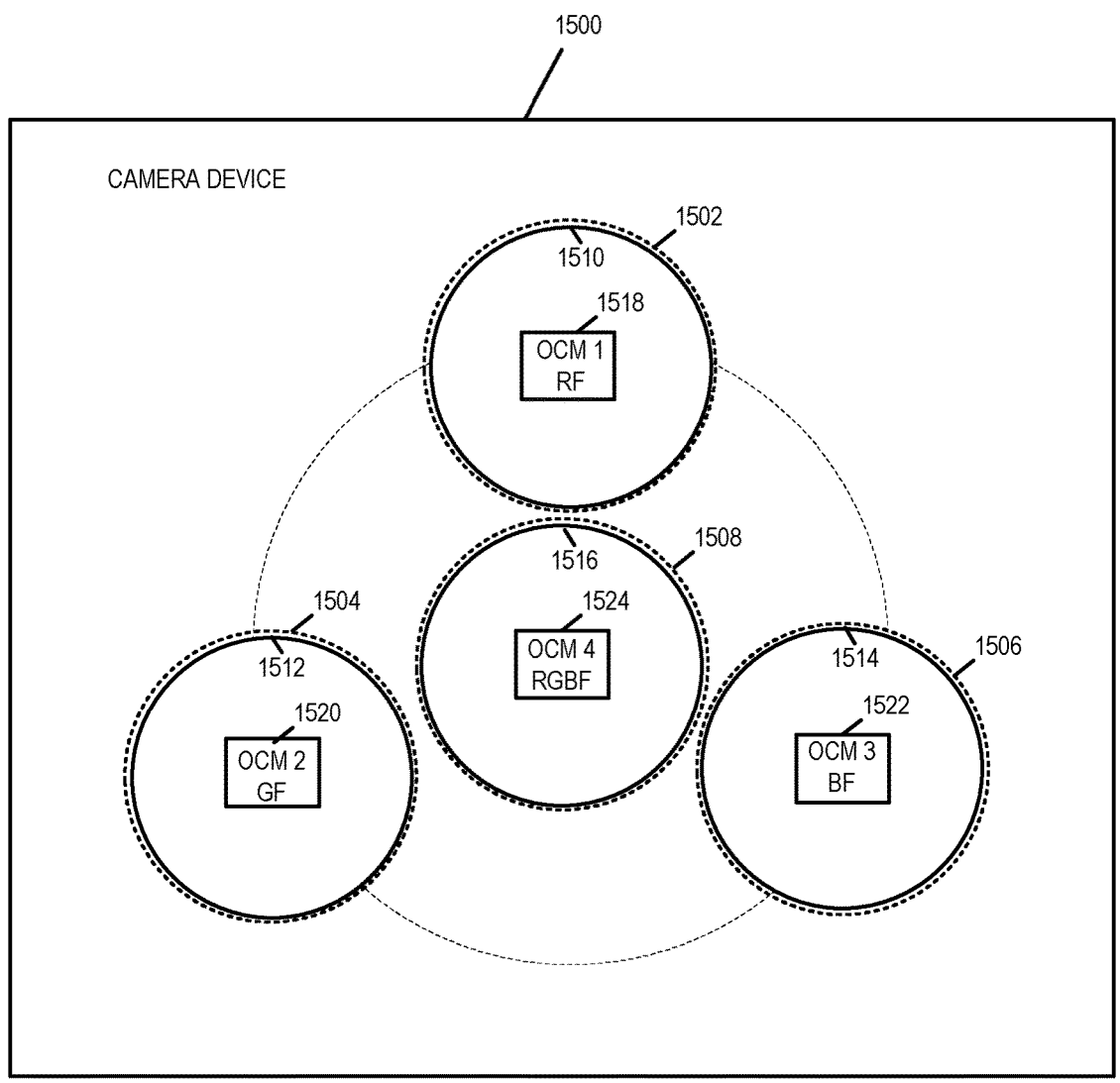
FIG. 15 illustrates a frontal view of an apparatus implemented in accordance with one embodiment of the present invention which incorporates multiple optical chain modules, e.g., one for each of red, green and blue and one for all three colors.
Figure 16:
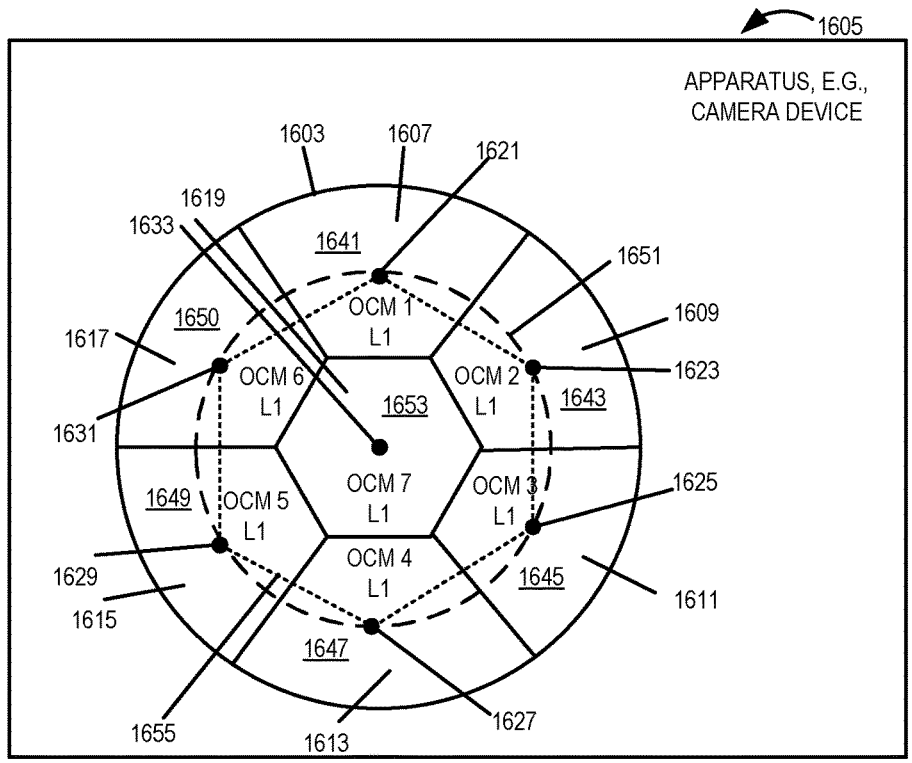
FIG. 16 illustrates a frontal view of the outer lens assembly of an apparatus implemented in accordance with one embodiment of the present invention where the apparatus incorporates multiple optical chain modules and outer lenses configured with little or no gaps between the lenses.
Figure 17:
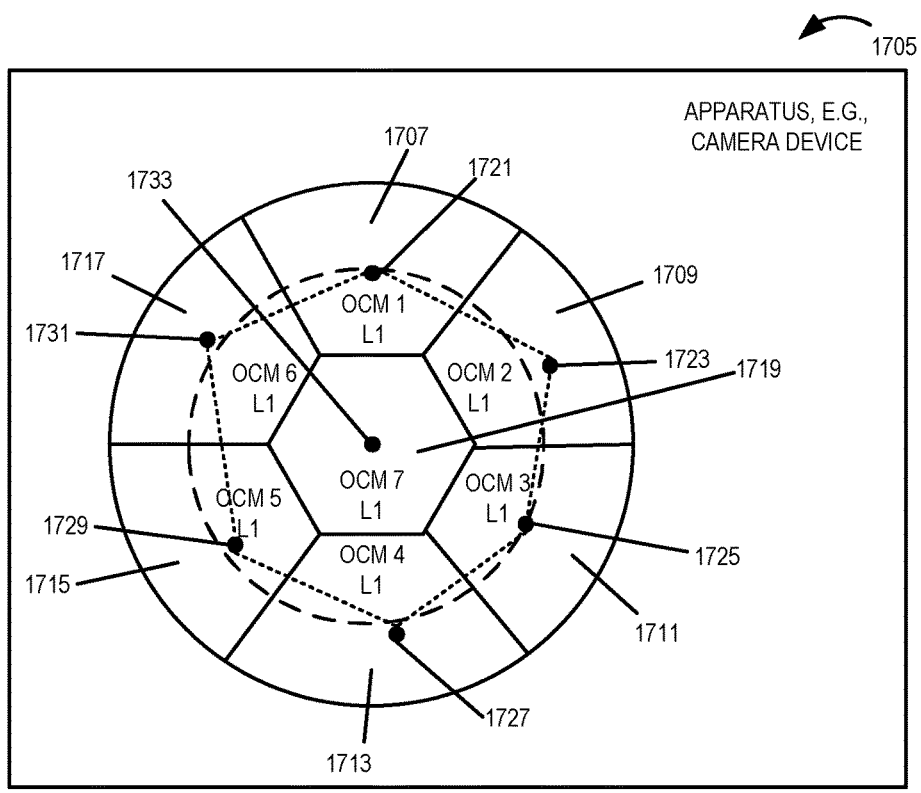
FIG. 17 illustrates a frontal view of the outer lenses of a lens assembly implemented in accordance with one embodiment of the present invention where the apparatus incorporates multiple optical chain modules with lenses configured with little or no gaps between the lenses but non-uniform spacing between the optical centers of at least some of the lenses.
Figure 18:
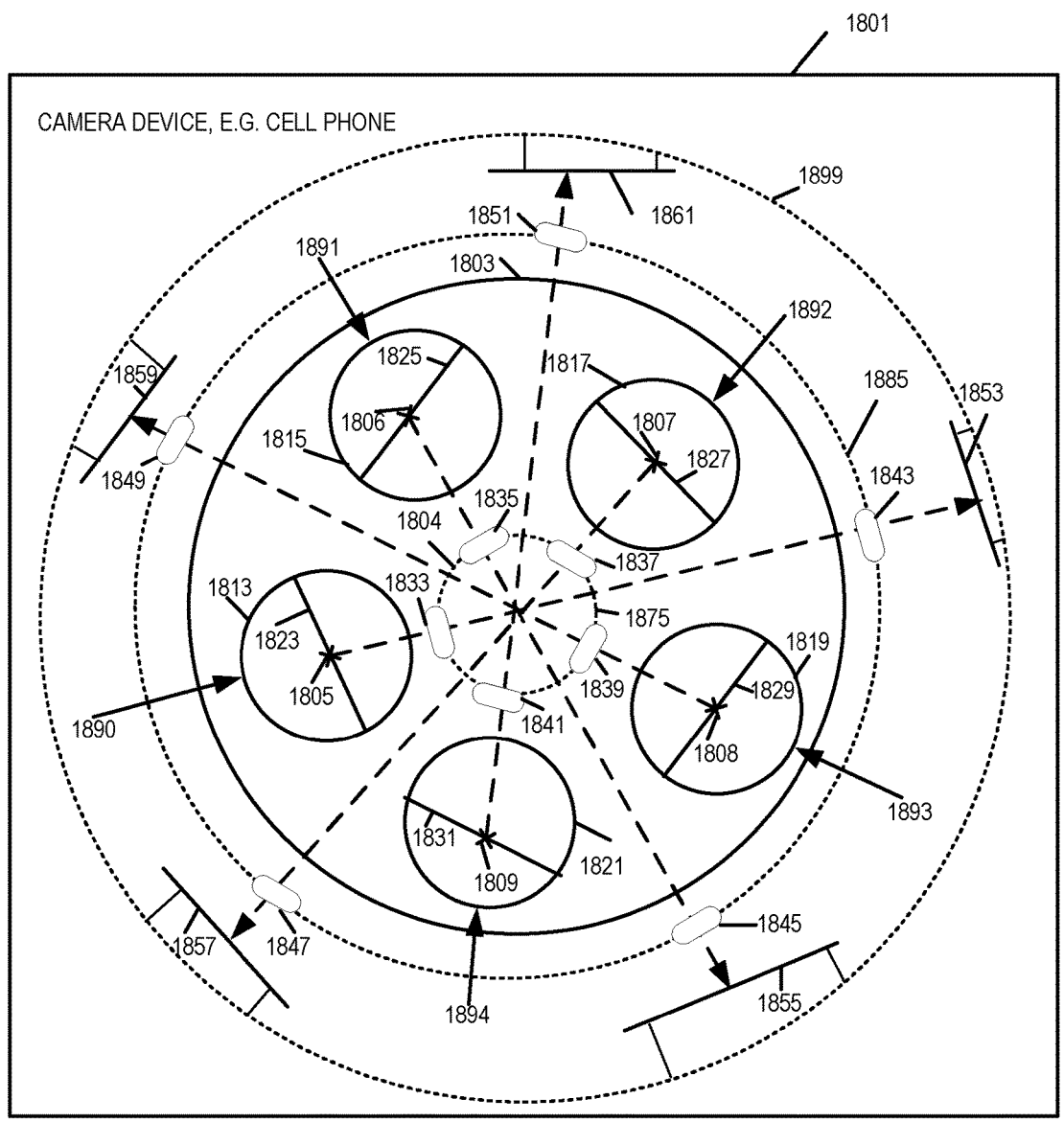
FIG. 18 illustrates a camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.
Figure 19:
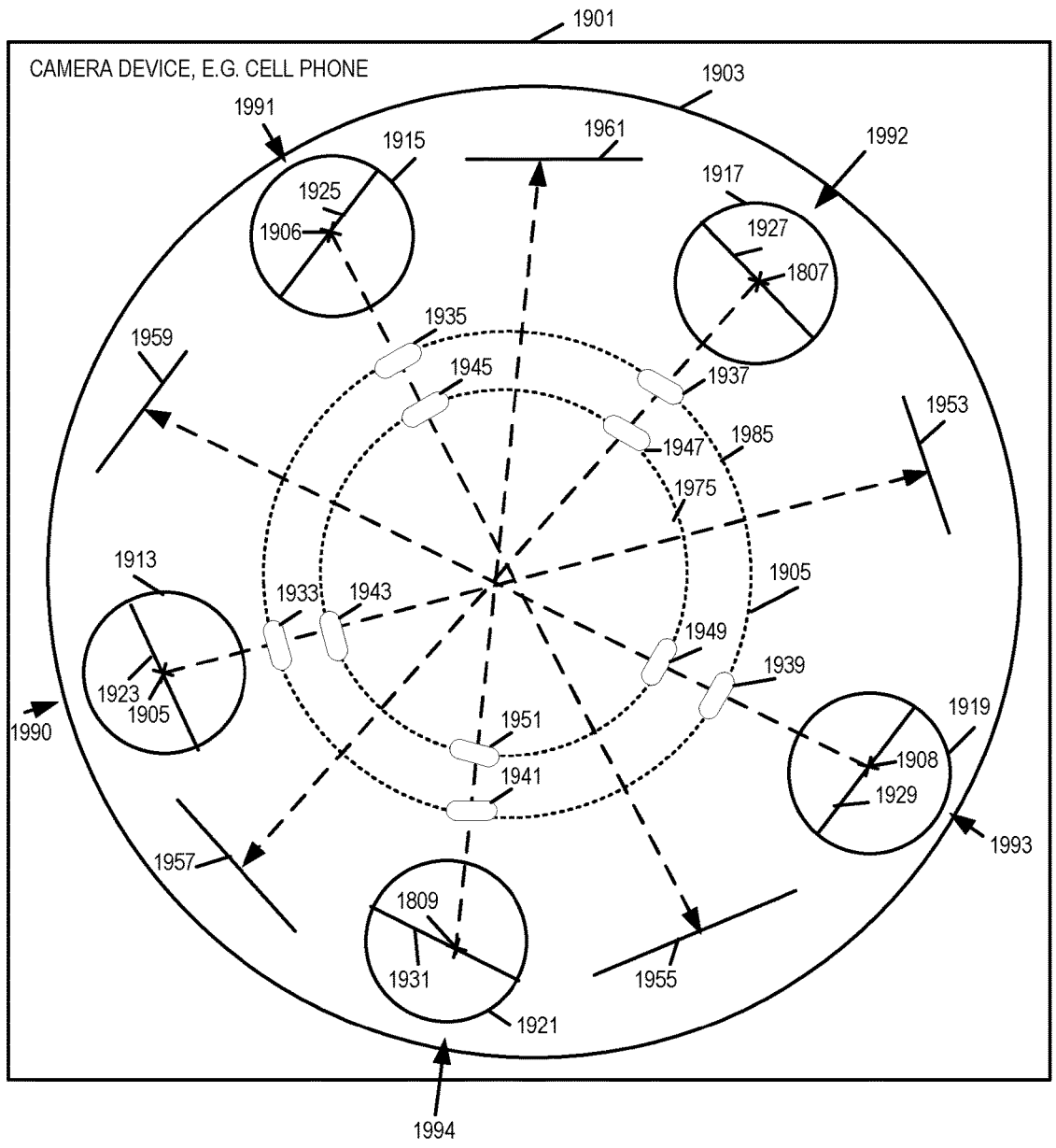
FIG. 19 illustrates another camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

In some embodiments, assembly of modules 1300 is included in memory in an exemplary camera device, e.g., memory 108 of camera device 100 of FIG. 1A, memory 213 of camera device 200 of FIG. 2, memory 73 of camera device 60 of FIG. 4, memory of camera device 1500 of FIG. 15, memory of camera device 1605 of FIG. 16, memory in camera device 1705 of FIG. 17, memory in camera device 1801 of FIG. 18, and/or memory of camera device 1901 of FIG. 19. For example assembly of modules 1300 may be included as part of assembly of modules 118 of memory 108 of camera device 100 of FIG. 1.

In some embodiments, assembly of modules 1300 is implemented in hardware. In some embodiments, assembly of modules 1300 is implemented as software. In some embodiments, assembly of modules 1300 is implemented as a combination of hardware and software.

In some embodiments, all or part of assembly of modules 1300 may be included as part of a processor, e.g., as part of processor 110 of camera device 100 of FIG. 1A.

In the FIG. 13 example, the assembly of modules 1300 includes a image processing module 1302, a display module 1304, and a storage module 1306. The modules implemented one or more of the previously discussed image processing steps and may include a variety of sub-modules, e.g., an individual circuit, for performing an individual step of method or methods being implemented. Image processing module 1302 is configured to: (1) process said first, second and third images to generate a first combined image of a first scene area, (2) receive user input indicating a portion of the first scene area to be focused in the first combined image; and/or (3) shift pixel positions on at least one of said first second and third images prior to generating said first combined image to align the portion of the first scene area to be focused, as part of processing said first, second, and third images to generate a first combined image; and (4) weight and sum a combination of pixel values of the first and second images corresponding to the same portion of the first scene area as a function of the first and second exposure times respectively and summing the weighted pixel values. In some embodiments image processing module 1302 is further configured to process said third image to generate said first combined image of said first scene area from the third image in addition to said first and second images.

Display module 1304 is configured to display said fourth image on said display and configured to display said combined image on said display. Storage module 306 is configured to store or more or said first image, said second image, said third image, said fourth image and said combined image in memory.

Figure 14:
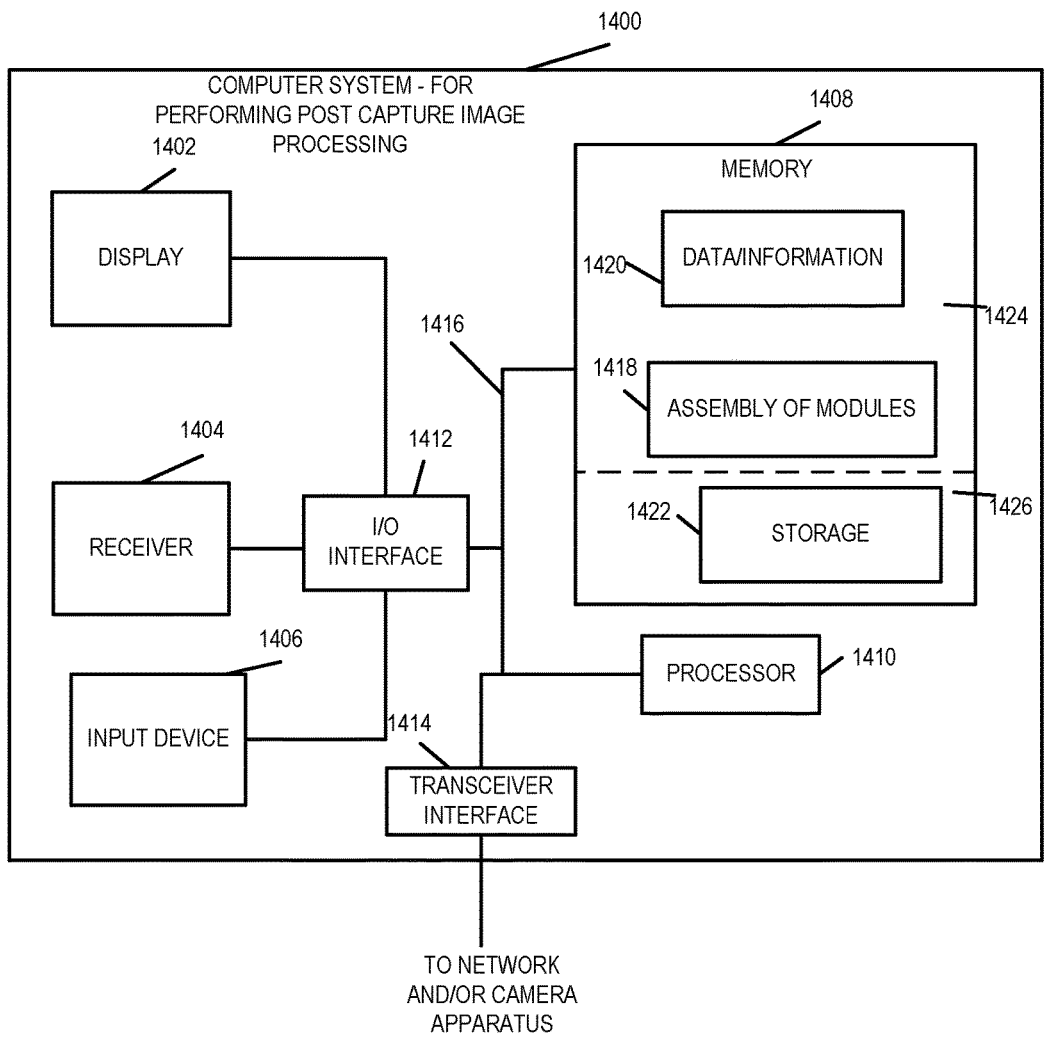
FIG. 14 illustrates a computer system which can be used for post processing of images captured using a camera device.

FIG. 14 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. Memory 1408 includes a first portion 1424 including data/information 1420 and an assembly of modules 1418, and a second portion 1426 including storage 1422. The memory 1408 is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the storage portion 1422 of memory 1408 for processing. Data/information 1420 includes, e.g., intermediate processing data and information and criteria used for processing e.g., weighting information, exposure time information, etc. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the storage portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

FIG. 15 illustrates a frontal view of an apparatus 1500 implemented in accordance with one embodiment of the present invention which incorporates multiple optical chain modules. Camera device 1500 includes four optical chains OCM 1 1502, OCM 2 1504, OCM 3 1506 and OCM 4 1508. The outer lens of OCM 1, OCM 2, OCM 3 and OCM 4, OCM 1 L1 1510, OCM 2 L1 1512, OCM 3 L1 1514, OCM 4 L1 1516, respectively, being shown as solid line circles with a frontal view. OCM 1 1502 including a red filter element 1518, OCM 2 1504 including a green filter element 1520, OCM 3 1506 including a blue filter element 1522. Optical chain module 4 1508 passes all three colors and includes a sensor with a multi-color filter element 1524, e.g., a Bayer filter. The optical chain modules (1502, 1504, 1506, 1508) may be the same as or similar to those previously described in FIGS. 1-3.

FIG. 16 illustrates a frontal view of the outer lenses of an apparatus 1605, e.g., a camera device, implemented in accordance with one embodiment of the present invention which incorporates multiple optical chain modules and which is designed to have little or no gaps between the outer most lenses of the different optical chain modules. The outer most lenses may be the aperture stop lenses in the FIG. 16 embodiment. Apparatus 1605 of FIG. 16 includes 7 optical chain modules OCM1, OCM2, OCM3, OCM4, OCM5, OCM6 and OCM7 with the outer lens plane corresponding to lenses L1 as viewed from the front of the camera device being shown in FIG. 16.

The 7 optical chain modules are, e.g., optical chain modules (OCM 1 161, OCM 2 161', OCM 3 161", . . . , OCM 7 161''', of FIG. 1D with the outer lens (OCM 1 L1 162, OCM 2 L1 162', OCM 3 L1 162", . . . , OCM 7 L1 162''') being outer lenses (OCM 1 L1 1607, OCM 2 L1 1609, OCM 3 L1 1611, . . . , OCM 7 L1 1619) of FIG. 16, respectively.

The outer lenses L1 of optical chain modules 1, 2, 3, 4, 5, and 6, OCM 1 L1 1607, OCM 2 L1 1609, OCM 3 L1 1611, OCM 4 L1 1613, OCM 5 L1 1615, OCM 6 L1 1617, are positioned so as to surround the outer lens L1 of the optical chain module 7, OCM 7 L1 1619. The outer lens L1 of the optical chain module 7 1619 being formed in the shape of a hexagon, i.e., a six sided polygon. The outer lenses L1 of optical chain modules 1, 2, 3, 4, 5 and 6 (1607, 1609, 1611, 1613, 1615, 1617) being of same shape and size and when combined with lens L1 of optical module 7 (1619) forming a circle. The optical center of each lens L1 of optical chain modules (OCM 1 L1 1607, OCM 2 L1 1609, OCM 3 L1 1611, OCM 4 L1 1613, OCM 5 L1 1615, OCM 6 L1 1617) shown as a dark solid dot (1612, 1623, 1625, 1627, 1629, 1631) on the dashed circle 1651. The optical center of lens L1 1619 of optical chain module 7 shown as a dot 1633 in the center of the hexagon and also in center of the dashed line 1651. A block separator or other light block may be used between the lenses to stop light leakage between the different lenses. The dots (1621, 1623, 1625, 1627, 1629, 1631, 1633) in FIG. 16 represent the optical center of the individual lenses (1607, 1609, 1611, 1613, 1615, 1617, 1619), respectively. In some embodiments each outermost lens is a round convex lens with its parameter cut to the shape shown in FIG. 16 so that the lenses fight closely together. The little or no gap between the front lenses, e.g., the total area of the gap between the lenses occupies less than 5% of the total area of the front area of the lens assembly, e.g., circle shown in FIG. 16, occupied by the lenses when assembled together. The lack of or small size of the gaps facilitates generating combined images with a desirable bokehs or blurs in the combined image with regard to image portions which are out of focus, e.g., in some cases without the need for extensive and potentially complex processing to generate the combined image.

In FIG. 16, circle 1603 represents a circular aperture for the camera device 1605. In other embodiments, the aperture for the camera device 1605 is a polygon shaped aperture. The plurality of lenses (1607, 1609, 1611, 1613, 1615, 1615, 1617, 1619) are configured to partition the aperture 1603 into a plurality of light capture areas (1641, 1643, 1645, 1647, 1649, 1651, 1653), occupying substantially the entire area of the first aperture.

In some embodiments, the seven optical chains included in camera device 1605 are the N optical chains (161, 161', 161" . . . , 161'''), where N=7, where the outer lenses configuration of FIG. 16 is used. For example, OCM 1 L1 162 of FIG. 1D is OCM L1 1607 of FIG. 16, OCM 2 L1 162' of FIG. 1D is OCM 2 L1 1609 of FIG. 16, OCM 3 L1 162" of FIG. 1D is OCM 3 L1 1611 of FIG. 16, . . . , and OCM N L1 162''' of FIG. 1D is OCM 7 L1 1619 of FIG. 16.

In various embodiments, the sensor included in each optical chain in camera device 1605 is a semiconductor sensor. In various embodiments, first aperture of camera device 1605 is one of a circular or polygon shaped aperture. The first aperture of camera device 1605 corresponds to circle 1603. In some other embodiments, the first aperture corresponds to a polygon, e.g., a polygon approximately the same size as circle 1603. In some embodiments, the polygon fits inside circle 1603. In some embodiments, the polygon is a regular polygon.

The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which are arranged along a circle 1651. The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which form the vertices (corners) of a regular polygon 1655.

The plurality of lenses (1607, 1609, 1611, 1613, 1615, 1617, 1619) includes at least one inner lens 1619 in addition to said lenses (1607, 1609, 1611, 1613, 1615, 1617) arranged along the perimeter of said first aperture 1603. The plurality of lenses (1607, 1609, 1611, 1613, 1615, 1617, 1619) includes a total of six lenses (1607, 1609, 1611, 1613, 1615, 1617) along the perimeter of said first aperture 1603 and a single lens (1619) in the center of said six lenses (1607, 1609, 1611, 1613, 1615, 1617) arranged along the perimeter of said first aperture 1603.

The non-circular aperture of each of said plurality of lenses (1607, 1609, 1611, 1613, 1615, 1617, 1619) is an aperture stop in a corresponding optical chain.

Each lens in said plurality of lenses (1607, 1609, 1611, 1613, 1615, 1617, 1619) is part of a corresponding optical chain, each individual optical chain includes a separate sensor for capturing an image corresponding to said individual optical chain.

Apparatus 1605, e.g., a camera device, further includes a module, e.g., module 1302 of FIG. 13, for combining images captured by separate optical chains into a single combined image. In various embodiments, the combining images, e.g., performed by module 1302, includes a shift and add based on the position of lenses in said plurality of lenses (1607, 1609, 1611, 1613, 1615, 1617, 1619).

Camera device 1605 further includes additional elements shown in FIG. 1A including a processor, a memory and a display.

FIG. 17 illustrates a frontal view of the outer lenses of an apparatus 1705 implemented in accordance with one embodiment of the present invention which incorporates multiple optical chain modules and outer lenses, e.g., the aperture stop lens for each of the corresponding optical chains, arranged to have non-uniform spacing between the optical centers of the lenses. Thus the FIG. 17 embodiment is similar to the FIG. 16 embodiment but with non-uniform spacing of the optical centers of lenses along the outer parameter of the lens assembly. The non-uniform spacing facilitates depth of field determinations particularly when performing block processing and the entire field of view may not be under consideration when processing a block or sub-portion of the captured field of view. The optical chain modules shown in FIGS. 16 and 17 are the same or similar to those previously described with reference to FIG. 3 but differ in terms of lens shape, size and/or configuration. The dots (1721, 1723, 1725, 1727, 1729, 1731, 1733) in FIG. 17 represent the optical center of the individual lenses (1707, 1709, 1711, 1713, 1715, 1717, 1719), respectively.

FIG. 18 illustrates another exemplary camera device 1801 including a plurality of first through fifth optical chain modules (1890, 1891, 1892, 1893, 1894) each of which includes an outer lens (1813, 1815, 1817, 1819, 1821), respectively, represented as a circle on the outer lens platter 1803. Each outer lens (1813, 1815, 1817, 1819, 1821) has an optical axis (1805, 1806, 1807, 1808, 1809), respectively. The optical axis (1805, 1806, 1807, 1808, 1809) is represented by an X, indicating that the axis goes down into the lens (1813, 1815, 1817, 1819, 1821). The optical axis (1805, 1806, 1807, 1808, 1809), are parallel to each other. In both FIGS. 18 and 19 arrows made of dashed lines represent the path of light for the corresponding optical chain module after light which entered the outer lens along the optical axis of the outer lens is redirected by the mirror or other light redirection device. Thus, the arrows represents the direction and general light path towards the sensor of the optical chain to which the arrow corresponds. In various embodiments, the image deflection element, e.g., a mirror, of the optical chain changes the direction of the optical rays passing along the optical axis of the outer lens by substantially 90 degrees to direct the optical rays passing along the optical axis onto the sensor. For example, with regard to optical chain 1890, the image deflection element 1823, e.g., a mirror, of the optical chain 1890 changes the direction of the optical rays passing along the optical axis 1805 of the outer lens 1813 by substantially 90 degrees to direct the optical rays passing along the optical axis onto the sensor 1853.

In the FIG. 18 embodiment each of the optical chain modules (1890, 1891, 1892, 1893, 1894) includes, in addition to an outer lens (1813, 1815, 1817, 1819, 1821,) a mirror or other device, e.g., prism, (1823, 1825, 1827, 1829, 1831), respectively, for changing the angle of light received via the corresponding outer lens (1813, 1815, 1817, 1819, 1821), respectively. Additionally, as in some of the previously described embodiments such as the FIGS. 1A, 1B, 1C, 1D, and 3 embodiments, each optical chain module (1890, 1891, 1892, 1893, 1894), includes a filter (1833, 1835, 1837, 1839, 1841), respectively, and an inner lens (1843, 1845, 1847, 1849, 1851), respectively. In addition each optical chain module (1890, 1891, 1892, 1893, 1894) includes a sensor (1853, 1855,1857, 1859, 1861), respectively. For example, the first optical chain module (OCM 1 1890) include outer lens L1 1813, mirror 1823, filter 1833, inner lens L2 1843 and sensor 1853.

Filters 1833, 1835, 1837, 1839, and 1841 are mounted on a movable cylinder 1875 represented as a circle shown using small dashed lines. The cylinder 1875 may be rotated and/or moved forward or backward allowing lenses and/or filters on the cylinder to be easily replaced with other lenses, filter, or holes mounted on the cylinder 1875. While in the FIG. 18 example, an exit hole is provided to allow light to exit cylinder 1875 after passing through one of the filters 1833, 1835, 1837, 1839, or 1841 it should be appreciated that rather than an exit hole another lens or filter may be mounted on the cylinder 1875 allowing two opportunities for the light to be filtered and/or passed through a lens as is passes through the cylinder 1875. Thus, in at least some embodiments a second filter or lens which is not shown in FIG. 18 for simplicity is included at the exit point for the light as it passes through cylinder 1804. Inner lenses are mounted on cylinder 1885 which is actually closer to the outside sidewalls of the camera device 1801 than the filters mounted on cylinder 1875. Given the large diameter of movable cylinder 1885 and the relatively small diameter of the light beam as it nears the sensor, it should be appreciated that a large number of alternative filters, lenses and/or holes can be mounded on cylinder 1885. As with cylinder 1875 the light can be filtered and/or processed by a lens as it enters and leaves cylinder 1885 prior to reaching the sensor of the corresponding optical chain.

In some embodiments lenses mounted on a moveable platter positioned between the outer lens platter 1803 and mirrors which may, and in some embodiments are, also mounted on a platter are used to support autofocus. In such an embodiment the lens platter between the outer lens platter and mirror platter is moved in or out to perform focus operations for each of the optical chain modules in parallel. In another embodiment, different sets of lens are mounted on the drum 1885 or 1875 with different lens sets being mounted with a different offset distance from the surface of the drum. By switching between the different sets of lenses by rotating the drum on which the different lens sets are mounted, focusing between different predetermined focus set points can, and in some embodiments is achieved, by simply rotating the drum on which the lens sets, corresponding to the different focal distance set points, are mounted.

Notably, the FIG. 18 embodiment, by changing the direction of light through the use of mirrors, prisms and/or other devices allows for the length of the individual optical chains to be longer than the camera device is thick. That is, the side to side length of the camera device 1801 can be used in combination with a portion of the front to back length to create optical chains having a length longer than the depth of the camera device 1801. The longer optical chain length allows for more lenses and/or filters to be used as compared to what may be possible with shorter optical chain lengths. Furthermore, the change in the direction of light allows for the use of cylinders for mounting lenses, filters and/or holes which can be easily interchanged by a simple rotation or axial, e.g., front to back movement, of the cylinder on which the lenses, filters and/or holes corresponding to multiple optical chains are mounted.

In the FIG. 18 embodiment sensors may be fixed and/or mounted on a movable cylinder 1899. Thus, not only can the lenses, filters and/or holes be easily switched, changes between sensors or sets of sensor can be easily made by rotating the cylinder on which the sensors are mounted. While a single mirror is shown in FIG. 18 in each optical chain module, additional mirrors may be used to further extend the length of the optical path by reflecting in yet another direction within the housing of the camera device 1801.

It should be appreciated that the FIG. 18 embodiment allows for a combination of lens, filter, and/or hole mounting platters arranged parallel with the platter extending left to right within the camera device and cylinders arranged so that the top and bottom of the cylinder extend in the front to back direction with respect to the camera body, e.g., with the front of the camera being shown in FIG. 18. Cylinders may be mounted inside of one another providing a large number of opportunities to mount lens, filters and/or holes along the optical paths of each optical chain module and allowing for a large number of possible filter/lens/sensor combinations to be supported, e.g., by allowing for different combinations of cylinder positions for different modes of operation.

While changing sensors mounted on a cylinder can be achieved by rotating a cylinder, in the earlier embodiments in which sensors may be mounted on platters, sensors may be changed by rotating or otherwise moving a platter on which the sensors are mounted.

Note that in the FIG. 18 embodiment the outer lenses (1813, 1815, 1817, 1819, 1821, of the optical chain modules (1890, 1891, 1892, 1893, 1894), respectively, are mounted near the center of the front of the camera device 1801 as shown, e.g., forming a generally circular pattern of outer lenses 1813, 1815, 1817, 1819, 1821.

In camera device 1801 the optical axes (1805, 1806, 1807, 1808, 1809) of lenses (1813, 1815, 1817, 1819, 1821) said optical chain modules (1890, 1891, 1892, 1893, 1894) are parallel to each other but at least two mirrors (1823, 1825) corresponding to different optical chains (1890, 1891) are not parallel. The light rays of at least two different optical chains (1890, 1891) cross prior to reaching the sensor (1853, 1855) to which the rays of said at least two different optical chain modules (1890, 1891) correspond.

In various embodiments, each optical chain module (1890, 1891, 1892, 1893, 1894) includes an image deflection element which includes at least one mirror positioned at 45 degree to said optical axis (1890, 1891, 1892, 1893, 1894) of said lens of the optical chain module. For example, with regard to optical chain module 1 1890, in one embodiments, the image deflection element 1823 is a mirror positioned at 45 degree to the optical axis 1805 of lens 1813.

In some embodiments, an image deflection element, e.g., image deflection element 1823 includes a prism. In some embodiments, an image deflection element includes multiple mirrors. In some embodiments, an image deflection element includes a combination including at least one mirror and at least one prism.

FIG. 19 is similar to the FIG. 18 embodiment in that it illustrates another camera device 1901 including a plurality of optical chain modules which include mirrors or another device for changing the angle of light entering the optical chain module and thereby allowing at least a portion of the optical chain module to extend in a direction, e.g., a perpendicular direction, which is not a straight front to back direction with respect to the camera device. FIG. 19 illustrates another exemplary camera device 1901 including a plurality of first through fifth optical chain modules (1990, 1991, 1992, 1993, 1994) each of which includes an outer lens (1913, 1915, 1917, 1919, 1921), respectively, represented as a circle on the outer lens platter 1903. FIG. 19 differs from the FIG. 18 embodiment in that the outer lenses (1913, 1915, 1917, 1919, 1921) of the first through fifth optical chain modules (1990, 1991, 1992, 1993, 1994) are positioned near the perimeter of the face of the camera device 1901. This allows for the length of the optical chain module to be longer than the length of the optical chains shown in FIG. 18. FIG. 19 shows outer and inner cylinders, also some times referred to as drums, 1975, 1985, upon which filters, lenses and holes can and in various embodiments are mounted as discussed with regard to the FIG. 18 embodiment. Thus cylinders 1975 and 1985 server the same or similar purpose served by cylinders 1875, 1885, respectively. It should be appreciated that in some embodiments the FIG. 19 embodiment includes filters and lenses mounted on the inner and outer cylinders in the same or similar manner as filters and lenses are mounted on the cylinders 1875, 1885 shown in FIG. 18.

Elements of the FIG. 19 embodiment which are the same or similar to the elements of the FIG. 18 embodiment are identified beginning with "19" instead of "18" and for the sake of brevity will not be described again in detail. For example element 1961 is used to refer to the sensor for the optical chain module 1994 which includes outer lens 1921, mirror/light redirection device 1931, filter 1941 and inner lens 1951. The cylinder 1975 is used to mount the filters while cylinder 1985 is used to mount the inner lenses.

Each outer lens (1913, 1915, 1917, 1919, 1921) has an optical axis (1905, 1906, 1907, 1908, 1909), respectively. The optical axis (1905, 1906, 1907, 1908, 1909) is represented by an X, indicating that the axis goes down into the lens (1913, 1915, 1917, 1919, 1921). The optical axis (1905, 1906, 1907, 1908, 1909), are parallel to each other.

The camera devices 1801 and 1901 may, and in some embodiments do, include a processor, display and/or other components of the camera device shown in FIG. 1A but such elements are not explicitly shown in the FIGS. 18 and 19 embodiments to avoid complicating the figures and being repetitive.

Various functions of the present invention may be and are implemented as modules in some embodiments. The assembly of modules 1300 shown in FIG. 13 illustrates an exemplary assembly of modules, e.g., software or hardware modules, that may be and are used for performing various functions of a image processing system or apparatus used to process images in accordance with embodiments of the present invention. When the modules identified in FIG. 13 are implemented as software modules they may be, and in some embodiments of the present invention are, stored in memory 108 of FIG. 1A in the section of memory identified as assembly of modules 118. These modules may be implemented instead as hardware modules, e.g., circuits.

The ideas and concepts described with regard to various embodiments such as those shown in FIG. 19 can be extended so that the input sensors can be located in a plane, e.g., at the back of the camera device and/or at the front of the camera device. In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Various functions of the present invention may be and are implemented as modules in some embodiments. The assembly of modules 1700 shown in FIG. 13 illustrates an exemplary assembly of modules, e.g., software or hardware modules, that may be and are used for performing various functions of a image processing system or apparatus used to process images in accordance with embodiments of the present invention. When the modules identified in FIG. 13 are implemented as software modules they may be, and in some embodiments of the present invention are, stored in memory 108 of FIG. 1A in the section of memory identified as assembly of modules 118. These modules may be implemented instead as hardware modules, e.g., circuits.

The ideas and concepts described with regard to various embodiments such as those shown in FIG. 19 can be extended so that the input sensors can be located in a plane, e.g., at the back of a camera device and/or at the front of the camera device. In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

Figure 20:
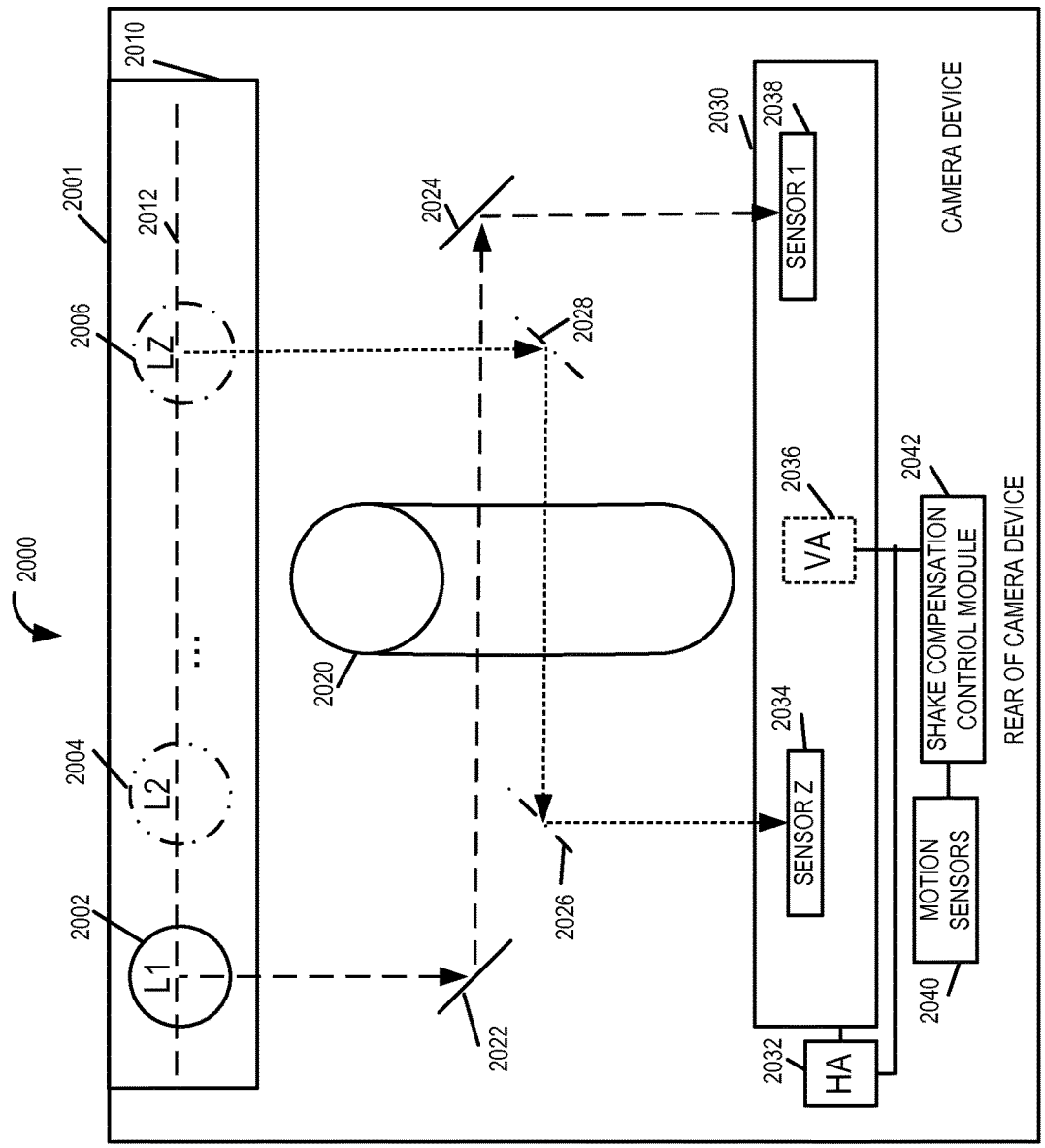
FIG. 20 illustrates an additional exemplary camera device in which mirrors and/or other light redirecting elements are used to alter the path of light in the optical chains so that both the input lenses and/or openings through which light enters the optical chains can be arranged in a plane, and also so that the optical sensors of the optical chains can be arranged in a plane, while allowing at least a portion of the light path through the optical chains to extend in a direction perpendicular to the input and/or output planes.
Figure 21:
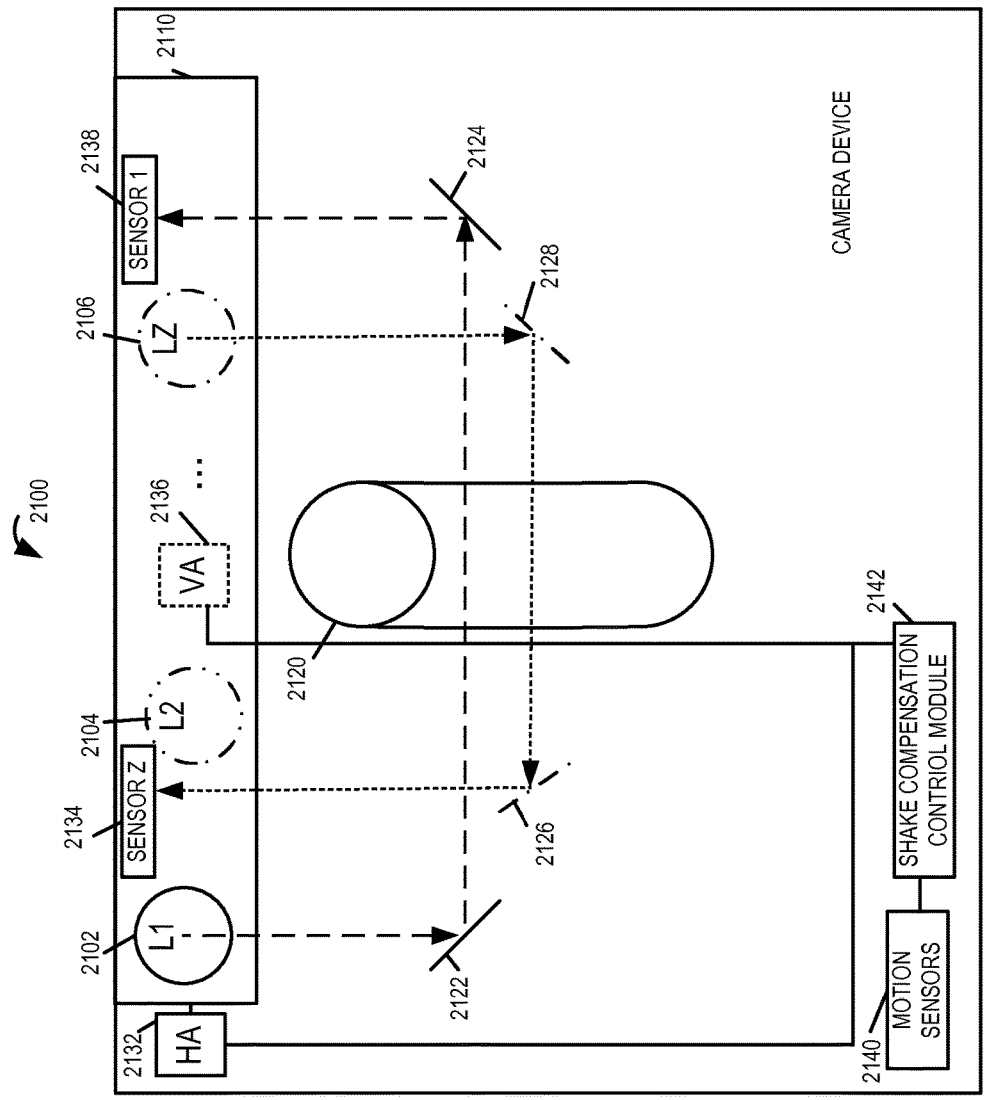
FIG. 21 illustrates an additional exemplary camera device in which mirrors and/or other light redirecting elements are used to alter the path of light in the optical chains so that the input lenses and/or openings, as well as the light sensors of the different optical chains, can be arranged in one or more planes at the front of the camera.

In the FIGS. 20 and 21 embodiments two or more deflection elements are used in each optical chain. Mirrors are exemplary deflection elements that may and sometimes are used in the FIGS. 20 and 21 embodiments. Thus, at least in some embodiments each optical chain includes multiple deflection elements in the form of mirrors. In FIGS. 20 and 21 embodiments two deflection elements are used in each optical chain with each deflection element, e.g., mirror, deflecting the light 90 degrees.

FIG. 20 illustrates an exemplary diagram of a camera device 2000 implemented in accordance with one exemplary embodiment of the invention. The FIG. 20 diagram is intended for explanation purposes to facilitate an understanding of various features and thus is not a precise view of the camera device as perceived from the top but a functional diagram of the elements from a top view perspective which is intended to convey various aspects of the optical chain configurations used in the device 2000. The top portion of FIG. 20 corresponds to the front of the camera device 2000 while the bottom portion corresponds to the back of the camera device 2000. The body 2001 of the camera extends from left to right with the lens and/or openings 2002, 2004, 20006 corresponding to multiple optical chains being mounted in front of the camera device 2000. A LCD or other display (not shown) may and in some embodiments is, located at the rear of the camera device 2000.

In the camera device 2000 includes a plurality of lens or openings L1 through LZ 2002, 2004, 2006 each corresponding to a different one of Z optical chains. Note that in FIG. 20 the lenses 2002, 2004 and 2006 are loaded in a plane represented by dashed line 2012 which extends down towards the bottom of the camera device 2000 which is not visible in the FIG. 20 diagram. The lenses 2002, 2004, and 2006 may be arranged in a circular or other pattern on the front of the camera device 2002. Each optical chain in the FIG. 20 embodiment includes multiple mirrors or other light redirecting devices and a sensor positioned at the end of the optical chain. For example, optical chain 1 includes lens 2002, first mirror 2022, second mirror 2024 and sensor 2038. Optical chain Z includes lens LZ 2006, first mirror 2028, second mirror 2026 and sensor Z 2034. It should be appreciated that mirrors of the first and second optical chains are located around the cylinder 2020 on which one or more lenses or filters may be mounted as discussed with regard to the other embodiments. The mirrors may be arranged in a plane positioned parallel to the input plane 2012 with the light of the different optical chains passing each other, e.g., crossing, within the cylinder 2020. While a single cylinder 2020 is shown in FIG. 20, multiple cylinders, lenses and/or filters may, and in some embodiments are, used as discussed with regard to the other embodiments. Note that in the FIG. 20 embodiment the mirrors (2022, 2024), (2028, 2026) redirect the light passing through the optical chain to which the mirrors correspond so that at least a portion of the optical path of the optical chain extends perpendicular or generally perpendicular to the input direction in which the input lenses L1, L2, LZ face and parallel to the input plane 2012. The input plane may be implemented as a mounting device, e.g., circuit board, upon one or more input lenses or openings L1, L2, LZ are mounted or included in. This allows the optical chain to take advantage of the left to right width of a camera permitting an overall optical chain length than would be possible if the optical chain was limited to the front to back depth of camera device 2000. This allows for thin cameras with relatively long optical chains. Notably, the use of two 45 degree mirrors 2022, 2024 allows the sensors of the optical chain to be mounted in a backplane 2030 with the sensors being arranged on the backplane 2030 in a plane which is parallel to the input plane 2012. The ability to mount the sensors on a single backplane allows for the simple movement of the sensors as an assembly maintaining the relative position of the sensors 2034, 2038 to one another on the backplane 2030 even if the backplane is moved. The cylinder and mirrors may, but need not be, mounted in a manner so that they will move with the backplane 2030 maintaining the alignment of the optical chains to one another as the backplane 2030 is moved, e.g., up or down or left to right in the camera body 2000. Thus, in some embodiments the backplane 2030 and sensors 2034, 2038 can be moved in unison, e.g., by applying a force to the backplane 2030 to induce motion as may be desired.

In one embodiment, motion sensors 2040 are included in the camera device 2000. The motion sensors 2040 may be accelerometers and/or gyroscopes used to detect motion along one or more axis of the camera. In one particular embodiment a shake compensation module 2042 is included in the camera device 2000. The shake compensation module 2042 receives output from the motion sensors 2040 and detects camera movement, e.g., movement indicative of un-intentional shaking as is common in the case of hand held cameras. The shake compensation control module is coupled to a horizontal actuator 2032 and a vertical actuator 2036 which are in contact with the backplane 2030 which may be a circuit board. The vertical actuator 2036 is shown in dashed lines since it is positioned below backplane 2030 and would not be visible from the top. The vertical actuator 2036 can be used to move the backplane 2030, e.g. circuit board, up or down while actuator 2032 can be used to move the backplane 2030 left or right. In at least one embodiment backplane 2030 is mounted in a manner that allows motion left and right, up and down, but which maintains its parallel relationship to the input plane 2012. In some embodiments backplane 2030 is mounted in a slot which is part of the housing of the camera device 2000. The actuators 2032, 3036 may be motorized or implemented using elements which expand or contract when a voltage is supplied. The shake compensation control module 2042 controls the supply of power and/or control signals to actuators 2032, 2036 which induces motion of the backplane 2030 and sensors mounted thereon which is intended to counteract the shaking. The motion of the backplane 2030 is normally not detectable to the holder of the camera but can reduce the distorting in the captured images induced by shaking of the camera housing in which the various elements of the camera are mounted. The lenses and/or openings 2002, 2004, 2006 may not distort or focus the incoming light and may remain fixed while one or more of the other elements of the optical chains move, e.g., to compensate for shaking and/or changes the lenses on the cylinder or drum 2020 through which light will pass.

The FIG. 20 embodiment is particular well suited for embodiments where it is desirable from a manufacturing standpoint and/or shake compensation standpoint to mount the sensors 2034, 2038 on backplanes such as printed circuit boards or other relatively flat mounting devices whether they be out of metal, plastic, another material or a combination of materials. It should be appreciated that the camera device 2000, as well as the camera device 2100 shown in FIG. 21 may include the elements of the camera device 100 shown in FIG. 1A in addition to those shown in FIGS. 20 and 21 but that such elements are omitted to facilitate an understanding of the elements and configuration which is explained using FIGS. 20 and 21.

FIG. 21 illustrates an additional exemplary camera device 2100 in which mirrors (2122, 2124), (2128, 2126) and/or other light redirecting elements are used to alter the path of light in the optical chains so that the input light input lenses and/or opens can be arranged in one or more planes at the front of the camera where the lens and/or openings through which light enters the optical chains are also located. Elements in FIG. 21 which are the same or similar the elements of FIG. 20 are numbered using similar numbers but starting with the first two digits 21 instead of 20. Such similar elements will not be described again expect to point out some of the differences between the FIG. 21 and FIG. 20 configurations. One of the differences between the devices 2100 and 2000 is that in the camera device 2100 both the sensors 2134, 2138 and external lenses/openings of the optical chains are located in the front of the camera. This is made possible by having the second mirror 2124 or 2126 direct light to the front of the camera rather than the back of the camera.

Numerous variations on the designs shown in FIGS. 20 and 21 are possible. Significantly, the methods and apparatus of the present invention allow for sensors to be arranged parallel to or on any internal wall of a camera device while still allowing for a camera device to include multiple optical chains in a relatively thin camera. By configuring the sensors parallel to the front or rear walls of the camera rather than the side walls, the sensors and/or lens can be spread out and occupy a greater surface area than might be possible if the camera sensors were restricted to the sidewalls or some other arrangement. Notably many of the embodiments are well suited for allowing a LCD or other display to be placed at the back of the camera facing out without the display panel significantly interfering with the overall length of the individual optical chain modules included in the camera.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Numerous additional variations and combinations are possible while remaining within the scope of the invention.

Figures 22, 22A:
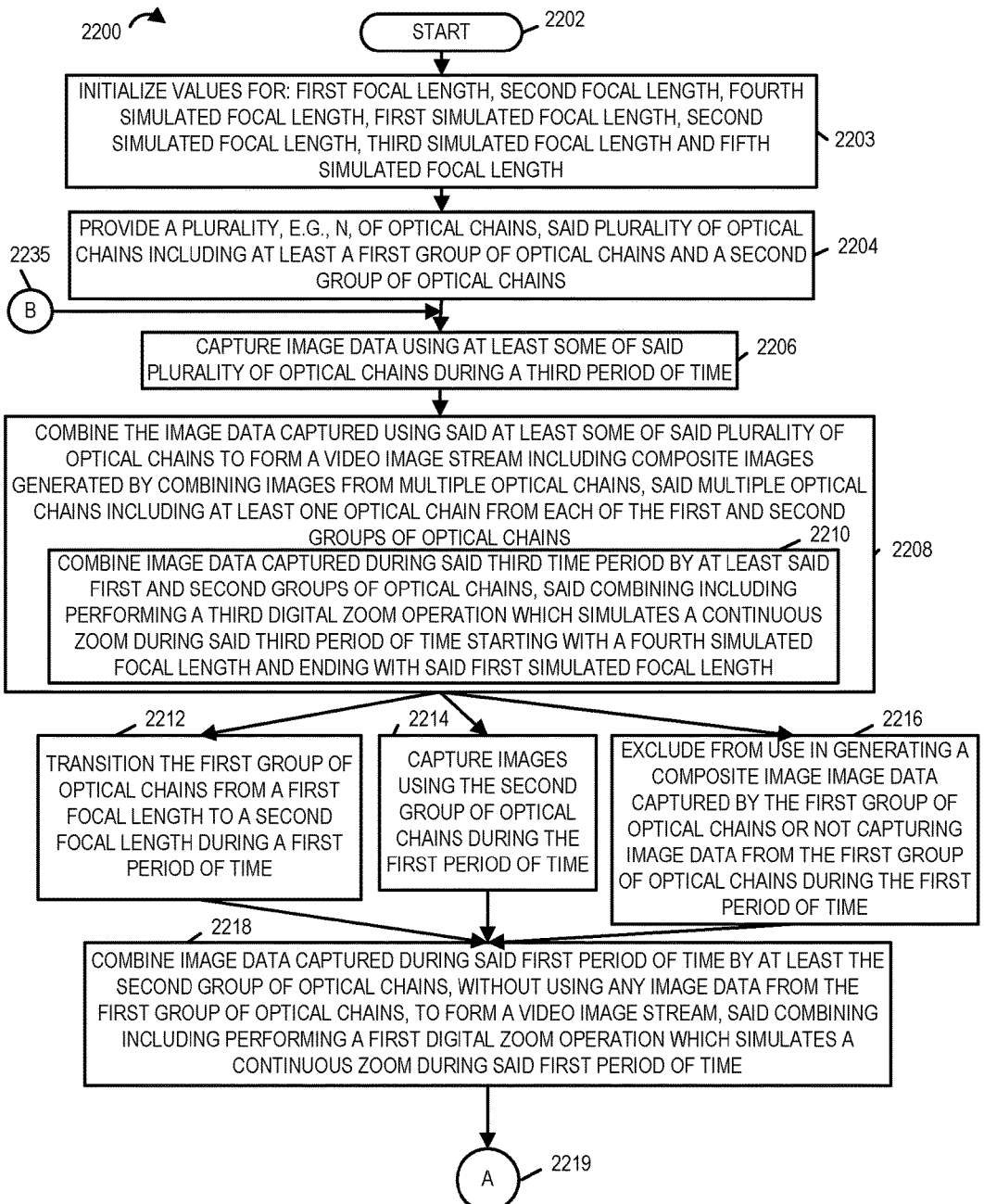
FIG. 22A is the first part of a flowchart of an exemplary method of operating a camera device including a plurality of optical chains in accordance with an exemplary embodiment.
Figure 22B:
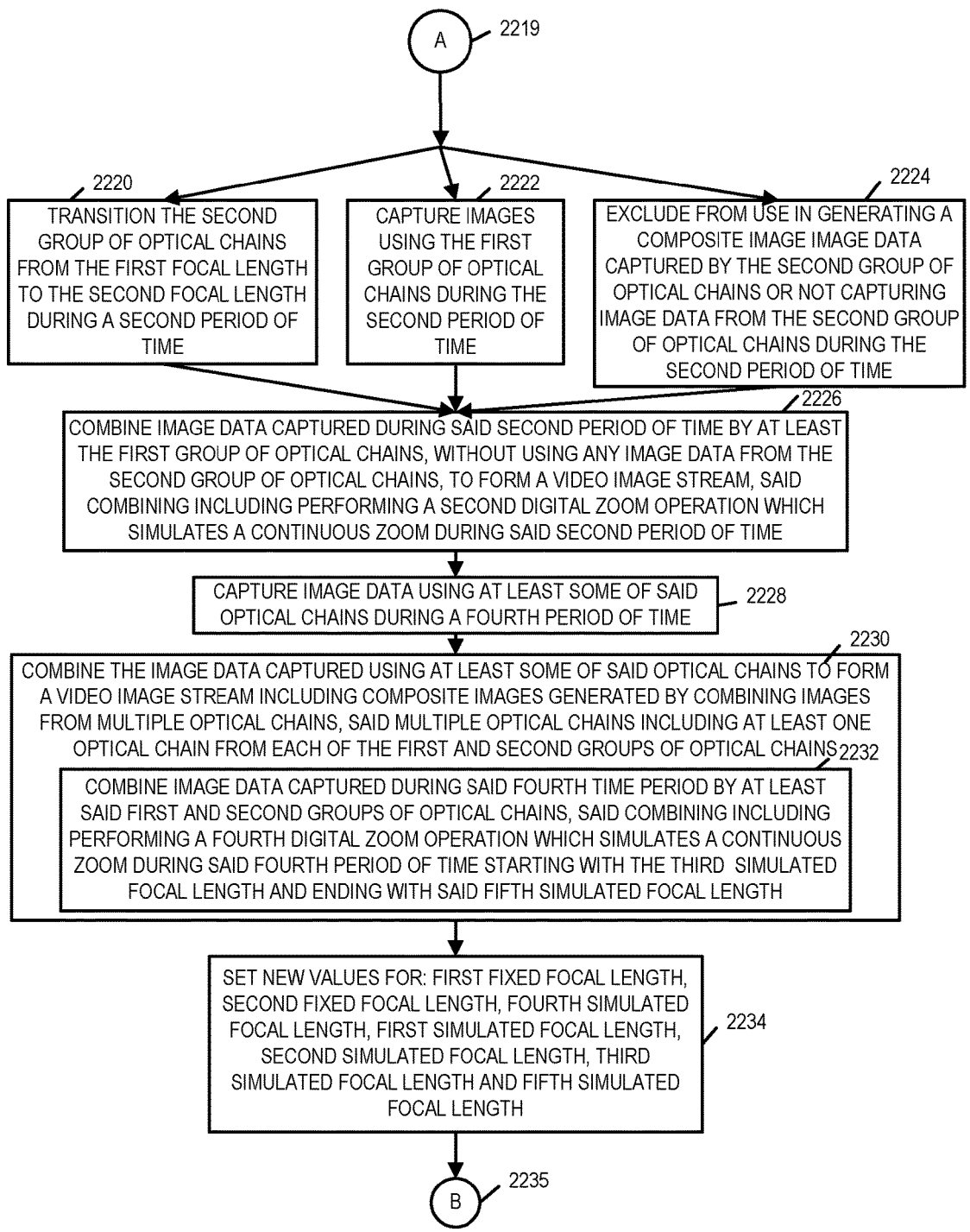
FIG. 22B is the second part of a flowchart of an exemplary method of operating a camera device including a plurality of optical chains in accordance with an exemplary embodiment.

FIG. 22, comprising the combination of FIG. 22A and FIG. 22B, is a flowchart 2200 of an exemplary method of operating a camera device including a plurality of optical chains, said plurality of optical chains including at least a first group of optical chains and a second group of optical chains in accordance with an exemplary embodiment. In some embodiments, the exemplary method of flowchart 2200 uses multiple groups of lenses to support continuous zooming with a combination of digital zoom and discrete lens focal length changes. The method of FIG. 22 can be implemented by any one of the camera devices described in the present application including, for example, camera device 100 of FIG. 1A.

As should be appreciated, focal length is an indication of the optical distance from the point where light rays converge to form a sharp image of an object to the digital sensor, e.g., at the focal plane of the optical chain to which the focal length relates. The focal length provide information on the angle of view and thus how much of a scene will be captured by a sensor of an optical chain as well the magnification, e.g., how large an individual element will appear when sensed by the sensor. The longer the focal length, the narrower the angle of view and the higher the magnification. The shorter the focal length the wider the angle of view and the lower the magnification will be. Thus, by using different focal lengths, e.g., by changing or more lenses or lens positions in an optical chain, an optical chain can provide different amounts of magnification and capture different amount of an image area as a function of the focal length. While lenses can be used to provide optical chains with actual focal lengths, digital image processing can be performed to enlarge an image and thus produce images with simulated focal lengths greater than the actual focal lengths.

While mechanical systems can be devices to move lenses and provide a continuous change in actual focal length, mechanical systems to support smooth changes in focal length can be costly to implement. It is much easier to make changes between focal lengths in discrete, e.g., fixed sizes amounts or units, e.g., by changing lenses. However, from a user perspective it can be desirable to support a smooth or continuous zoom function.

In accordance with various embodiments, a smooth zoom is achieved by a combination of discrete focal length changes in combination with simulated focal length changes between the discrete changes. To support the continuous zoom, in some embodiments multiple optical chain modules are separated into groups with the focal length of one group being changed by a discrete amount, e.g., by a lens change, while the focal length and image capture capabilities of the other group of optical chains continues to be used.

By using at least two groups of optical chains that discretely change their focal lengths at different times in combination with image processing being used to simulate changes in focal length, e.g., by performing an enlargement operation electronically on the image data, a user is provided with the appearance of a smooth zoom operation even though the optical chains have their focal lengths switched by discrete amounts from time to time as needed to support the desired zoom in or zoom out operation.

In some embodiments, each of the steps of flowchart 2200 are implemented by a camera device including groups of optical chains. In some embodiments, the camera device including groups of optical chains is a cell phone or other portable camera device, e.g., an electronic tablet, electronic pad, webcam device, surveillance device, etc.

In other embodiments, the image combining steps are implemented by a device, e.g., a computer system, external to the camera device, and the other steps are implemented by the exemplary camera device including groups of optical chains.

Operation starts in step 2202 and proceeds to step 2203. In step 2203 values are initialized for: the first focal length, the second focal length, the fourth simulated focal length, the first simulated focal length, the second simulated focal length, third simulated focal length and the fifth simulated focal length. In one example, the first focal length f1 is set to 30; the second focal length f2 is set to 100; the fourth simulated focal length S4 is set to 30; the first simulated focal length S1 is set to 100; the second simulated focal length S2 is set to 105; the third simulated focal length S3 is set to 110; and the fifth simulated focal length S5 is set to 400. This set-up allows the camera device to implement a zoom in operation.

Operation proceeds from step 2203 to step 2204. In step 2204 a plurality, e.g., N, of optical chains are provided, said plurality of optical chains including at least a first group of optical chains and a second group of optical chains. In some embodiments, providing a plurality of optical chains included providing a camera device including the plurality of optical chains. In some embodiments, N is at least 6, and each of the first and second groups of optical chains includes at least 3 optical chains. In some embodiments, N is at least 8, and each of the first and second groups of optical chains includes at least 4 optical chains. Operation proceeds from step 2204 to step 2206. In step 2206 image data is captured using at least some of said plurality of optical chains during a third period of time. Operation proceeds from step 2206 to step 2208.

In step 2208 the image data captured using at least some of said plurality of optical chains is combined to form a video image stream including composite image generated by combining images from multiple optical chains, said multiple optical chains including at least one optical chain from each of the first and second groups of optical chains. Step 2208 includes step 2210 in which image data captured during said third time period by at least said first and second groups of optical chains is combined, said combining including performing a third digital zoom operation which simulates a continuous zoom during said third period of time starting with a fourth simulated focal length and ending with a first simulated focal length. Operation proceeds from step 2208 to steps 2212, 2214, and 2216. Steps 2212, 2214 and 2216 may be, and sometimes are, performed in parallel.

In step 2212 the first group of optical chains is transitioned from a first focal length to a second focal length during a first period of time. In step 2214 images are captured using the second group of optical chains during the first period of time. In step 2216 image data captured by the first group of optical chains during the first period of time is excluded from use in generating a composite image or image data is not captured from the first group of optical chains during the first period of time. Operation proceeds from steps 2212, 2214 and 2216 to step 2218.

In step 2218, image data captured during the first period of time by at least the second group of optical chains is combined, without using any image data from the first group of optical chains, to form a video image stream, said combining including performing a first digital zoom operation which simulates a continuous zoom during the first period of time. Operation proceeds from step 2218, via connecting node A 2219 to steps 2220, 2222, and 2224. Steps 2220, 2222 and 2224 may be, and sometimes are, performed in parallel.

In step 2220 the second group of optical chains is transitioned from said first focal length to said second focal length during a second period of time. In some embodiments, at least one of the first and second groups of optical chains include optical chains with controllable focal lengths which can be changed at points in time. In step 2222 images from the first group of optical chains are captured during the second period of time, optical chains in said first group of optical chains have a different focal length than optical chains in said second group of optical chains during a least a portion of the second period of time. In step 2224 image data captured by the second group of optical chains during the second period of time is excluded from use in generating a composite image or image data is not captured from the second group of optical chains during the second period of time. Operation proceeds from steps 2220, 2222 and 2224 to step 2226.

In step 2226, image data captured during the second period of time by at least the first group of optical chains is combined, without using any image data from the second group of optical chains, to form a video image stream, said combining including performing a second digital zoom operation which simulates a continuous zoom during the second period of time. Operation proceeds from step 2226 to step 2228.

In step 2228 image data is captured using at least some of said plurality of optical chains during a fourth period of time. Operation proceeds from step 2228 to step 2230. In step 2230 the image data captured using at least some of said plurality of optical chains during the fourth time period is combined to form a video image stream including composite images generated by combining image from multiple optical chains including at least one optical chain from each of the first and second groups of optical chains. Step 2230 includes step 2232. In step 2232 image data captured during said fourth time period by at least said first and second groups of optical chains is combined, said combining including performing a fourth digital zoom operation which simulates a continuous zoom during said fourth period of time starting with the third simulated focal length and end with said fifth simulated focal length.

Operation proceeds from step 2230 to step 2234. In step 2234, new values are set for: the first focal length, the second focal length, the fourth simulated focal length the first simulated focal length, the second simulated focal length, and the fifth simulated focal length. In one example, the first focal length f1 is set to 100; the second focal length f2 is set to 30; the fourth simulated focal length S4 is set to 400; the first simulated focal length S1 is set to 110; the second simulated focal length S2 is set to 105; the third simulated focal length S3 is set to 100; and the fifth simulated focal length S5 is set to 30. This set-up allows the camera device to implement a zoom out operation. Operation proceeds from step 2234, via connecting node B 2235 to step 2206.

In some embodiments, the first digital zoom during the first period of time begins with a first simulated focal length and ends with a second simulated focal length. In some such embodiments, the first simulated focal length is equal to or larger than the first focal length. In some such embodiments, the first digital zoom is accomplished by taking the entire image or performing an image cropping operation to select a portion of the image.

In various embodiments, the second simulated focal length is equal to or larger than the second focal length. In some such embodiments, said first digital zoom is accomplished by taking the entire image or performing an image cropping operation to select a portion of said image, e.g., simulating a larger focal length than the lens focal length.

In some embodiments, the digital zoom during the second period of time begins with the second simulated focal length and ends with a third simulated focal length. In some such embodiments, the second simulated focal length is equal to or larger than the second focal length. In some such embodiments, the second digital zoom is accomplished by taking the entire images or performing image cropping operations to select a portion of said images.

In various embodiments, the third simulated focal length is equal to or larger than the second focal length. In some such embodiments, the second digital zoom is accomplished by taking the entire image or performing an image cropping operation to select a portion of said image, e.g., simulating a larger focal length.

In various embodiments, the fourth simulated focal length is greater than or equal to the first focal length. In some embodiments, the fifth simulated focal length is greater than or equal to second focal length.

In some embodiments, the fourth simulated focal length is less than the first simulated focal length; the first simulated focal length is less than the second simulated focal length; the second simulated focal length is less than the third simulated focal length; the third simulated focal length is less than the fifth simulated focal length; and the first focal length is less than the second focal length. In some such embodiments, this supports a zoom in operation.

In some embodiments, the fourth simulated focal length is greater than the first simulated focal length; the first simulated focal length is greater than the second simulated focal length, the second simulated focal length is greater than the third simulated focal length; the third simulated focal length is greater than the fifth simulated focal length; and the first focal length is greater than the second focal length. In some such embodiments, this supports a zoom out operation.

In various embodiments, the rate of change of the ln (natural log) of the simulated focal length during the first, second, third, and fourth time periods is the same and is constant. This approach can be, and in some embodiments is, used to result in a continuous zoom at a fixed rate. The rate of change of the log of the simulated focal length would also be constant and is related to the natural log by a constant.

In some embodiments, the focal length of optical chains in the second group of optical chains remains fixed and does not change during the first period of time. In some such embodiments, the focal length of optical chains in the first group of optical chains remains fixed and does not change during the second period of time.

In some embodiments, the first group of optical chains includes optical chains with fixed focal length which do not change with respect to time. In some such embodiments, the second group of optical chains includes optical chins with fixed focal length which do not change with respect to time.

In some embodiments, at least one of the first and second groups of optical chains include optical chains with controllable focal lengths which can be changed at points in time. In some such embodiments, both the first and second groups of optical chains include optical chains with controllable focal lengths which can be changed at points in time.

Figure 23:
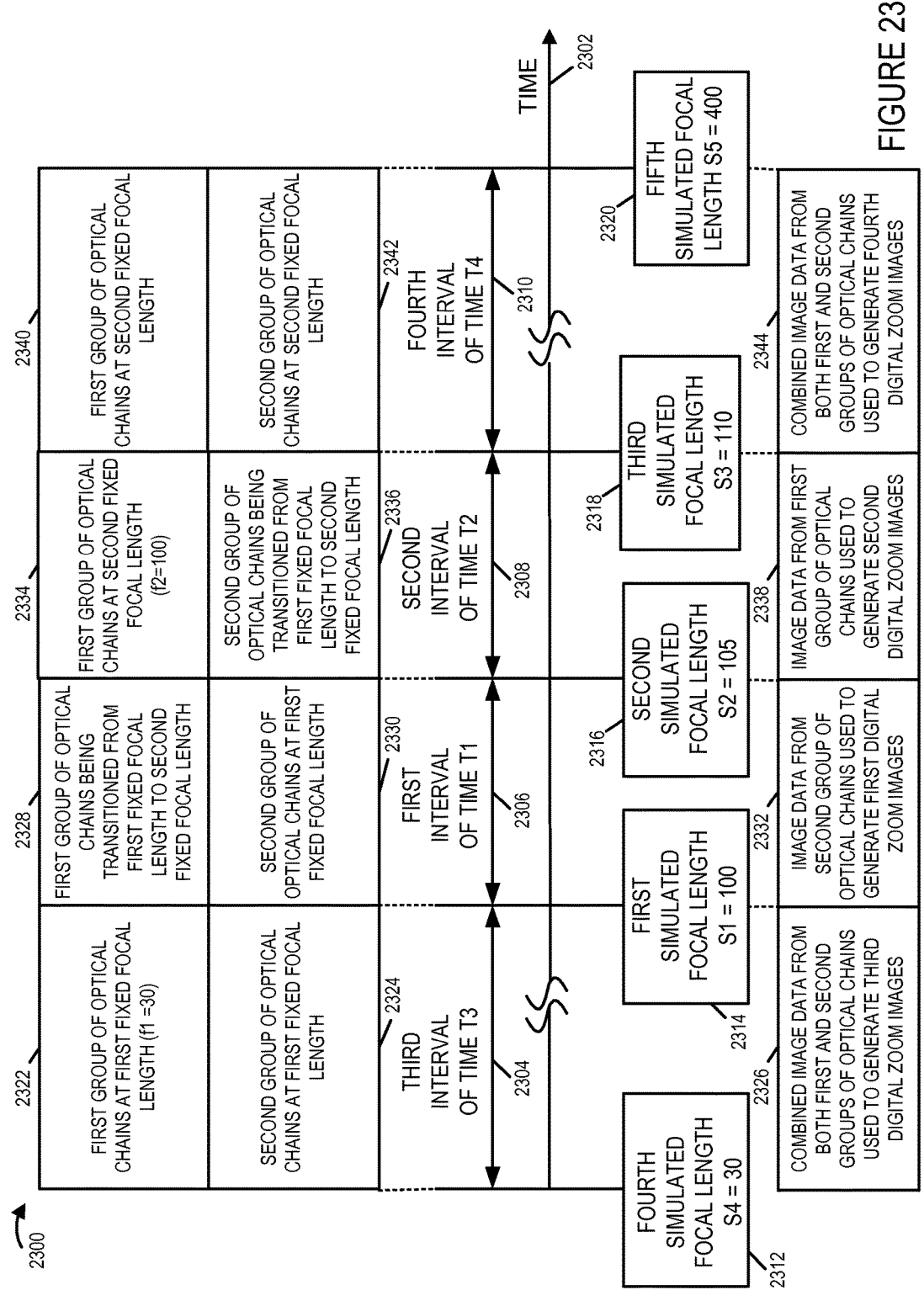
FIG. 23 is a drawing illustrating an example in which the method of flowchart is implemented corresponding to a zoom in operation.

FIG. 23 is a drawing 2300 illustrating an example in which the method of flowchart 2200 is implemented corresponding to a zoom in operation, e.g., an operation where an item in an image will appear to become larger as the zoom increases along with the actual and/or simulated focal length of the optical chains being used. In the FIG. 23 example, the focal lengths, both actual and simulated, are in units of mm however other units may be used. In this example, there is a first fixed focal length, f1=30 mm, and a second fixed focal length, f2=100 mm. Horizontal axis 2302 represents time. In this example, there is a third time interval T3 2304, which is followed by a first time interval T1 2306. The first time interval T1 2306 is followed by a second time interval T2 2308, and the second time interval is followed by a fourth time interval T4 2310.

At the start of the third time interval T3, the camera device has a fourth simulated focal length S4=30, as indicated by box 2312. At the end of the third time interval T3 and start of the first time interval T1, the camera device has a first simulated focal length S1=100, as indicated by box 2314. At the end of the first time interval T1 and start of the second time interval T2, the camera device has a second simulated focal length S2=105, as indicated by box 2316. At the end of the second time interval T2 and start of the third time interval T3, the camera device has a third simulated focal length S3=110, as indicated by box 2318. At the end of the fourth time interval T4 the camera device has a fifth simulated focal length S5=400, as indicated by box 2320.

During the third time interval T3, the first group of optical chains is at a first fixed focal length, f1=30, as indicated by box 2322. During the third time interval T3, the second group of optical chains is at the first fixed focal length, f1=30, as indicated by box 2324. During the third time interval T3, combined image data from both the first and second groups of optical chains is used to generate third digital zoom images, as indicated by box 2326.

During the first time interval T1, the first group of optical chains is being transitioned from the first fixed focal length to the second fixed focal length, as indicated by box 2328. During the first time interval T1, the second group of optical chains is at the first fixed focal length, f1=30, as indicated by box 2330. During the first time interval T1, combined image data from the second group of optical chains is used to generate first digital zoom images, as indicated by box 2332.

During the second time interval T2, the first group of optical chains is at the second fixed focal length, f2=100, as indicated by box 2334. During the second time interval T2, the second group of optical chains is being transitioned from the first fixed focal length to the second fixed focal length, as indicated by box 2336. During the second time interval T2, combined image data from the first group of optical chains is used to generate second digital zoom images, as indicated by box 2338.

During the fourth time interval T4, the first group of optical chains is at a second fixed focal length, f2=100, as indicated by box 2340. During the fourth time interval T4, the second group of optical chains is at the second fixed focal length, f1=100, as indicated by box 2342. During the fourth time interval T4, combined image data from both the first and second groups of optical chains is used to generate fourth digital zoom images, as indicated by box 2344.

Figure 24:
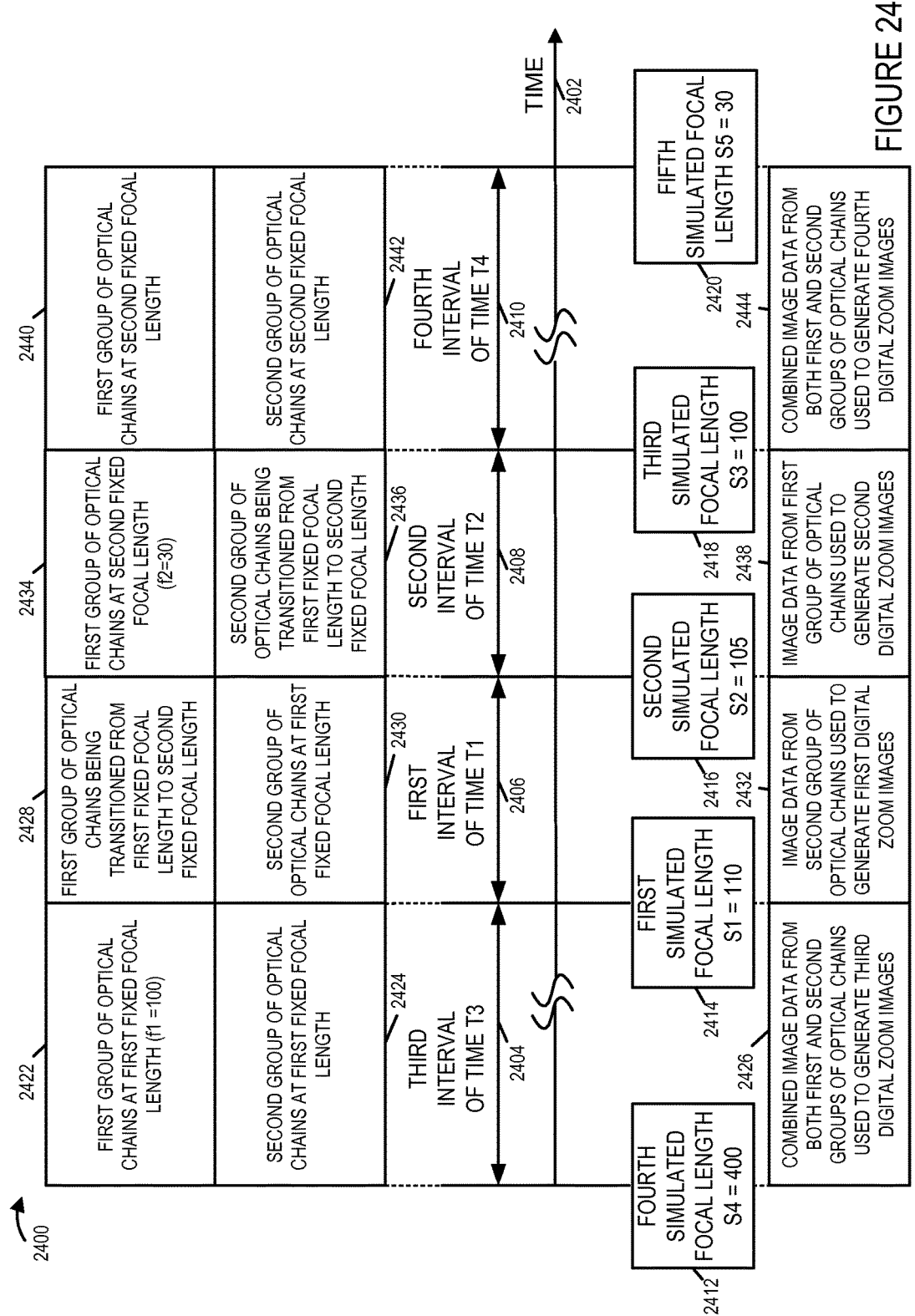
FIG. 24 is a drawing illustrating an example in which the method of flowchart is implemented corresponding to a zoom out operation. As the actual and/or simulated focal length decreases an item in the captured image will appear to become smaller with a larger area being captured as the focal length decreases.

FIG. 24 is a drawing 2400 illustrating an example in which the method of flowchart 2200 is implemented corresponding to a zoom out operation. In this example, there is a first fixed focal length, f1=100, and a second fixed focal length, f2=30. Horizontal axis 2402 represents time. In this example, there is a third time interval T3 2404, which is followed by a first time interval T1 2406. The first time interval T1 2406 is followed by a second time interval T2 2408, and the second time interval T2 2408 is followed by a fourth time interval T4 2410.

At the start of the third time interval T3, the camera device has a fourth simulated focal length S4=400, as indicated by box 2412. At the end of the third time interval T3 and start of the first time interval T1, the camera device has a first simulated focal length S1=110, as indicated by box 2414. At the end of the first time interval T1 and start of the second time interval T2, the camera device has a second simulated focal length S2=105, as indicated by box 2416. At the end of the second time interval T2 and start of the third time interval T3, the camera device has a third simulated focal length S3=100, as indicated by box 2418. At the end of the fourth time interval T4 the camera device has a fifth simulated focal length S5=30, as indicated by box 2420.

During the third time interval T3, the first group of optical chains is at a first fixed focal length, f1=100, as indicated by box 2422. During the third time interval T3, the second group of optical chains is at the first fixed focal length, f1=100, as indicated by box 2424. During the third time interval T3, combined image data from both the first and second groups of optical chains is used to generate third digital zoom images, as indicated by box 2426.

During the first time interval T1, the first group of optical chains is being transitioned from the first fixed focal length to the second fixed focal length, as indicated by box 2428. During the first time interval T1, the second group of optical chains is at the first fixed focal length, f1=100, as indicated by box 2430. During the first time interval T1, combined image data from the second group of optical chains is used to generate first digital zoom images, as indicated by box 2432.

During the second time interval T2, the first group of optical chains is at the second fixed focal length, f2=30, as indicated by box 2434. During the second time interval T2, the second group of optical chains is being transitioned from the first fixed focal length to the second fixed focal length, as indicated by box 2436. During the second time interval T2, combined image data from the first group of optical chains is used to generate second digital zoom images, as indicated by box 2438.

During the fourth time interval T4, the first group of optical chains is at a second fixed focal length, f2=30, as indicated by box 2440. During the fourth time interval T4, the second group of optical chains is at the second fixed focal length, f1=30, as indicated by box 2442. During the fourth time interval T4, combined image data from both the first and second groups of optical chains is used to generate fourth digital zoom images, as indicated by box 2444.

Figures 25, 25A:
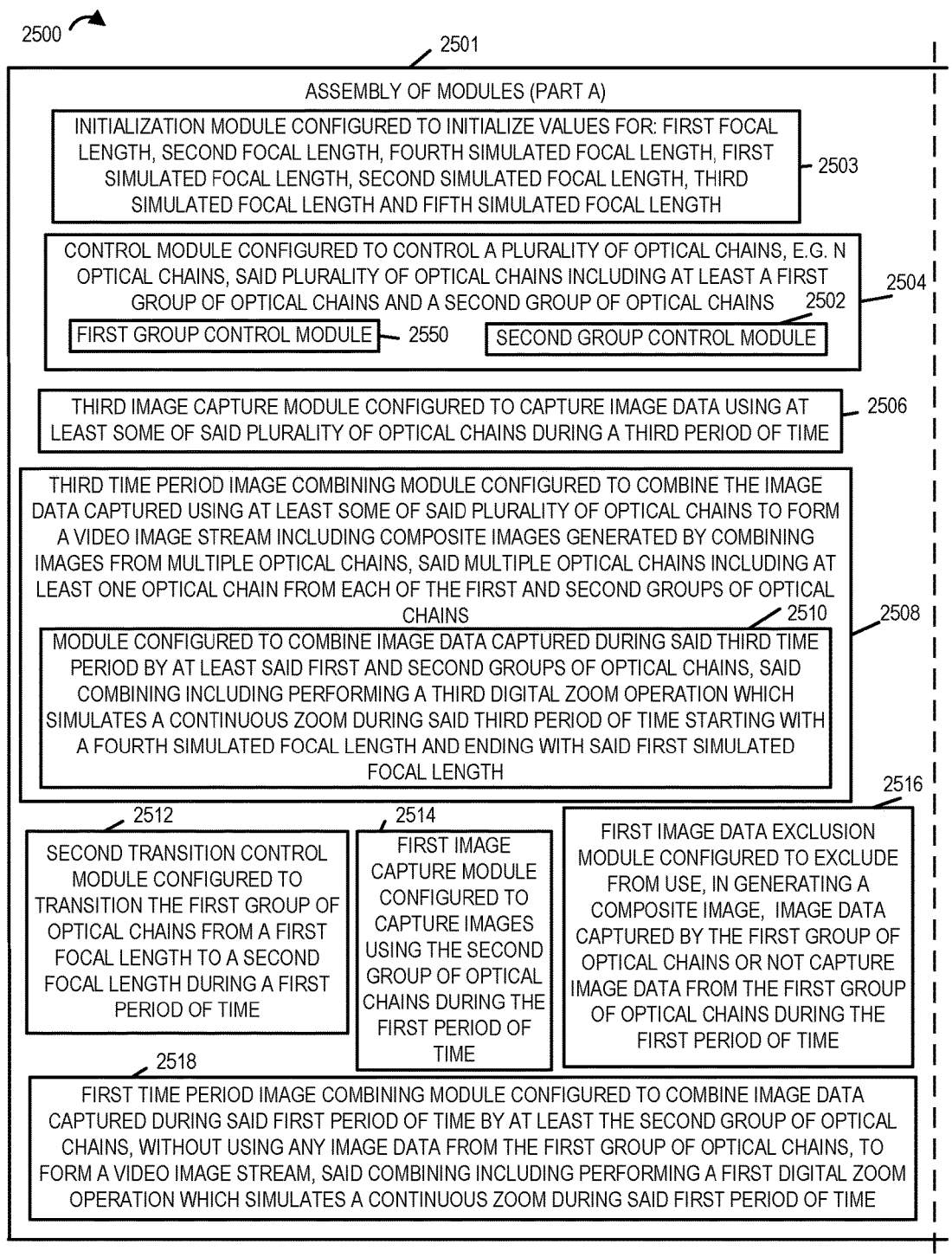
FIG. 25A is a first part of an assembly of modules, which may be included in an exemplary device, e.g., a camera device including groups of optical chains, or exemplary combination of devices, e.g., a camera device including groups of optical chains and a computer device external to the camera device, implementing the method of the flowchart of FIG. 22.
Figure 25B:
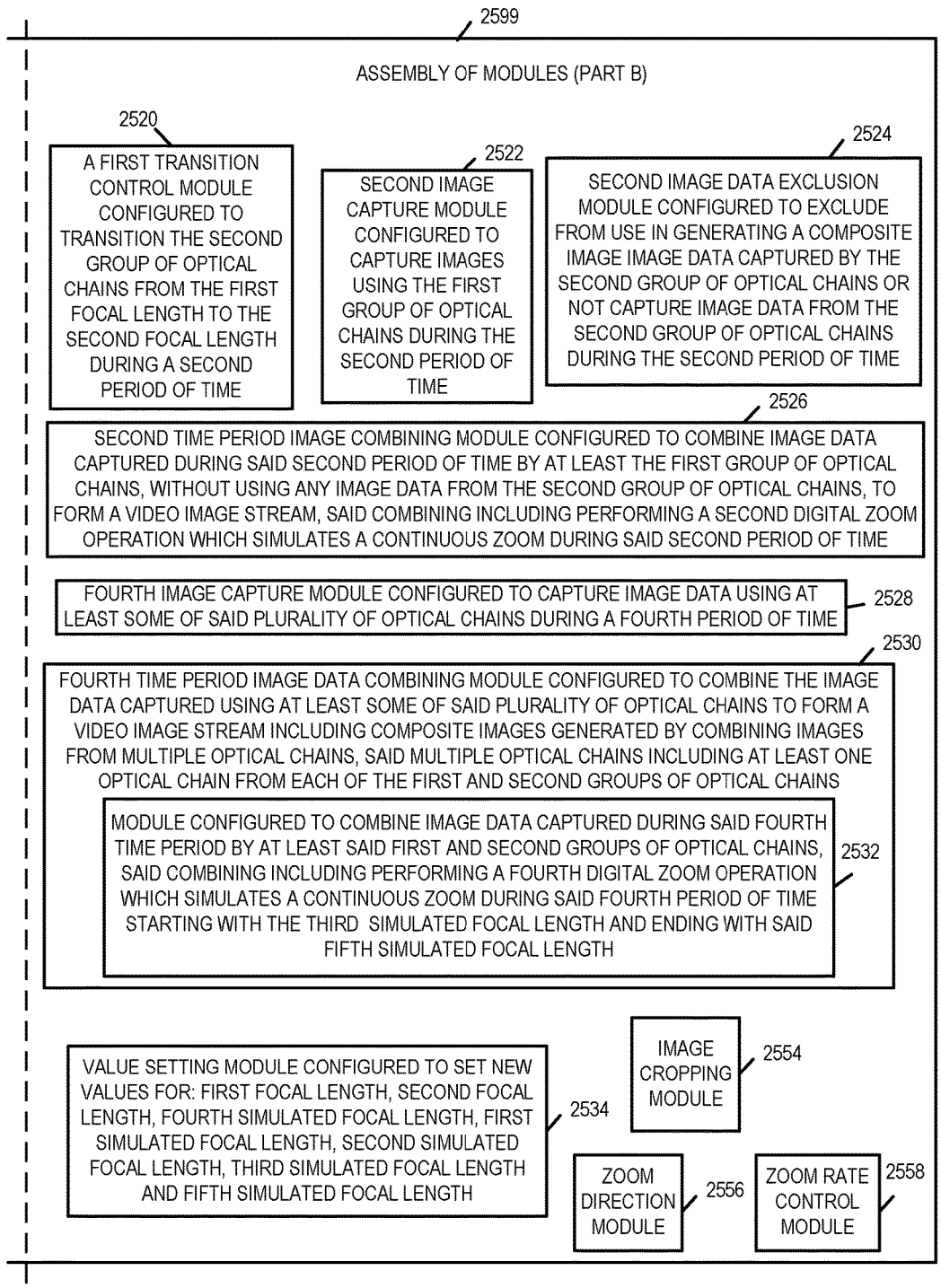
FIG. 25B is a second part of an assembly of modules, which may be included in an exemplary device, e.g., a camera device including groups of optical chains, or exemplary combination of devices, e.g., a camera device including groups of optical chains and a computer device external to the camera device, implementing the method of the flowchart of FIG. 22.

FIG. 25, comprising the combination of FIG. 25A and FIG. 25B, is an assembly of modules 2500, which may be included in an exemplary device, e.g., a camera device including groups of optical chains, or exemplary combination of devices, e.g., a camera device including groups of optical chains and a computer device external to the camera device, implementing the method of flowchart 2200 of FIG. 22. Assembly of modules 2500 includes Part A 2501 and Part B 2599.

The method of FIG. 22 can be implemented in one embodiment by the camera 100. In at least one such embodiment the plurality of optical chain modules 130 include multiple sets of optical chains with the focal lengths of the different sets being capable of being changed, e.g., by changing one or more lens in the chains in the set. As discussed above, this change can be made in a variety of ways by rotating a drum with different lenses mounted thereon, rotating disc with lenses mounted thereon or using other techniques.

In one embodiment the assembly of modules shown in FIG. 25 is part of or used in place of the assembly of modules 118. Thus, the assembly of modules 2500 may be included with the previously described modules in the assembly 118 or with some or all of the modules shown in FIG. 25 being used in place of the modules previously described with regard to assembly 118. The modules in the assembly 2500, when executed by the processor 110 control the camera in one embodiment to implement the method described with regard to FIG. 22. While the modules of FIG. 25 may, and in some embodiments are implemented using software, in other embodiments they are implemented in hardware, e.g., as circuits, which may and in some embodiments are included in the camera device 100.

The assembly of modules shown in FIG. 25 include a plurality of modules 2503, 2504, 2506, 2508, 2510, 2512, 2514, 2516, 2518, 2520, 2522, 2524, 2526, 2528, 2530, 2532, and 2534 for performing the corresponding functions of the steps described with regard to the method shown in FIG. 22.

Assembly of modules 2500 includes an initialization module 2503 configured to initialize values for: first focal length, second focal length, fourth simulated focal length, first simulated focal length, second simulated focal length, and fifth simulated focal length, a control module 2504 configured to control a plurality of optical chains, e.g. N optical chains, said plurality of optical chains including at least a first group of optical chains and a second group of optical chains. Control module 2504 includes a first group control module 2550 configured to control a first group of optical chains and a second group control module 2552 configured to control a second group of optical chains. Assembly of modules 2500 further includes a third image capture module 2506 configured to capture image data using at least some of said plurality of optical chains during a third time period, and a third time period image combining module 2508 configured to combine the image data captured, e.g., by module 2506, using at least some of the plurality of optical chains to form a video image stream including composite images generated by combining images from multiple optical chains, said multiple optical chains including at least one optical chains from each of the first and second groups of optical chains. Module 2508 includes a module 2510 configured to combine image data captured during said third time period by at least said first and second groups of optical chins, said combining including performing a third digital zoom operation which simulates a continuous zoom during said third period of time starting with a fourth simulated focal length and ending with said first simulated focal length.

Assembly of module 2500 further includes a second transition control module 2512 configured to transition the first group of optical chains from a first focal length to a second focal length during a first period of time, a first image capture module 2514 configured to capture images using the second group of optical chains during the first period of time, a first image data exclusion module 2516 configured to exclude from use in generating a composite image, image data captured by the first group of optical chains or not capture image data from the first group of optical chains during the first period of time. Assembly of modules 2500 further includes a first time period image combining module 2518 configured to combine image data captured during said first period of time by at least the second group of optical chains, without using any image data from the first group of optical chains, to form a video image stream, said combining including performing a first digital zoom operation which simulates a continuous zoom during said first period of time.

Assembly of modules 2500 further includes a first transition control module 2520 configure to transition the second group of optical chains from the first focal length to the second focal length during a second period of time, a second image capture module 2522 configured to capture images using the first group of optical chins during the second period of time, and a second image data exclusion module 2524 configured to exclude from use in generating a composite image data captured by the second group of optical chains or not capture image data from the second group of optical chains during the second period of time. Assembly of modules 2500 further includes a second time period image combining module 2526 configured to combine image data captured during said second period of time by at least the first group of optical chains, without using any image data from the second group of optical chains, to form a video image stream, said combining including performing a second digital zoom operation which simulates a continuous zoom during said second period of time.

Assembly of modules 2500 further includes a fourth image capture module 2528 configured to capture image data using at least some of said plurality of optical chains during a fourth period of time, and a fourth time period image data combining module 2530 configured to combine image data captured, e.g., captured by module 2528, using at least some of said plurality of optical chains to form a video image stream including composite images generated by combining images from multiple optical chins, said multiple optical chains including at least one optical chain from each of the first and second groups of optical chains. Module 2530 includes a module 2532 configured to combine image data captured during the fourth period of time by at least the first and second groups of optical chains, said combining including performing a fourth digital zoom operation which simulates a continuous zoom during the fourth period of time starting with the third simulated focal length and ending with the first simulated focal length.

Assembly of modules 2500 further includes a value setting module 2534 configured to set new values for: first focal length, second focal length, fourth simulate focal length, second simulated focal length, third simulated focal length and fifth simulated focal length. Assembly of modules 2554 further includes an image cropping module 2554 configured to crop an image as a part of a zoom operation, a zoom direction module 2556 configured to select between zoom out and zoom in, e.g., in response to a user input, and to control operation in accordance with the selection, and a zoom rate control module 2558 configured to control the zoom rate in accordance with a predetermined setting or in accordance with a user selected rate.

In some embodiments, the focal length of optical chains in the second group of optical chains remains fixed and does not change during said first period of time. In some such embodiments, the focal length of optical chains in the first group of optical chains remains fixed and does not change during said second period of time.

In some embodiments, the first group of optical chains includes optical chains with fixed focal lengths which do not change with respect to time. In some such embodiments, the second group of optical chains includes optical chains with fixed focal length which do not change with respect to time.

In various embodiments, at least one of said first and second groups of optical chains include optical chains with controllable focal lengths which can be changed at points in time. In some such embodiments, both of the first and second groups of optical chains include optical chains with controllable focal lengths which can be changed at points in time.

In some embodiments, the first digital zoom during said first period of time begins with a first simulated focal length and ends with a second simulated focal length. In some such embodiments, said first simulated focal length is equal to or larger than the first focal length. In some embodiments, the first digital zoom is accomplished by taking the entire image or performing an image cropping operation to select a portion of said image.

In various embodiments, said second simulated focal length is equal to or larger than the second focal length. In some embodiments, said first digital zoom is accomplished by taking the entire image or performing an image cropping operation to select a portion of said image.

In some embodiments, the digital zoom during said second period of time begins with the second simulated focal length and ends with a third simulated focal length.

In some such embodiments, said second simulated focal length is equal to or larger than the second focal length. In some such embodiments, said second digital zoom is accomplished by taking the entire images or performing image cropping operations to select a portion of said images In various embodiments, said third simulated focal length is equal to or larger than the second focal length. In some such embodiments, said second digital zoom is accomplished by taking the entire image (equal to lens focal length) or performing an image cropping operation to select a portion of said image (simulating a larger focal length).

In some embodiments, the fourth simulated focal length is greater than or equal to the first focal length.

In some embodiments, the fifth simulated focal length is greater than or equal to the second focal length.

In some embodiments, in which the fourth simulated focal length is less than the first simulated focal length, said first simulated focal length is less than the second simulated focal length, the second simulated focal length is less than the third simulated focal length and the third simulated focal length is less than the fifth simulated focal length (for zooming in) and wherein the first focal length is less than the second focal length.

In some embodiments in which the fourth simulated focal length is greater than the first simulated focal length, said first simulated focal length is greater than the second simulated focal length, the second simulated focal length is greater than the third simulated focal length and the third simulated focal length is greater than the fifth simulated focal length (for zooming out) and wherein the first focal length is greater than the second focal length.

In various embodiments, the rate of change of the ln (natural log) of the simulated focal length during said first, second, third and fourth time periods is the same and is constant, e.g., resulting in continuous zoom at a fixed rate.

In FIG. 25, elements are identified using the first two digits "25" but the same last two digits used in FIG. 22 to identify the step implemented by the module shown in FIG. 25. For example, module 2506 is configured to perform the operations of step 2206, while module 2508 is configured to perform the operations corresponding to step 2208. Since the steps and operations implemented by the modules shown in FIG. 25 have already been described in the context of FIG. 22 they will not be described further. While the FIG. 25 embodiment shows different modules being used for different time periods it should be appreciated that in at least some embodiments an individual module is used and controlled to perform in accordance with the operations to be performed during the particular time period in which the module is being operated. For example, in some embodiments an image capture module is used and/or controlled to perform the operations corresponding to the various image capture modules of FIG. 25 in accordance with what particular time period the image capture module is being operated in. Similarly image combining may be performed by a module which operates in a time dependent manner so that it implements the image combining operations to be performed for a particular time period. Similarly, a single image data exclusion module may be used with the image data exclusion module performing image data exclusion based on which time period particular captured image data corresponds to. Thus, while separate modules may be used as shown in FIG. 25 for the different time periods in some embodiments modules which operate or are controlled to operate as a function of time may be used to perform the functions of the particular type of module for multiple different time periods.

Is should be noted that in at least some embodiments the modules of FIG. 25 are implemented fully in hardware, e.g., as circuits with an individual circuit performing the function of the corresponding module. However, in other embodiments modules are implemented in software or a combination of software and hardware.

The method of FIG. 22 and assembly of modules shown in FIG. 25 can be used in a camera device including optical modules shown in any one of the other figures which can be used in the manner described in FIG. 22. As should be appreciated the method shown in FIG. 22 is flexible and well suited for a wide range of lens and filter configurations.

In various embodiments images captured by optical chains are stored, processed, transmitted to another device for processing and/or displayed, e.g., on a screen of the camera device. Similarly, a composite image generated by a camera device or another device from captured images is stored, processed, transmitted to another device and/or displayed, e.g., on a screen or other display of the camera device.

In various embodiments, the camera device provides a depth map on the device to the user at the time of taking a shot. An object that is at a slant angle or a large group of people may, and sometimes does, fall into several "colors" of depth buckets, and the user may want the entire object or the large group of people to be in-focus and want the background to be blurred. In some embodiments, such as the examples of FIGS. 22-25, the user is given the option to pick multiple depth buckets to be in-focus. The user can select his or her preference based on the depth map, e.g., clicking all of the depth colors that correspond to people in the group.

In some embodiments, the final chosen in-focus range is made continuous regardless of user selection, e.g., the camera automatically includes colors within the limits of the selected user range to be included as part of the in-focus range.

Figure 26A:
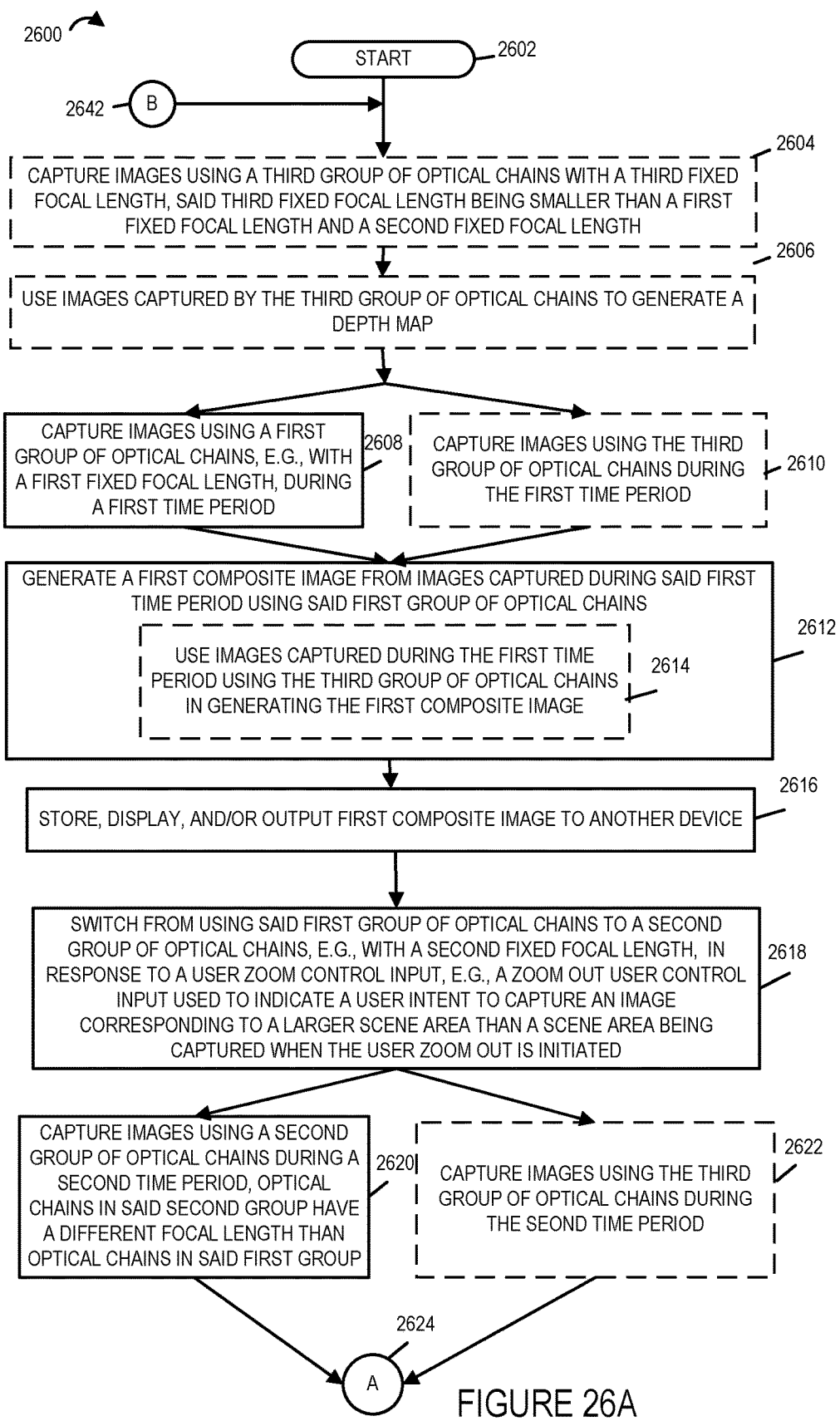
FIG. 26A is a first part of a flowchart of an exemplary method of using multiple optical chains including at least a first group of optical chains and a second group of optical chains in accordance with an exemplary embodiment.
Figure 26:
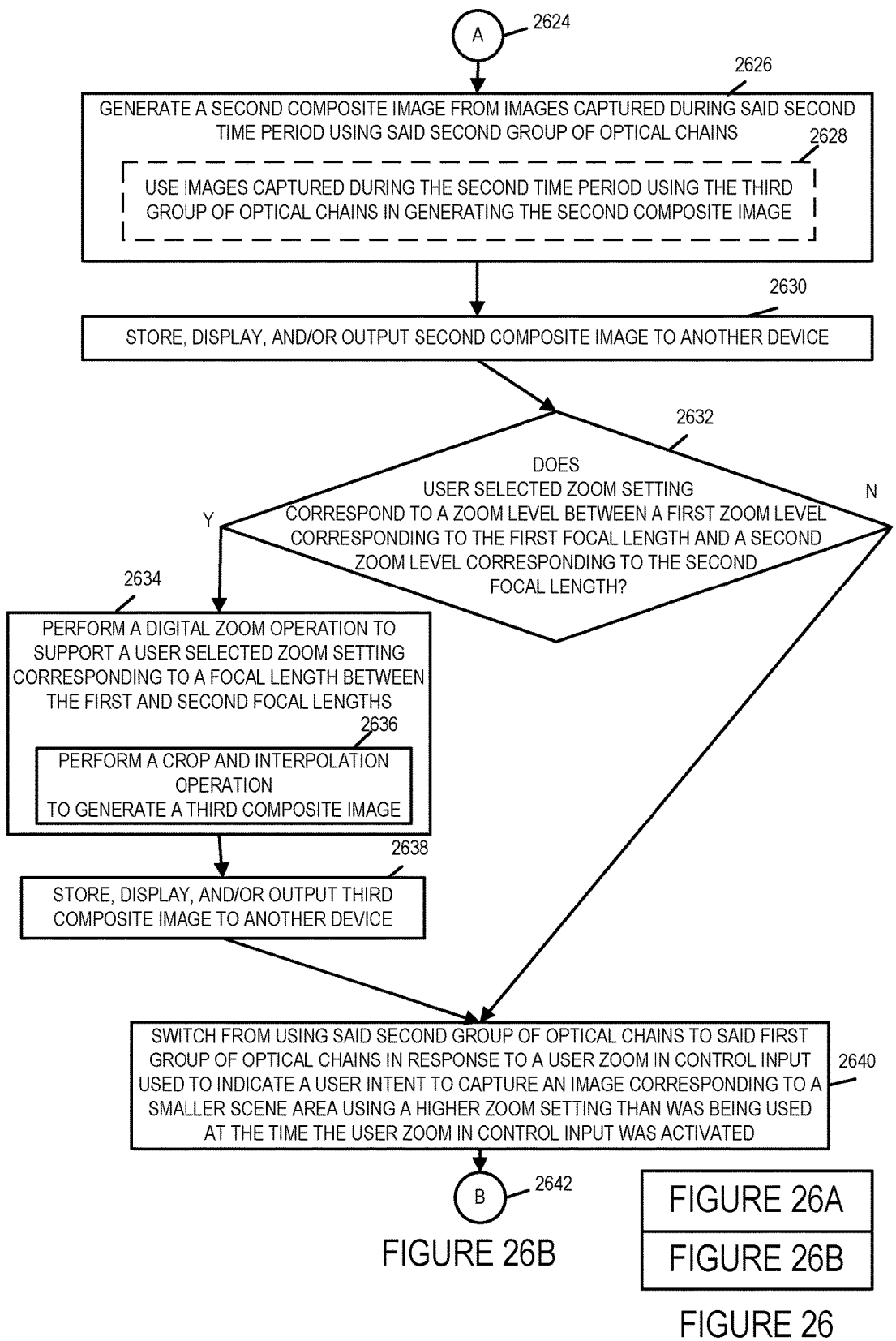
FIG. 26B is a second part of a flowchart of an exemplary method of using multiple optical chains including at least a first group of optical chains and a second group of optical chains in accordance with an exemplary embodiment.

FIG. 26, comprising the combination of FIG. 26A and FIG. 26B, is a flowchart 2600 of an exemplary method of using multiple optical chains including at least a first group of optical chains and a second group of optical chains, in accordance with an exemplary embodiment. In some embodiments, the exemplary method of flowchart 2600 is implemented by a camera device, e.g., camera device 2700 of FIG. 27. In some other embodiments, some portions of the method of flowchart 2600 are implemented by a camera device, e.g., camera device 2700 of FIG. 27, and other portions of flowchart 2600, e.g., image processing steps, are implemented by another device, e.g., computer system 1400 of FIG. 14. In some such embodiments, captured images are output to another device, e.g., computer system 1400 of FIG. 14, in which image processing steps are performed. In various embodiments, optical chains in the first group of optical chains have a first fixed focal length, and optical chains in the second group of optical chains have a second fixed focal length which is smaller than the first fixed focal length.

The exemplary method of flowchart 2600 will be described for an exemplary embodiment in which a camera device implements the steps of flowchart 2600. Steps indicated by dotted lines, in flowchart 2600 are optional steps and may be omitted or bypassed in some embodiments. Operation starts in step 2602 in which the camera device is powered on and initialized. Operation proceeds from step 2602 to step 2604. In step 2604 the camera device captures images using a third group of optical chains with a third fixed focal length, said third fixed focal length being smaller than a first fixed focal length and a second fixed focal length. Operation proceeds from step 2604 to step 2606. In step 2606 the camera device uses images captured by the third group of optical chains to generate a depth map. In some such embodiments, the depth map is used in combining images captured by different optical chains in said first group of optical chains or the second group of optical chains. Operation proceeds from step 2606 to step 2608, and, in some embodiments, to step 2610.

In step 2608, the camera device captures images using a first group of optical chains, e.g., with a first fixed focal length, during a first time period. In step 2610, the camera device captures images using the third group of optical chains during the first time period. Operation proceeds from step 2608 and 2610 to step 2612. In step 2612 the camera device generates a first composite image from images captured during the first period of time using said first group of optical chains. In some embodiments, step 2612 includes step 2614, in which the camera device uses images captured during the first time period using the third group of optical chains in generating the first composite image, e.g., cropped portions of images captured during the first time period using the third group of optical chains are used in generating the first composite image. Operation proceeds from step 2612 to step 2616.

In step 2616, the camera device stores, displays, and/or outputs the first composite image to another device, e.g., computer system 1400 of FIG. 14 or a storage device. Operation proceeds from step 2616 to step 2618. In step 2618 the camera device switches from using said first group of optical chains, e.g., with a first fixed focal length, to a second group of optical chains, e.g., with a second fixed focal length, in response to a user zoom control input, e.g., a zoom out user control input used to indicate a user intent to capture an image corresponding to a larger scene area than a scene area being captured when the user zoom out is initiated. Thus, in step 2618 the camera device switches from a larger focal length group to a smaller focal length group as part of zoom out. Operation proceeds from step 2618 to step 2620, and in some embodiments, to step 2622.

In step 2620 the camera device captures images using a second group of optical chains during a second time period, optical chains in said second group have a different focal length than optical chains in said first group. In stop 2622 the camera device captures images using the third group of optical chains during the second time period. Operation proceeds from step 2620 and step 2622, via connecting node A 2624, to step 2626.

In step 2626 the camera device generates a second composite image from images captured during the second time period using said second group of optical chains. In some embodiments, step 2626 includes step 2628 in which the camera device uses images captured during the second time period using the third group of optical chains in generating the second composite image, e.g., cropped portion of images captured during the second time period using the third group of optical chains in generating the second composite image. Operation proceeds from step 2626 to step 2630, in which the camera device stores, displays, and/or outputs the second composite image to another device. Operation proceeds from step 2630 to step 2632.

In step 2632, the camera device determines if the user selected zoom setting corresponds to a zoom level between a first zoom level corresponding to the first focal length and a second zoom level corresponding to the second focal length and controls operation as a function of the determination. If the camera device determines that the user selected zoom setting corresponds to a zoom level between a first zoom level corresponding to the first focal length and a second zoom level corresponding to the second focal length, then operation proceeds from step 2632 to step 2634; otherwise, operation proceeds from step 2632 to step 2640.

Returning to step 2634, in step 2634 the camera device performs a digital zoom operation to support a user selected zoom setting corresponding to a focal length between the first and second focal lengths. In various embodiments, step 2634 includes step 2636, in which the camera device performs a crop and interpolation operation to generate a third composite image. In some embodiments, a digital zoom is implemented by the camera device as a method of changing the apparent view of a digital photographic or video image being generated. In some embodiments, a digital zoom is accomplished by cropping an image down to a centered area with the same aspect ratio as the original, and in some but not necessarily all embodiments, also interpolating the result back up to the pixel dimensions of the original. In some such embodiments, digital zoom is accomplished computationally. Operation proceeds from step 2634 to step 2638, in which the camera device stores, displays, and/or outputs the third composite image to another device. Operation proceeds from step 2638 to step 2640.

In step 2640 the camera device switches from using the second group of optical chains to said first group of optical chains in response to a user zoom in control input used to indicate a user intent to capture an image corresponding to a smaller area using a higher zoom setting than was being used at the time the user zoom in control input was activated. Operation proceeds from step 2640, via connecting node B 2642 to step 2604.

In some embodiments, the first group of optical chains includes at least four different optical chains corresponding to a first focal length. In some such embodiments, the four optical chains capture different portion of a scene area. In some such embodiments, different portions of the scene area at least partially overlap. In various embodiments, the multiple optical chains include a third group of optical chains have a third fixed focal length which is different from the first fixed focal length of the optical chains in the first group and the second fixed focal length of the optical chains in the second group. In some such embodiments, the third group of optical chains includes one or more optical chains, and the first and second groups of optical chains include multiple optical chains. In some such embodiments, the number of optical chains in the first group is at least 3. In some such embodiments, the number of optical chains in the second group is at least 3. In some such embodiments, the number of optical chains in the third group is at least 2. In some embodiments, images captured by optical chins in at least two groups of optical chains are used to generate a composite image.

Figure 27:
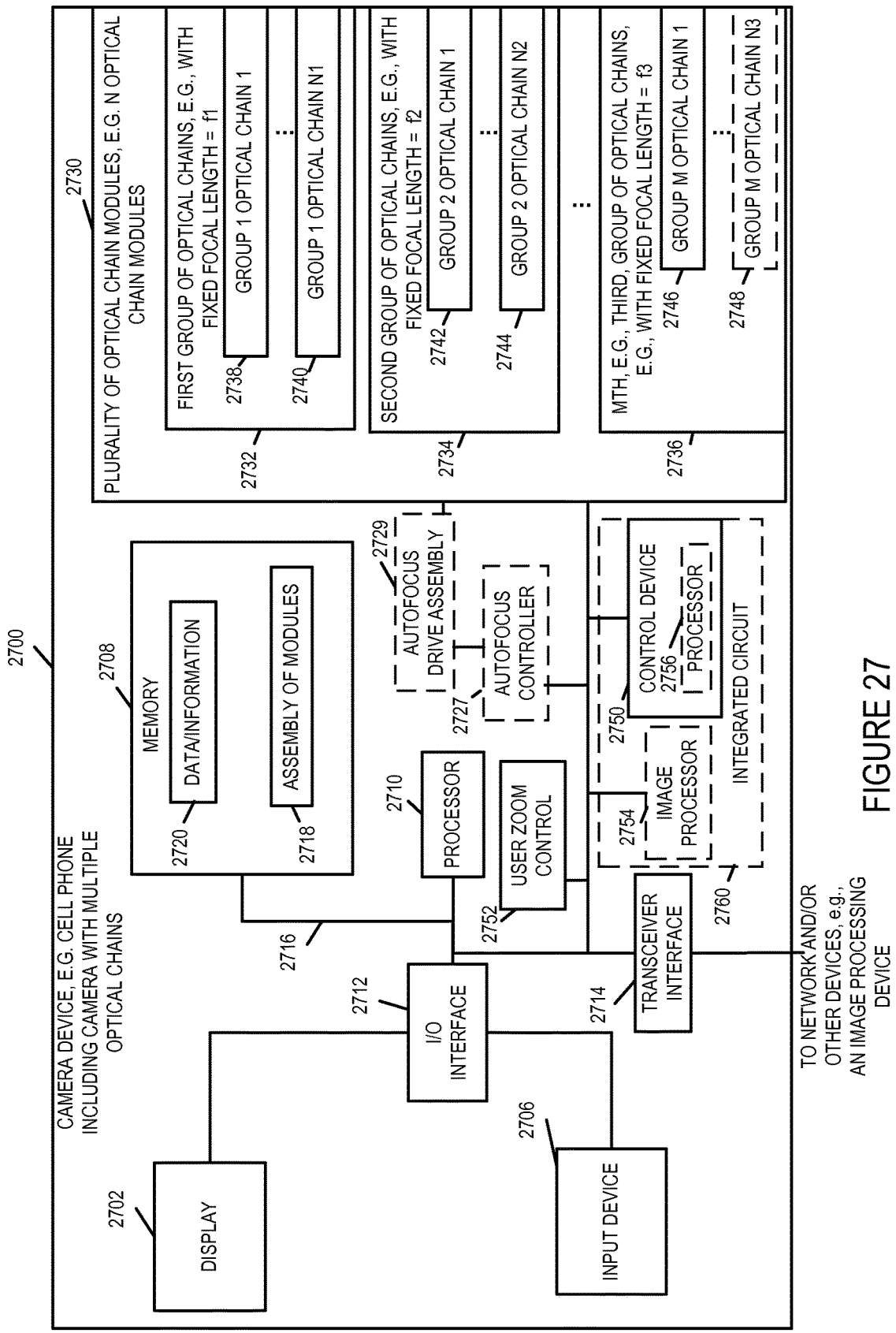
FIG. 27 is an exemplary camera device in accordance with an exemplary embodiment.

FIG. 27 is a drawing of an exemplary camera device 2700, e.g., a cell phone including a camera, in accordance with an exemplary embodiment. In various embodiments, exemplary camera device 2700 implements a method in accordance with flowchart 2600.

The camera device 2700, in some embodiments, is a portable device, e.g., a cell phone or tablet including a camera assembly. In other embodiments, it is fixed device such as a wall mounted camera. In still other embodiments, the camera device is a portable camera.

The exemplary camera device 2700 includes a display device 2702, an input device 2706, memory 2708, a processor 2710, a transceiver interface 2714, e.g., a cellular interface, a WIFI interface, and/or a USB interface, an I/O interface 2712, and a bus 2716 which are mounted in a housing represented by the rectangular box touched by the line leading to reference number 2700. The input device 2706 may be, and in some embodiments is, e.g., keypad, touch screen, or similar device that may be used for inputting information, data and/or instructions. The display device 2702 may be, and in some embodiments is, a touch screen, used to display images, video, information regarding the configuration of the camera device, and/or status of data processing being performed on the camera device. In the case where the display device 2702 is a touch screen, the display device 2702 serves as an additional input device and/or as an alternative to the separate input device, e.g., buttons, 2706. The I/O interface 2712 couples the display 2702 and input device 2706 to the bus 2716 and interfaces between the display 2702, input device 2706 and the other elements of the camera which can communicate and interact via the bus 2716. In addition to being coupled to the I/O interface 2712, the bus 2716 is coupled to the memory 2708, processor 2710, a transceiver interface 2714, and a plurality of optical chain modules 2730, e.g., N optical chain modules. The plurality of optical chains module 2730 includes a plurality of groups of optical chains modules (first group of optical chains 2732, second group of optical chains 2734, . . . , Mth group of optical chains 2736.) In one exemplary embodiment, the first group of optical chains 2732 have a first fixed focal length=f1, the second group of optical chains 2734 have a second fixed focal length=f2, and the Mth group of optical chains 2736, where M=3, have a third fixed focal length=f3. In some such embodiments, f1>f2>f3.

The first group of optical chains 2732 includes a plurality of optical chains (group 1 optical chain 1 2738, . . . , group 1 optical chain N1 2740). The second group of optical chains 2734 includes a plurality of optical chains (group 2 optical chain 1 2742, . . . , group 2 optical chain N2 2743). The Mth group of optical chains 2736 includes one or more optical chains (group M optical chain 1 2746, . . . , group M optical chain N3 2748).

In some embodiments the number of optical chains, N, in the camera device 2700 is an integer greater than 4, e.g., 5, 7, 8, 9, 10 or a larger value depending on the particular embodiment. Images captured by individual optical chain modules in the plurality of optical chain modules 2730 can be stored in memory 2708, e.g., as part of the data/information 2720 and processed by processor 2710 and/or processor 2754, e.g., to generate one or more composite images. Composite images may also be stored in memory 2708, e.g., as part of data/information 2720. In various embodiments, images from one or more selected groups of optical chains are used to generate a composite image, e.g., with the particular one or more selected groups which are used being a function of a zoom setting, e.g. a user selected zoom setting.

In some embodiments, multiple captured images and/or composite images may be processed to form video, e.g., a series of images corresponding to a period of time. Transceiver interface 2714 couples the internal components of the camera device 2700 to an external network, e.g., the Internet, and/or one or more other devices e.g., memory or stand alone computer. Via interface 2714 the camera device 2700 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 2714 of the camera device 2700 may be, and in some instances is, coupled to a computer so that image data may be processed on the external computer. In some embodiments the external computer has a higher computational processing capability than the camera device 2700 which allows for more computationally complex image processing of the image data outputted to occur on the external computer. The transceiver interface 2714 also allows data, information and instructions to be supplied to the camera device 2700 from one or more networks and/or other external devices such as a computer or memory for storage and/or processing on the camera device 2700. For example, background images may be supplied to the camera device to be combined by the camera processor, e.g., processor 2710 and/or image processor 2754 with one or more images captured by the camera device 2700. Instructions and/or data updates can be loaded onto the camera via interface 2714 and stored in memory 2708.

The camera device 2700 may include, and in some embodiments does include, an autofocus controller 2727 and/or autofocus drive assembly 2729. The autofocus controller 2727 is present in at least some autofocus embodiments but would be omitted in fixed focus embodiments.

Camera device 2700 further includes a user zoom control 2752, and a control device 2750 coupled to the bus 2716. In some embodiments, the control device 2750 includes a processor 2750. In some embodiments, the camera device 2700 includes an image processor 2754, e.g., a dedicated customized image processor. In various embodiments, the image processor 2754 and the control device 2750 are included as part of an integrated circuit 2760. In some embodiments, processor 2710, image processor 2754 and control processor 2756 are included as part of an integrated circuit.

One or more or all of the processors (2710, 2756, 2754) controls operation of the camera device 2700 to control the elements of the camera device 2700 to implement the steps of the methods described herein. One or more of the processors may be a dedicated processor that is preconfigured to implement the method or portions of the method. For example, in one embodiment, image processor 2754 performs image processing operations including, e.g. combining captured images from multiple optical chains, cropping images, etc., processor 2756 performs various control operation relating to the camera, e.g., switching between groups of optical chains, etc., and processor 2710 performs various other function such as receiving and processing user input and displaying output on the display, etc. However, in many embodiments the processor or processors (2710, 2754, and/or 2756) operate under direction of software modules and/or routines stored in the memory 2708 which include instructions that, when executed, cause the one or more processors to control the camera device 2700 to implement one, more or all of the methods described herein. Memory 2708 includes an assembly of modules 2718 wherein one or more modules include one or more software routines, e.g., machine executable instructions, for implementing the image capture and/or image data processing methods of the present invention. Individual steps and/or lines of code in the modules of 2718 when executed by the processor (2710, 2754, 2756) control the processor (2710, 2754, 2756) to perform steps of the method of the invention. When executed by processor (2710, 2754, 2756) the data processing modules included in assembly of modules 2718 cause at least some data to be processed by the processor (2710, 2754, 2756) in accordance with the method of the present invention. The resulting data and information (e.g., captured images of a scene, combined images of a scene, etc.) are stored in data memory 2720 for future use, additional processing, and/or output, e.g., to display device 2702 for display or to another device for transmission, processing and/or display. The memory 2708 includes different types of memory for example, Random Access Memory (RAM) in which the assembly of modules 2718 and data/information 2720 may be, and in some embodiments are stored for future use. Read only Memory (ROM) in which the assembly of modules 2718 may be stored for power failures. Non-volatile memory such as flash memory for storage of data, information and instructions may also be used to implement memory 2708. Memory cards may be added to the device to provide additional memory for storing data (e.g., images and video) and/or instructions such as programming. Accordingly, memory 2708 may be implemented using any of a wide variety of non-transitory computer or machine readable mediums which serve as storage devices.

In various embodiments, the camera device 2700 includes multiple optical chains, and the multiple optical chains including at least a first group of optical chains 2732 and a second group of optical chains 2734, and optical chains in said first and second groups of optical chains (2732, 2734) have different focal lengths.

Control device 2750 is configured to control said multiple optical chains, and control includes: controlling optical chains in said first group of optical chains 2732 during a first time period to capture images; controlling optical chains in said second group of optical chains 2734 during a second time period to capture images.

In various embodiments, image processor 2754 is configured to: generate a first composite image from images captured during said first time period using said first group of optical chains; and generate a second composite image from images captured during said second time period using said second group of optical chains.

In various embodiments, multiple optical chains, included in the plurality of optical chain modules 2730, control device 2730 and processor 2754 are included in camera device 2700.

In some embodiments, multiple optical chains included in the plurality of optical chain modules 2730, and control device 2750 are included in camera device 2700 and said image processor is included in a device external to said camera device 2700, e.g., the image processor is processor 1410 of computer system 1400 of FIG. 14.

In some embodiments, control device 2750 includes a first processor, e.g., processor 2756 in camera device 2700 and the image processor is a second processor, e.g., processor 2754 in camera device 2700 or processor 1410 in computer system 1400. For example, different chips are used within camera device 2700 or images are captured by camera device 2700 under the control of processor 2756 in control device 2750 and the images are processed separately on a PC, e.g., computer system 1400 using processor 1410.

In some embodiments, control device 2750 and image processor 2754 are implemented on a single integrated circuit 2760.

In various embodiments, optical chains (2738, . . . , 2740) in the first group of optical chains 2732 have a first fixed focal length, e.g., f1; and optical chains (2742, . . . , 2744) in said second group of optical chains 2734 have a second fixed focal length, e.g., f2, which is smaller than said first fixed focal length, e.g., f2<f1.

In various embodiments, control device 2750 is further configured to switch from using said first group of optical chains 2732 to said second group of optical chains 2734 in response to a user zoom control setting from the user zoom control 2754.

In various embodiments, user zoom control input, e.g., received by the user zoom control 2752, allows a user to zoom out and thereby select a zoom setting used to capture or generate an image corresponding to a larger scene area than a scene area being captured when the user zoom out was initiated. Thus a switch from a large focal length group to a smaller focal length group is performed as a part of zoom out operation.

Zoom control module, e.g., a module included in assembly of modules 2718 and loaded into processor 2756 or included as part of processor 2756, e.g., as circuitry, or a module included in assembly of modules 2718 and loaded into processor 2754 or included as part of processor 2754, e.g., as circuitry controls switching from using images captured by said second group of optical chains to said first group of optical chains in response to a user initiated zoom in operation used to indicate a user intent to capture an image corresponding to a smaller scene area using a higher zoom setting than was being used at the time the user zoom in control input was activated.

In various embodiments, image processor 2754 is configured to perform a digital zoom operation to support a user selected zoom setting corresponding to a focal length between said first and second focal lengths.

In various embodiments, image processor 2754 is configured to perform a digital zoom operation, in response to a user selecting a zoom setting which corresponds to the zoom level which is between a first zoom level corresponding to said first focal length and a second zoom level corresponding to said second focal length. In various embodiments, image processor 2754 is configured to perform a crop and interpolation operation as part of said digital zoom operation.

In some embodiments, the first group of optical chains 2732 includes at least four different optical chains corresponding to a first focal length. In some such embodiments, the four optical chains in said first group 2732 capture different portions of a scene area. In some such embodiments, said different portions of the scene area at least partially overlap.

In various embodiments, the multiple optical chains 2730 further includes a third group of optical chains 2736 having a third fixed focal length which is different from the first fixed focal length of the optical chains in the first group 2732 and the second fixed focal length of the optical chains in the second group 2734, said third group 2736 of optical chains including one or more optical chains, said first and second groups of optical chains each including multiple optical chains.

In some embodiments, the number of optical chains in said first group 2732 of optical chains is at least 3, e.g., N1 is at least 3. In some such embodiments, the number of optical chains in said second group 2734 is at least three, e.g., N2 is at least 3. In some such embodiments, the number of optical chains in said third group 2736 is at least two, e.g., N3 is at least 2.

In various embodiments, images captured by optical chains from at least two groups of optical chains of different focal lengths are used to generate a composite image, e.g., images captured by the first and third groups of optical chains are used to generate a composite image or images captured by the second and third groups are used to generate a composite image.

In various embodiments, the third focal length, e.g., corresponding to the third group, is smaller than the first and second focal lengths, e.g., corresponding to the first and second groups respectively, and image processor 2754 is further configured to: use images captured by said third group of optical chains to generate a depth map used in combining images captured by different optical chains in said first group of optical chains or said second group of optical chains.

In some embodiments, an exemplary image capture system includes camera device 2700 of FIG. 27. In some other embodiments, an exemplary image capture system includes camera device 2700 and computer system 1400, e.g., a PC, of FIG. 14.

Figure 28:
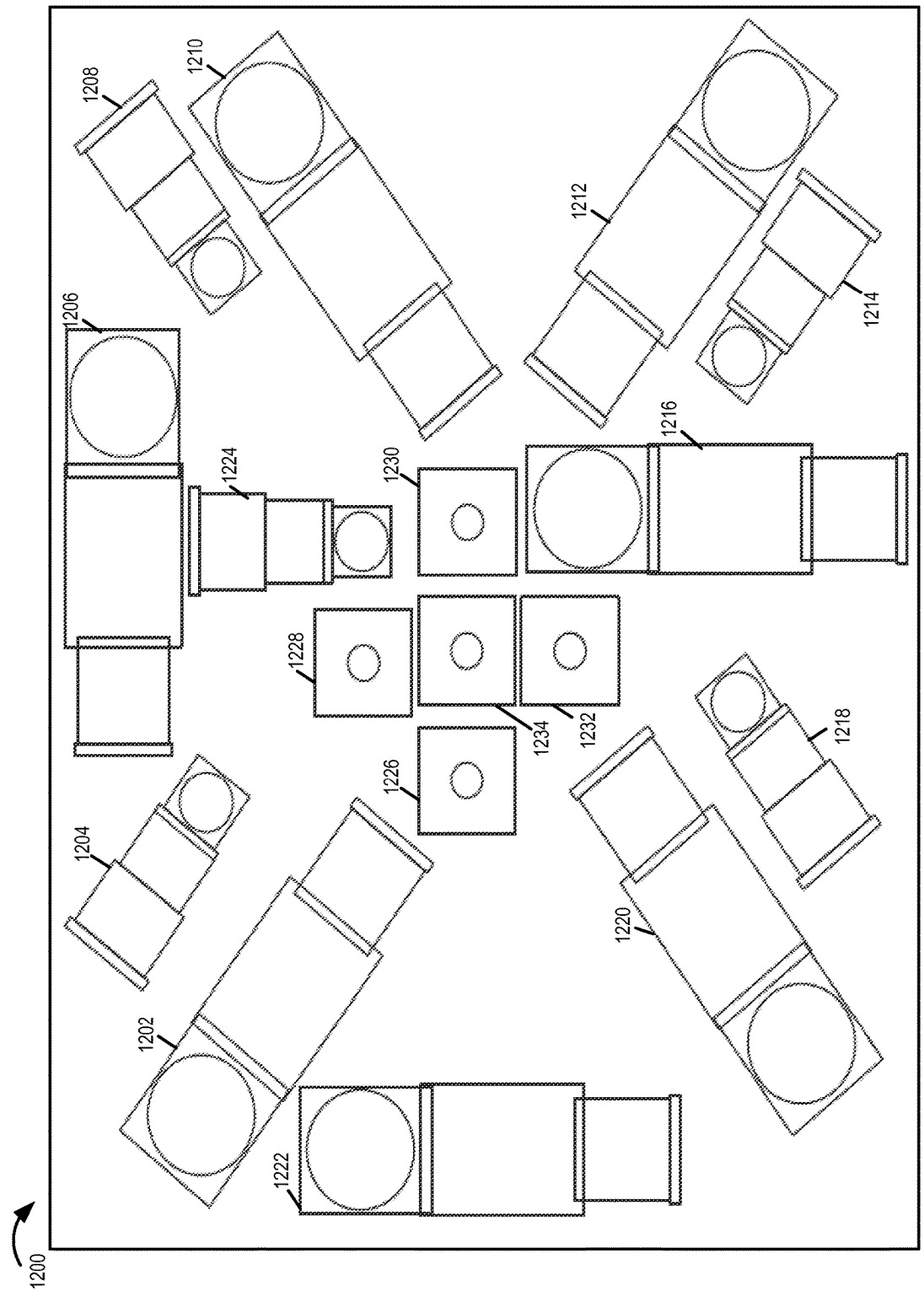
FIG. 28 is a diagram showing how 17 optical chains, e.g., camera modules, of a camera implemented in accordance with an exemplary embodiment can be arranged within the body of the camera device.

FIG. 28 is a diagram 1200 showing how the 17 optical chains, e.g., camera modules, of a camera implemented in accordance with an exemplary embodiment can be arranged within the body of the camera device such as the camera device of FIG. 2, FIG. 27 or any of the other camera devices or cameras described in the present application. The 17 optical chains correspond to three different groups when considered from the perspective of the focal length of the optical chains. The seven optical chains 1202, 1206, 1210, 1212, 1216 1220, 1222 with the largest lenses and/or outer opens, and have the largest focal lengths have focal length F1. F1 in some embodiments is equivalent to a 140 mm lens used on a 35 mm conventional film camera. Thus the 140 mm focal length of the optical chain including a sensor is what is sometimes referred to as a 35 mm equivalent focal length and it is a measure that indicates the angle of view of the particular combination of a camera lens, lenses or other optical elements of optical chain and the sensor size of the sensor in the optical chain. The five camera modules 1204, 1208, 1214, 1218, 1224 with the medium diameter lenses and medium supported focal lengths correspond to a focal length F2 which is smaller than F1. In some embodiments F2 is a focal length equivalent to a 70 mm lens of a 35 mm conventional film camera. The five optical chains 1226, 1228, 1230, 1232 and 1234 having the smallest diameter outer lenses and smallest focal lengths and are implemented using optical chains which have a focal length F3. In some embodiments F3 is equivalent to a 35 mm focal length lens of a conventional 35 mm film camera. Each of the optical chains shown in FIG. 28 include at least one lens and a sensor. Some or all of the optical chain modules may include a mirror or other light redirection device in addition to the mirror and lens.

In some embodiments the focal lengths of the optical chain modules shown in FIG. 28 are fixed. In other embodiments, the optical chain modules can change their focal length, e.g., from one discrete focal length to another, e.g., by moving one or more of the elements, e.g., lenses or mirror of the optical chain module. The focal lengths of some or all of the optical chain modules, in one or more of the groups, may be changed from one discrete focal length setting to another discrete focal length setting in some embodiments.

Figure 29:
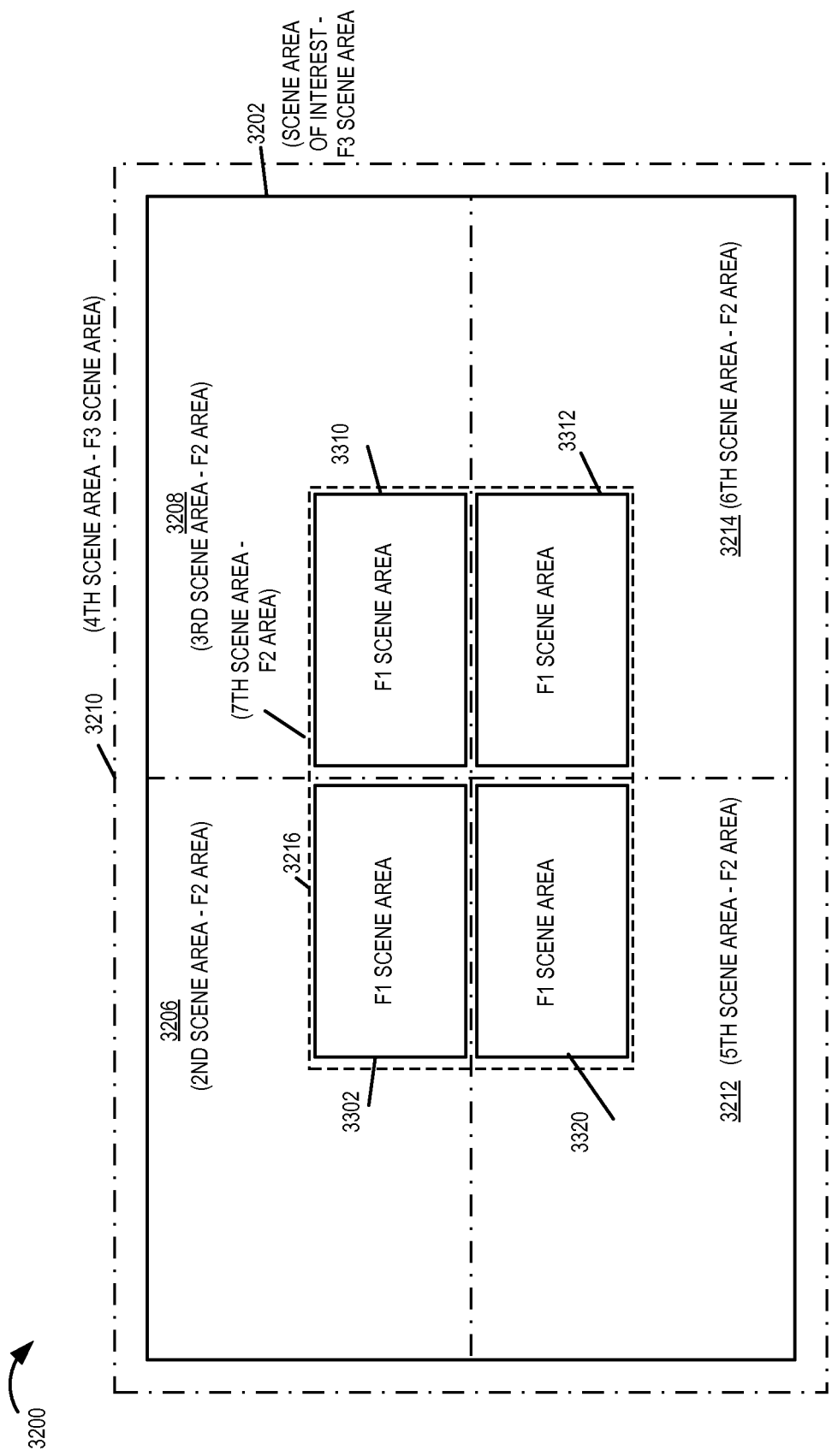
FIG. 29 is a diagram showing scene areas captured by different optical chain modules of an exemplary camera device such as the camera device of FIG. 28.

The image capture area of different optical chain modules corresponding to different focal length groups can be appreciated from FIG. 29. FIG. 29 includes is a diagram 3200 which shows scene areas captured by different optical chain modules of the camera device 1200 when they are operated in parallel to capture images to be used to generate a composite image, e.g., at a user controlled zoom setting.

Scene areas 3302, 3310, 3320, 3312 are captured by camera modules having focal lengths F1, e.g., the longest focal lengths of the camera device 1200 and which thus capture the smallest scene area. For example scene area 3302 can be captured by camera module 1202, scene area 3310 can be captured by camera module 1210, scene area 3320 can be captured by camera module 1220 and scene area 3312 can be captured by camera module 1212 operating in parallel, e.g., to capture images at the same time. While not shown in FIG. 29 to avoid confusion by the presence of an excessive number of boxes, in some embodiments a fifth F1 camera module 1216 is used to capture an F1 Scene area at the center of the scene shown in FIG. 29.

One or more camera modules corresponding to the other focal length groups, e.g., F2 and F3, can, and sometimes are, also be operated to capture images while the images of areas 3302, 3310, 3320, 3312 are captured. For example, F2 module 1204 is sometimes operated to capture scene area 3206, module 1208 is operated to capture scene area 3208, module 1214 is operated to capture scene area 3214 and module 1218 is operated to capture scene area 3312. In addition, F2 module 1224 is operated in some embodiments to capture scene area 3216.

One or more F3 camera modules capture images of the scene area 3210. for example camera modules 1234, 1230 are operated in some embodiments to capture images of scene area 3210. While images can and sometimes are captured in parallel by two or more groups of camera modules with different focal lengths, e.g., two or 3 of the groups explained with reference to FIG. 28 and/or FIG. 29, which captured images are used to generate a composite image are normally controlled based on a user zoom setting. Thus, in some embodiments, depending on the user zoom setting different optical chains and/or groups of optical chains are used to capture images which will be used to generate the composite image corresponding to the user selected zoom setting.

Images which are not to be used to generate a composite image, even if captured by a camera module, are not stored in the memory of the camera device for purposed of composite image generation in some embodiments to save memory. Thus, in at least some embodiments, based on the user zoom setting some optical chain modules are not used and/or captured images are exclude from use in generating the composite image. For example, in some embodiments when the zoom setting indicates a user desire to capture the scene area 3216, the F2 camera module used to capture the scene area 3216 may be used in combination with the F1 camera modules used to capture scene areas 3302, 3320, 3310 and 3312 but the F3 camera module(s) used to capture scene area 3210 may be left unused. However, when a user selected zoom setting indicates a desire to capture the scene area 3210 the one or more F3 camera modules which capture scene area 3210 are used in combination with the F2 camera modules which captures scene areas 3206, 3208, 3212, 3214. In this manner a scene area corresponding to a user selected zoom setting may be captured by camera modules corresponding to multiple different focal lengths. Use of the image areas captured by the shorter focal lengths facilitates combing of image captured by the longer length focal length modules.

Figure 30:
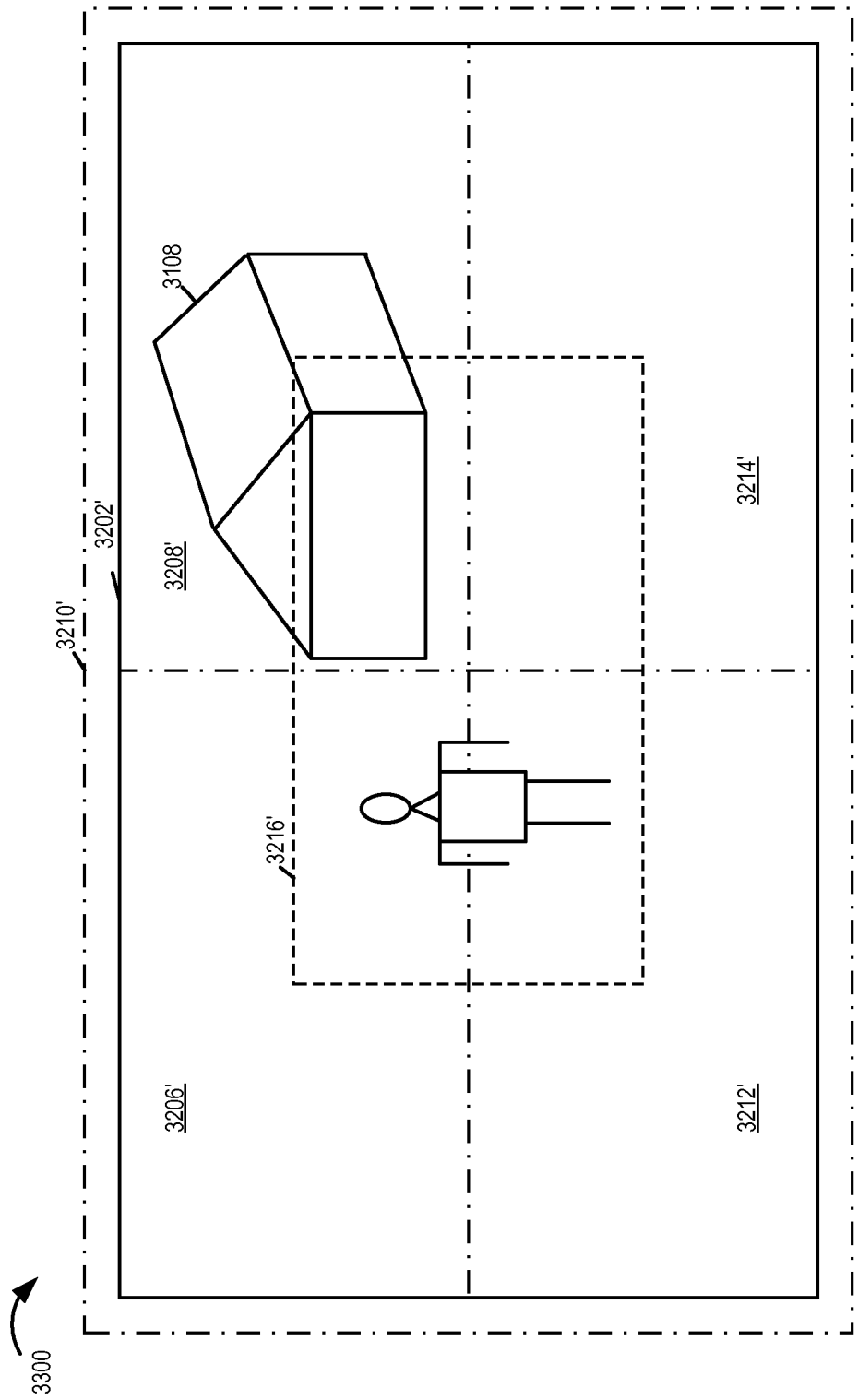
FIG. 30 shows portions of a scene captured by a camera device such as the one shown in FIG. 28 and how the scene portions may relate to the scene areas shown in FIG. 29.

FIG. 30 illustrates an exemplary scene 3300 that may be captured using the F3 and F2 camera modules in combination as discussed with regard to FIG. 29 to generate a composite image corresponding to a F3 user selected zoom setting. The FIG. 29 example assumes the outputs of the F1 camera modules are not used in generating the composite image for the F3 zoom setting but it should be appreciated that they could be, and in some embodiments are, used as well to generate the composite image. A number followed by a prime is used to indicate the scene portion corresponding to the scene area with the corresponding number of FIG. 29. For example, exemplary scene portion 3206' corresponds to second scene area 3206 while scene portion 3208' corresponds to scene area 3208.

It should be appreciated from the discussion of FIGS. 29 and 30 that different groups and/or numbers of camera modules may, and sometimes are, used at different times to generate composite images corresponding to user zoom settings.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle. Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed:

1. A method, the method comprising:
    operating a camera device during at least a first period of time and a second period of time, the camera device including a plurality of optical chains, said plurality of optical chains including at least a first group of optical chains and a second group of optical chains, said first group of optical chains including multiple optical chains, each optical chain in said first group of optical chains including a lens and a sensor, the second group of optical chains including multiple optical chains, each optical chain in the second group of optical chains including a lens and a sensor,
    operating the camera device during the first period of time including:
        i) capturing images using the multiple optical chains in the second group of optical chains; and
    operating the camera device during the second period of time including:
        i) transitioning the multiple optical chains in the second group of optical chains from a first focal length to a second focal length; and
        ii) capturing images using the multiple optical chains in the first group of optical chains, said first group of optical chains having the first focal length during said second period of time, optical chains in said first group of optical chains having a different focal length than optical chains in said second group of optical chains during at least a portion of said second period of time.

2. The method of claim 1, further comprising:
    generating a combined image corresponding to the second period of time from image data captured by the multiple optical chains in said first group of optical chains during said second time period; and
    wherein operating the camera device further includes operating the camera device during a third period of time which immediately precedes said first period of time to capture images using optical chains in both said first and second groups of optical chains, said optical chains in both said first and second groups of optical chains having the first focal length during said first period of time;
    and
    wherein the method further includes generating a combined image corresponding to the third period of time from image data captured by optical chains in both said first and second optical chains during said third period of time.

3. The method of claim 1, wherein operating the camera device during the first period of time further includes:
    transitioning the multiple optical chains in the first group of optical chains from the first focal length to the second focal length during the first period of time.

4. The method of claim 2, wherein the focal length of optical chains in the second group of optical chains remains fixed and does not change during said first period of time; and
    wherein the focal length of optical chains in the first group of optical chains remains fixed and does not change during said second period of time.

5. The method of claim 1,
    wherein said first group of optical chains includes optical chains which do not change with respect to time.

6. The method of claim 1, further comprising:
    generating a composite image corresponding to a first zoom setting from images captured by said second group of optical chains during said first period of time, said first zoom setting corresponding to a focal length of the second group of optical chains during said first period of time; and
    generating a composite image corresponding to a second zoom setting from images captured by said first group of optical chains during said second period of time, said second zoom setting being different from said first zoom setting and corresponding to a focal length of the first group of optical chains during said second period of time.

7. The method of claim 6, wherein said first group of optical chains includes at least 3 optical chains and wherein aid second group of optical chains includes at least 3 optical chains.

8. The method of claim 1, further comprising:
excluding from use in generating a composite image, image data captured by the first group of optical chains, or not capturing image data from the first group of optical chains during said first period of time.

9. The method of claim 8, further comprising:
excluding from use in generating a composite image, image data captured by the second group of optical chains, or not capturing image data from the second group of optical chains during said second period of time.

10. The method of claim 9, further comprising:
during a third period of time which precedes said first period of time capturing image data using at least some of said plurality of optical chains; and
combining the image data captured using at least some of said plurality of optical chains during the third time period to form a video image stream including composite images generated by combining images from multiple optical chains, said multiple optical chains including at least one optical chain from each of the first and second groups of optical chains.

11. The method of claim 1, further comprising:
combining image data captured during said first time period by at least said second group of optical chains, without using any image data from said first group of optical chains, to form a video image stream, said combining including performing a first digital zoom operation which simulates a continuous zoom during said first period of time.

12. The method of claim 11, wherein the first digital zoom during said first period of time begins with a first simulated focal length and ends with a second simulated focal length which is different from the first simulated focal length.

13. The method of claim 11, further comprising:
combining image data captured during said second time period by at least said first group of optical chains, without using any image data from said second group of optical chains, to form a video image stream, said combining including performing a second digital zoom operation which simulates a continuous zoom during said second period of time.

14. The method of claim 13,
wherein the digital zoom during said second period of time begins with the second simulated focal length and ends with a third simulated focal length which is different from the second simulated focal length; and
wherein said second digital zoom is accomplished by taking the entire images or performing image cropping operations to select a portion of said images.

15. A camera device comprising:
a plurality of optical chains, said plurality of optical chains including at least a first group of optical chains and a second group of optical chains, each optical chain in the first group of optical chains and the second group of optical chains including a lens and a sensor, said first group of optical chains including multiple optical chains, said second group of optical chains including multiple optical chains;
a first image capture module configured to capture images using the second group of optical chains during a first period of time; and
a second image capture module configured to capture images using the first group of optical chains during a second period of time, optical chains in said first group of optical chains have a different focal length than optical chains in said second group of optical chains during at least a portion of said second period of time; and
a first transition control module configured to transition the second group of optical chains from a first focal length to a second focal length during the second period of time.

16. The camera device of claim 15,
wherein the first group of optical chains includes at least 3 optical chains; and
wherein the second group of optical chains includes at least 3 optical chains.

17. The camera device of claim 16, further comprising:
a second transition control module configured to transition the first group of optical chains from a first focal length to a second focal length during the first period of time.

18. The camera device of claim 15, wherein said first group of optical chains includes optical chains with fixed focal lengths which do not change with respect to time.

19. The camera device of claim 15, further comprising:
a first image data exclusion module configured to exclude from use in generating a composite image, image data captured by the first group of optical chains, or not capture image data from the first group of optical chains during said first period of time;
a third image capture module configured to capture image data using at least some of said plurality of optical chains during a third period of time which precedes said first period of time; and
a third time period image combining module configured to combine the image data captured using at least some of said plurality of optical chains during the third time period to form a video image stream including composite images generated by combining images from multiple optical chains, said multiple optical chains including at least one optical chain from each of the first and second groups of optical chains.

20. A non-transitory computer readable medium having processor executable instructions stored thereon, which, executed by a processor of a camera device, control said camera device to perform the steps of:
capturing images using a second group of optical chains during a first period of time, said second group of optical chains including multiple optical chains, each optical chain in said second group of optical chains including a lens and a sensor; and
capturing images using a first group of optical chains during a second period of time, optical chains in said first group of optical chains have a different focal length than optical chains in said second group of optical chains during at least a portion of said second period of time, said first group of optical chains including multiple optical chains, each optical chain in the first group of optical chains including a lens and a sensor; and
transitioning the multiple optical chains in the second group of optical chains from a first focal length to a second focal length during said second period of time.

21. The method of claim 1, further comprising:
generating a composite image corresponding to a first zoom setting from images captured by said second group of optical chains during said first period of time, said first zoom setting corresponding to a focal length of the second group of optical chains during said first period of time; and
generating a composite image corresponding to a second zoom setting from images captured by said first group of optical chains during said second period of time, said second zoom being different from said first zoom setting and corresponding to a focal length of the first group of optical chains during said second period of time.

22. The method of claim 21,
wherein at the start of said first time period the first set of optical chains has said first focal length;
wherein said second time period immediately follows said first time period and wherein said second set of optical chains has said first focal length at the start of said second time period in which said step of transitioning the second group of optical chains from a first focal length to a second focal length during the second period of time is performed.

23. The method of claim 22,
wherein each of the first and second groups of optical chains include more than two optical chains; and
wherein said additional time period immediately follows said second time period.

* * * * *